(12) United States Patent
Jordan

(10) Patent No.: US 7,387,723 B2
(45) Date of Patent: Jun. 17, 2008

(54) FILTRATION APPARATUS COMPRISING A MEMBRANE BIOREACTOR AND A TREATMENT VESSEL FOR DIGESTING ORGANIC MATERIALS

(75) Inventor: Edward John Jordan, Lenexa, KS (US)

(73) Assignee: Siemens Water Technologies Corp., Warrendale, PA (US)

( * ) Notice: Subject to any disclaimer, the term of this patent is extended or adjusted under 35 U.S.C. 154(b) by 0 days.

(21) Appl. No.: 11/110,148

(22) Filed: Apr. 20, 2005

(65) Prior Publication Data

US 2006/0201876 A1    Sep. 14, 2006

Related U.S. Application Data

(60) Provisional application No. 60/653,662, filed on Feb. 16, 2005, provisional application No. 60/638,588, filed on Dec. 22, 2004, provisional application No. 60/564,827, filed on Apr. 22, 2004.

(51) Int. Cl.
    *C02F 3/00* (2006.01)
(52) U.S. Cl. ............................ 210/220; 210/500.2
(58) Field of Classification Search ............ 210/194, 210/197, 607, 620, 630, 631, 220, 500.2
    See application file for complete search history.

(56) References Cited

U.S. PATENT DOCUMENTS

| | | |
|---|---|---|
| 256,008 A | 4/1882 | Leak |
| 285,321 A | 9/1883 | Tams |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,183,191 A | 5/1965 | Hach |
| 3,198,636 A | 8/1965 | Bouthilet |
| 3,228,876 A | 1/1966 | Mahon |
| 3,442,002 A | 5/1969 | Geary et al. |
| 3,462,362 A | 8/1969 | Kollsman |
| 3,492,698 A | 2/1970 | Geary et al. |
| 3,556,305 A | 1/1971 | Shorr |
| 3,591,010 A | 7/1971 | Pall |
| 3,625,827 A | 12/1971 | Wildi et al. |
| 3,654,147 A | 4/1972 | Levin et al. |
| 3,693,406 A | 9/1972 | Tobin, III |

(Continued)

FOREIGN PATENT DOCUMENTS

AU    34400/84    9/1983

(Continued)

OTHER PUBLICATIONS

Almulla et al., Desalination, 153 (2002), pp. 237-243.

(Continued)

*Primary Examiner*—Chester T. Barry

(57) ABSTRACT

The invention relates to a membrane bioreactor process combined with an advanced biological sludge digestion process that provides significant improvements in sludge digestion by reducing the costs and resources required for disposing of digested sludge. The offline treatment vessel is used to solubilize the organic material by operating in a very low oxygen environment. Digested process fluid is transferred back to the membrane bioreactor. The processes and apparatus substantially reduce the production of waste sludge.

8 Claims, 30 Drawing Sheets

U.S. PATENT DOCUMENTS

| | | |
|---|---|---|
| 3,700,561 A | 10/1972 | Ziffer |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,804,258 A | 4/1974 | Okuniewski et al. |
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman, III et al. |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,731 A | 8/1978 | Yamazaki |
| 4,107,043 A | 8/1978 | McKinney |
| 4,138,460 A | 2/1979 | Tigner |
| 4,183,890 A | 1/1980 | Bollinger |
| 4,188,817 A | 2/1980 | Steigelmann |
| 4,190,411 A | 2/1980 | Fujimoto |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,302,336 A | 11/1981 | Kawaguchi et al. |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,369,605 A | 1/1983 | Opersteny et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,407,975 A | 10/1983 | Yamaguchi |
| 4,414,113 A | 11/1983 | LaTerra |
| 4,414,172 A | 11/1983 | Leason |
| 4,431,545 A | 2/1984 | Pall et al. |
| 4,451,369 A | 5/1984 | Sekino et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Müller |
| 4,519,909 A | 5/1985 | Castro |
| 4,540,490 A | 9/1985 | Shibata et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schleuter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,904,426 A | 2/1990 | Lundgard et al. |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,963,304 A | 10/1990 | Im et al. |
| 4,968,430 A | 11/1990 | Hildenbrand et al. |
| 4,968,733 A | 11/1990 | Muller et al. |
| 4,969,997 A | 11/1990 | Klüver et al. |
| 4,988,444 A | 1/1991 | Applegate et al. |
| 4,999,038 A | 3/1991 | Lundberg |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Müller et al. |
| 5,066,402 A | 11/1991 | Anselme et al. |
| 5,069,065 A | 12/1991 | Sprunt et al. |
| 5,075,065 A | 12/1991 | Effenberger et al. |
| 5,076,925 A | 12/1991 | Roesink et al. |
| 5,079,272 A | 1/1992 | Allegrezza et al. |
| 5,094,750 A | 3/1992 | Kopp et al. |
| 5,094,867 A | 3/1992 | Detering et al. |
| 5,098,567 A | 3/1992 | Nishiguchi |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,158,721 A | 10/1992 | Allegrezza, Jr. et al. |

| Patent | Date | Inventor |
|---|---|---|
| 5,169,528 A | 12/1992 | Karbachsch et al. |
| 5,182,019 A | 1/1993 | Cote et al. |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,248,424 A | 9/1993 | Cote et al. |
| 5,262,054 A | 11/1993 | Wheeler |
| 5,271,830 A | 12/1993 | Faivre et al. |
| 5,275,766 A | 1/1994 | Gadkaree et al. |
| 5,286,324 A | 2/1994 | Kawai et al. |
| 5,290,457 A | 3/1994 | Karbachasch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,358,732 A | 10/1994 | Seifter et al. |
| 5,361,625 A | 11/1994 | Ylvisaker |
| 5,364,527 A | 11/1994 | Zimmerman et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,405,528 A | 4/1995 | Selbie et al. |
| 5,411,663 A | 5/1995 | Johnson |
| 5,417,101 A | 5/1995 | Weich |
| 5,419,816 A | 5/1995 | Sampson et al. |
| 5,451,317 A | 9/1995 | Ishida et al. |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghaven et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A | 3/1997 | Cote et al. |
| 5,639,373 A | 6/1997 | Mahendran et al. |
| 5,643,455 A | 7/1997 | Kopp et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,733,456 A | 3/1998 | Okey et al. |
| 5,744,037 A * | 4/1998 | Fujimura et al. ............ 210/620 |
| 5,747,605 A | 5/1998 | Breant et al. |
| 5,766,479 A | 6/1998 | Collentro et al. |
| 5,783,083 A | 7/1998 | Henshaw et al. |
| 5,843,069 A | 12/1998 | Butler et al. |
| 5,846,424 A | 12/1998 | Khudenko |
| 5,888,401 A | 3/1999 | Nguyen |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,968,357 A | 10/1999 | Doelle et al. |
| 5,988,400 A | 11/1999 | Karachevtcev et al. |
| 5,997,745 A | 12/1999 | Tonelli et al. |
| 6,017,451 A | 1/2000 | Kopf |
| 6,024,872 A | 2/2000 | Mahendran |
| 6,036,030 A | 3/2000 | Stone et al. |
| 6,039,872 A | 3/2000 | Wu et al. |
| 6,042,677 A | 3/2000 | Mahendran et al. |
| 6,045,698 A | 4/2000 | Côté et al. |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,074,718 A | 6/2000 | Puglia et al. |
| 6,077,435 A | 6/2000 | Beck et al. |
| 6,083,393 A | 7/2000 | Wu et al. |
| 6,096,213 A | 8/2000 | Radovanovic et al. |
| 6,113,782 A | 9/2000 | Leonard |
| 6,120,688 A | 9/2000 | Daly et al. |
| 6,126,819 A | 10/2000 | Heine et al. |
| 6,146,747 A | 11/2000 | Wang et al. |
| 6,149,817 A | 11/2000 | Peterson et al. |
| 6,156,200 A | 12/2000 | Zha et al. |
| 6,159,373 A | 12/2000 | Beck et al. |
| 6,193,890 B1 | 2/2001 | Pedersen et al. |
| 6,202,475 B1 | 3/2001 | Selbie et al. |
| 6,214,231 B1 | 4/2001 | Cote et al. |
| 6,214,232 B1 | 4/2001 | Baurmeister et al. |
| 6,221,247 B1 | 4/2001 | Nemser et al. |
| 6,245,239 B1 | 6/2001 | Cote et al. |
| 6,254,773 B1 | 7/2001 | Biltoft |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,290,756 B1 | 9/2001 | Macheras et al. |
| 6,294,039 B1 | 9/2001 | Mahendran et al. |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,322,703 B1 | 11/2001 | Taniguchi et al. |
| 6,325,928 B1 | 12/2001 | Pedersen et al. |
| 6,337,018 B1 | 1/2002 | Mickols |
| RE37,549 E | 2/2002 | Mahendran et al. |
| 6,354,444 B1 | 3/2002 | Mahendran |
| 6,361,695 B1 | 3/2002 | Husain et al. |
| 6,368,819 B1 * | 4/2002 | Gaddy et al. .................. 435/42 |
| 6,375,848 B1 | 4/2002 | Cote et al. |
| 6,387,189 B1 | 5/2002 | Gröschl et al. |
| 6,402,955 B2 | 6/2002 | Ookata |
| 6,406,629 B1 | 6/2002 | Husain et al. |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 * | 9/2002 | Onyeche et al. ............ 210/603 |
| 6,468,430 B1 | 10/2002 | Kimura et al. |
| 6,485,645 B1 | 11/2002 | Husain et al. |
| 6,495,041 B2 | 12/2002 | Taniguchi et al. |
| 6,524,481 B2 | 2/2003 | Zha et al. |
| 6,524,733 B1 | 2/2003 | Nonobe |
| 6,550,747 B2 | 4/2003 | Rabie et al. |
| 6,555,005 B1 | 4/2003 | Zha et al. |

| | | |
|---|---|---|
| 6,576,136 B1 | 6/2003 | De Moel et al. |
| D478,913 S | 8/2003 | Johnson et al. |
| 6,620,319 B2 | 9/2003 | Behmann et al. |
| 6,627,082 B2 | 9/2003 | Del Vecchio |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,189 B2 | 3/2004 | Rabie et al. |
| 6,708,957 B2 | 3/2004 | Cote et al. |
| 6,721,529 B2 | 4/2004 | Chen et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,758,972 B2 | 7/2004 | Vriens et al. |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,912 B2 | 9/2004 | Blong |
| 6,805,806 B2 | 10/2004 | Arnaud |
| 6,811,696 B2 | 11/2004 | Wang et al. |
| 6,814,861 B2 | 11/2004 | Husain et al. |
| 6,821,420 B2 | 11/2004 | Zha et al. |
| 6,841,070 B2 | 1/2005 | Zha et al. |
| 6,861,466 B2 | 3/2005 | Dadalas et al. |
| 6,863,817 B2 | 3/2005 | Liu et al. |
| 6,863,823 B2 | 3/2005 | Côté |
| 6,869,534 B2 | 3/2005 | McDowell et al. |
| 6,872,305 B2 | 3/2005 | Johnson et al. |
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,946,073 B2 * | 9/2005 | Daigger et al. ............ 210/605 |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,964,741 B2 | 11/2005 | Mahendran et al. |
| 6,969,465 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowel |
| 7,018,530 B2 | 3/2006 | Pollock |
| 7,018,533 B2 | 3/2006 | Johnson et al. |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,172,701 B2 | 2/2007 | Gaid et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,264,716 B2 | 9/2007 | Johnson et al. |
| 7,300,022 B2 | 11/2007 | Muller |
| 2002/0070157 A1 | 6/2002 | Yamada |
| 2002/0148767 A1 | 10/2002 | Johnson et al. |
| 2003/0038080 A1 | 2/2003 | Vriens et al. |
| 2003/0057155 A1 | 3/2003 | Husain et al. |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0178365 A1 | 9/2003 | Zha et al. |
| 2003/0226797 A1 | 12/2003 | Phelps |
| 2004/0007525 A1 | 1/2004 | Rabie et al. |
| 2004/0035770 A1 | 2/2004 | Edwards et al. |
| 2004/0084369 A1 | 5/2004 | Zha et al. |
| 2004/0145076 A1 | 7/2004 | Zha et al. |
| 2004/0168979 A1 | 9/2004 | Zha et al. |
| 2004/0178154 A1 | 9/2004 | Zha et al. |
| 2004/0217053 A1 | 11/2004 | Zha et al. |
| 2004/0232076 A1 | 11/2004 | Zha et al. |
| 2005/0029185 A1 | 2/2005 | Muller |
| 2005/0029186 A1 | 2/2005 | Muller |
| 2005/0032982 A1 | 2/2005 | Muller et al. |
| 2005/0103722 A1 | 5/2005 | Freydina et al. |
| 2005/0109692 A1 * | 5/2005 | Zha et al. ............ 210/321.69 |
| 2005/0115880 A1 | 6/2005 | Pollock |
| 2005/0115899 A1 | 6/2005 | Liu et al. |
| 2005/0139538 A1 | 6/2005 | Lazaredes |
| 2005/0194310 A1 * | 9/2005 | Yamamoto et al. ......... 210/605 |
| 2005/0194315 A1 | 9/2005 | Adams et al. |
| 2006/0000775 A1 * | 1/2006 | Zha et al. .................... 210/636 |
| 2006/0131234 A1 * | 6/2006 | Zha et al. .................... 210/636 |
| 2006/0201876 A1 | 9/2006 | Jordan |
| 2006/0261007 A1 | 11/2006 | Zha et al. |
| 2006/0273038 A1 | 12/2006 | Syed et al. |
| 2007/0007214 A1 | 1/2007 | Zha et al. |
| 2007/0056905 A1 | 3/2007 | Beck et al. |
| 2007/0075017 A1 * | 4/2007 | Kuzma ....................... 210/605 |
| 2007/0075021 A1 | 4/2007 | Johnson |
| 2007/0084795 A1 * | 4/2007 | Jordan ....................... 210/652 |
| 2007/0108125 A1 | 5/2007 | Cho et al. |
| 2007/0138090 A1 * | 6/2007 | Jordan et al. ............... 210/605 |
| 2007/0170112 A1 * | 7/2007 | Elefritz et al. ............. 210/605 |
| 2007/0227973 A1 | 10/2007 | Zha et al. |

FOREIGN PATENT DOCUMENTS

| | | |
|---|---|---|
| AU | 55847/86 | 3/1985 |
| AU | 77066/87 | 7/1986 |
| CN | 1050770 C | 1/1995 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 29804927 U1 | 6/1998 |
| DE | 29906389 | 6/1999 |
| EP | 012557 B1 | 2/1983 |
| EP | 126714 A2 | 11/1984 |
| EP | 050477 B1 | 10/1985 |
| EP | 250337 A1 | 12/1987 |
| EP | 327025 A1 | 8/1989 |
| EP | 090383 B1 | 5/1990 |
| EP | 407900 A2 | 1/1991 |
| EP | 463627 A2 | 1/1992 |
| EP | 492942 A2 | 7/1992 |
| EP | 518250 B1 | 12/1992 |
| EP | 547575 A1 | 6/1993 |
| EP | 395133 B1 | 2/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 855214 A1 | 7/1998 |
| EP | 627255 B1 | 1/1999 |
| EP | 911073 A1 | 4/1999 |
| EP | 920904 A2 | 6/1999 |
| EP | 1034835 A1 | 9/2000 |
| EP | 1052012 A1 | 11/2000 |
| EP | 1349644 | 10/2003 |
| EP | 1350555 A1 | 10/2003 |
| EP | 1236503 B1 | 8/2004 |
| FR | 2620712 | 3/1989 |
| FR | 2674448 | 10/1992 |
| FR | 2699424 | 6/1994 |
| GB | 702911 | 1/1954 |

| | | | | | | |
|---|---|---|---|---|---|---|
| GB | 2253572 A | 9/1992 | | JP | 07-155758 | 6/1995 |
| JP | 54-162684 | 12/1979 | | JP | 07-178323 | 7/1995 |
| JP | 55-129155 | 6/1980 | | JP | 07-185268 | 7/1995 |
| JP | 55-099703 | 7/1980 | | JP | 07-185271 | 7/1995 |
| JP | 55-129107 | 10/1980 | | JP | 07-236819 | 9/1995 |
| JP | 56-021604 | 2/1981 | | JP | 07-251043 | 10/1995 |
| JP | 56-118701 | 9/1981 | | JP | 07-275665 | 10/1995 |
| JP | 56-121685 | 9/1981 | | JP | 07-289860 | 11/1995 |
| JP | 58-088007 | 5/1983 | | JP | 07-303895 | 11/1995 |
| JP | 60-019002 | 1/1985 | | JP | 08-010585 | 1/1996 |
| JP | 60-206412 | 10/1985 | | JP | 09-099227 | 4/1997 |
| JP | 60-097006 | 5/1986 | | JP | 09-141063 | 6/1997 |
| JP | 61-097005 | 5/1986 | | JP | 09-187628 | 7/1997 |
| JP | 61-107905 | 5/1986 | | JP | 09-220569 | 8/1997 |
| JP | 61-167406 | 7/1986 | | JP | 09-271641 | 10/1997 |
| JP | 61-167407 | 7/1986 | | JP | 09-324067 | 12/1997 |
| JP | 61-171504 | 8/1986 | | JP | 10-033955 | 2/1998 |
| JP | 61-192309 | 8/1986 | | JP | 10-048466 | 2/1998 |
| JP | 61-222510 | 10/1986 | | JP | 10-085565 | 4/1998 |
| JP | 61-242607 | 10/1986 | | JP | 10-156149 | 6/1998 |
| JP | 61-249505 | 11/1986 | | JP | 11-028467 | 2/1999 |
| JP | 61-257203 | 11/1986 | | JP | 11-156166 | 6/1999 |
| JP | 61-263605 | 11/1986 | | JP | 11-165200 | 6/1999 |
| JP | 61-291007 | 12/1986 | | JP | 11-333265 | 7/1999 |
| JP | 61-293504 | 12/1986 | | JP | 11-033365 | 9/1999 |
| JP | 62-004408 | 1/1987 | | JP | 11-319507 | 11/1999 |
| JP | 62-114609 | 5/1987 | | JP | 2000-070684 | 3/2000 |
| JP | 62-140607 | 6/1987 | | JP | 2000-185220 | 4/2000 |
| JP | 62-144708 | 6/1987 | | JP | 2000-157850 | 6/2000 |
| JP | 62-163708 | 7/1987 | | JP | 2000-317276 | 11/2000 |
| JP | 62-179540 | 8/1987 | | JP | 2001-009246 | 1/2001 |
| JP | 62-250908 | 10/1987 | | JP | 2001-070967 | 3/2001 |
| JP | 63-097634 | 4/1988 | | JP | 2001-079367 | 3/2001 |
| JP | 63-143905 | 6/1988 | | JP | 2001-104760 | 4/2001 |
| JP | 63-171607 | 7/1988 | | JP | 2001-190937 | 7/2001 |
| JP | 63-180254 | 7/1988 | | JP | 2001-190938 | 7/2001 |
| JP | S63-38884 | 10/1988 | | JP | 2001-205055 | 7/2001 |
| JP | 01-151906 | 6/1989 | | JP | 2000-342932 | 12/2002 |
| JP | 01-307409 | 12/1989 | | JP | 2003-047830 | 2/2003 |
| JP | 02-026625 | 1/1990 | | JP | 2003-062436 | 3/2003 |
| JP | 02-031200 | 2/1990 | | JP | 2003-135935 | 5/2003 |
| JP | 02-107318 | 4/1990 | | KR | 2002-0090967 | 12/2002 |
| JP | 02-126922 | 5/1990 | | NL | 1020491 C | 10/2003 |
| JP | 02-144132 | 6/1990 | | NL | 1021197 C | 10/2003 |
| JP | 02-164423 | 6/1990 | | TW | 347343 | 12/1998 |
| JP | 02-277528 | 11/1990 | | WO | WO 88-06200 | 8/1988 |
| JP | 02-284035 | 11/1990 | | WO | WO 89-00880 | 2/1989 |
| JP | 03-018373 | 1/1991 | | WO | WO 90-00434 | 1/1990 |
| JP | 03-028797 | 2/1991 | | WO | WO 91-04783 | 4/1991 |
| JP | 03-110445 | 5/1991 | | WO | WO 91-16124 | 10/1991 |
| JP | 04-187224 | 7/1992 | | WO | WO 93-02779 | 2/1993 |
| JP | 04-250898 | 9/1992 | | WO | WO 93-15827 | 8/1993 |
| JP | 04-256424 | 9/1992 | | WO | WO 93-23152 | 11/1993 |
| JP | 04-265128 | 9/1992 | | WO | WO 94-11094 | 5/1994 |
| JP | 04-293527 | 10/1992 | | WO | WO 95-34424 | 12/1995 |
| JP | 04-310223 | 11/1992 | | WO | WO 96-07470 A1 | 3/1996 |
| JP | 04-348252 | 12/1992 | | WO | WO 96-28236 | 9/1996 |
| JP | 05-023557 | 2/1993 | | WO | WO 96-41676 | 12/1996 |
| JP | 05-096136 | 4/1993 | | WO | WO 97-06880 | 2/1997 |
| JP | 05-137977 | 6/1993 | | WO | WO 98-22204 | 5/1998 |
| JP | 05-157654 | 6/1993 | | WO | WO 98-25694 | 6/1998 |
| JP | 05-285348 | 11/1993 | | WO | WO 98-28066 | 7/1998 |
| JP | 06-071120 | 3/1994 | | WO | WO 98-53902 | 12/1998 |
| JP | 06-114240 | 4/1994 | | WO | WO 99-01207 | 1/1999 |
| JP | 06-218237 | 8/1994 | | WO | WO 99-59707 | 11/1999 |
| JP | 06-277469 | 10/1994 | | WO | WO 00-18498 | 4/2000 |
| JP | 06-285496 | 10/1994 | | WO | WO 00-30742 | 6/2000 |
| JP | 06-343837 | 12/1994 | | WO | WO 01-00307 | 1/2001 |
| JP | 07-000770 | 1/1995 | | WO | WO 01-32299 | 5/2001 |
| JP | 07-024272 | 1/1995 | | WO | WO 01-36075 | 5/2001 |
| JP | 07-068139 | 3/1995 | | WO | WO 01-45829 A1 | 6/2001 |
| JP | 07-136470 | 5/1995 | | WO | WO 02-40140 A1 | 5/2002 |
| JP | 07-136471 | 5/1995 | | WO | WO 03-000389 A2 | 1/2003 |

| | | |
|---|---|---|
| WO | WO 03-013706 A1 | 2/2003 |
| WO | WO 2004-101120 A1 | 11/2004 |
| WO | WO 2005-021140 A1 | 3/2005 |
| WO | WO 2005-037414 A1 | 4/2005 |
| WO | WO 2005-077499 A1 | 8/2005 |
| WO | WO 2006-029456 A1 | 3/2006 |

OTHER PUBLICATIONS

Anonymous, "*Nonwoven Constructions of Dyneon™ THV and Dyneon™ THE Fluorothermoplastics*", Research Disclosure Journal, Apr. 1999, RD 420013, 2 pages.

Cote et al., *Wat. Sci. Tech.* 38(4-5) (1998), pp. 437-442.

Cote, et al. "A New Immersed Membrane for Pretreatment to Reverse Osmosis" Desalination 139 (2001) 229-236.

Crawford et al., "Procurement of Membrane Equipment: Differences Between Water Treatment and Membrane Bioreactor (MBR) Applications" (2003).

Davis et al., Membrane Technology Conference, "Membrane Bioreactor Evaluation for Water Reuse in Seattle, Washington" (2003).

DeCarolis et al., Membrane Technology Conference, "Optimization of Various MBR Systems for Water Reclamation" (2003).

Dow Chemicals Company, "Filmtec Membranes—Cleaning Procedures for Filmtec FT30 Elements," Tech Facts, Online, Jun. 30, 2000, XP002237568.

Husain, H. et al., "The ZENON experience with membrane bioreactors for municipal wastewater treatment," MBR2: Membr. Bioreact. Wastewater Treat., 2$^{nd}$ Intl. Meeting; School of Water Sciences, Cranfield University, Cranfield, UK, Jun. 1999.

Johnson, "Recent Advances in Microfiltration for Drinking Water Treatment," AWWA Annual Conference, Jun. 20-24, 1999, Chicago, Illinois, entire publication.

Kaiya et al., "Water Purification Using Hollow Fiber Microfiltration Membranes," 6th World Filtration Congress, Nagoya, 1993, pp. 813-816.

Lloyd D.R. et al. "Microporous Membrane Formation Via Thermally Induced Phase Separation-Solid-Liquid Phase Separation" *Journal of Membrane Science*, (Sep. 15, 1990), pp. 239-261, vol. 52, No. 3, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

Nakayama, "Introduction to Fluid Mechanics," Butterworth-Heinemann, Oxford, UK, 2000.

Ramaswammy S. et al. "Fabrication of Ply (ECTFE) Membranes via thermally induced phase Separation", *Journal of Membrane Science*, (Dec. 1, 2002), pp. 175-180, vol. 210 No. 1, Scientific Publishing Company, Amsterdam, NL.

Rosenberger et al., Desalination, 151 (2002), pp. 195-200.

Ueda et al., "Effects of Aeration on Suction Pressure in a Submerged Membrane Bioreactor," Wat. Res. vol. 31, No. 3, 1997, pp. 489-494.

*Water Encyclopedia*, edited by Jay Lehr, published by John Wiley & Sons, Inc., Hoboken, New Jersey, 2005. Available at http://wwwmmrw.interscience.wiley.com/eow/.

White et al., *The Chemical Engineering Journal*, 52 (1993), pp. 73-77.

Wikipedia, "Seawater," available at http://en.wikipedia.org/wiki/Seawater, Jul. 15, 2007.

Zenon, "Proposal for ZeeWeed® Membrane Filtration Equipment System for the City of Westminster, Colorado, Proposal No. 479-99," Mar. 2000, entire publication.

\* cited by examiner

Figure 6A.
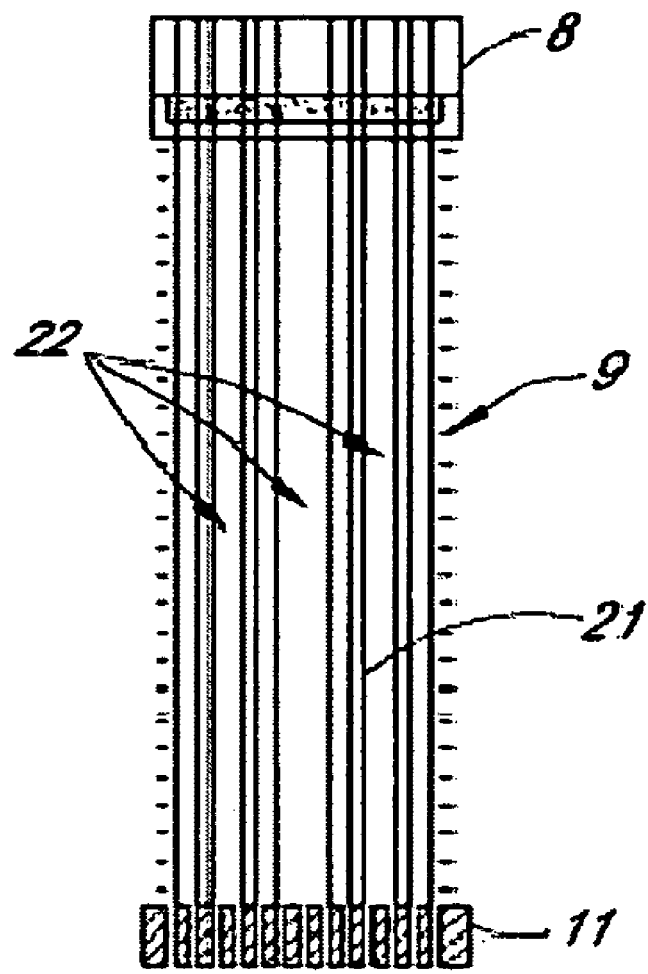
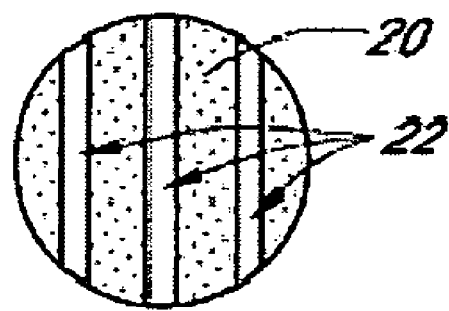
Figure 6B.

Figure 7A.
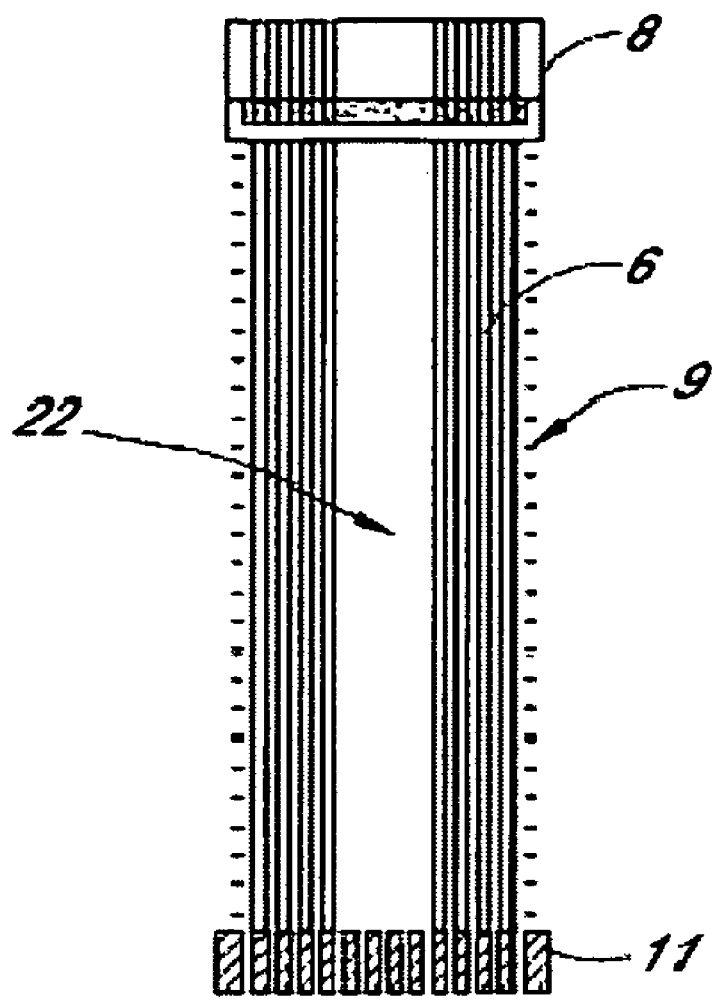
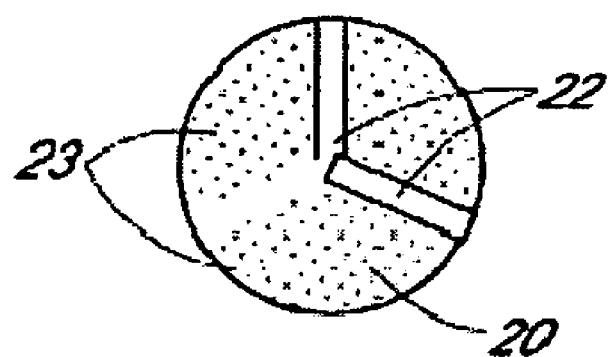
Figure 7B.

Figure 8A.
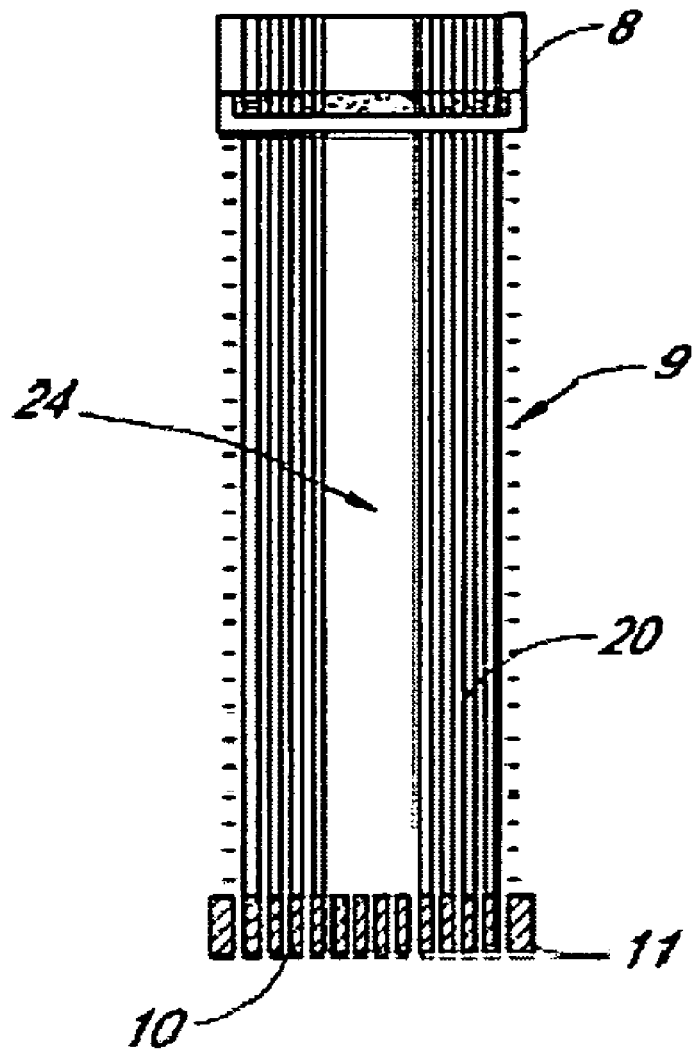
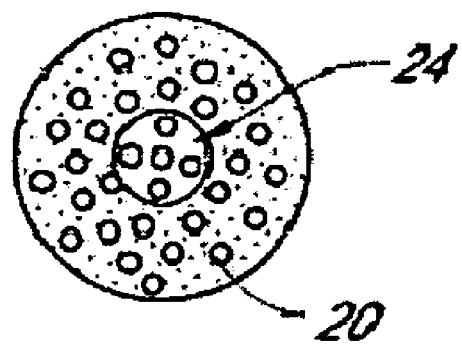
Figure 8B.

Figure 15 - General Layout of Membrane Bioreactor

**Figure 16 - Operating Mode
Both Membrane systems operating**

Figure 17 - Evacuate Phase
One membrane system operating

Figure 18 - Soak Phase
One membrane system operating

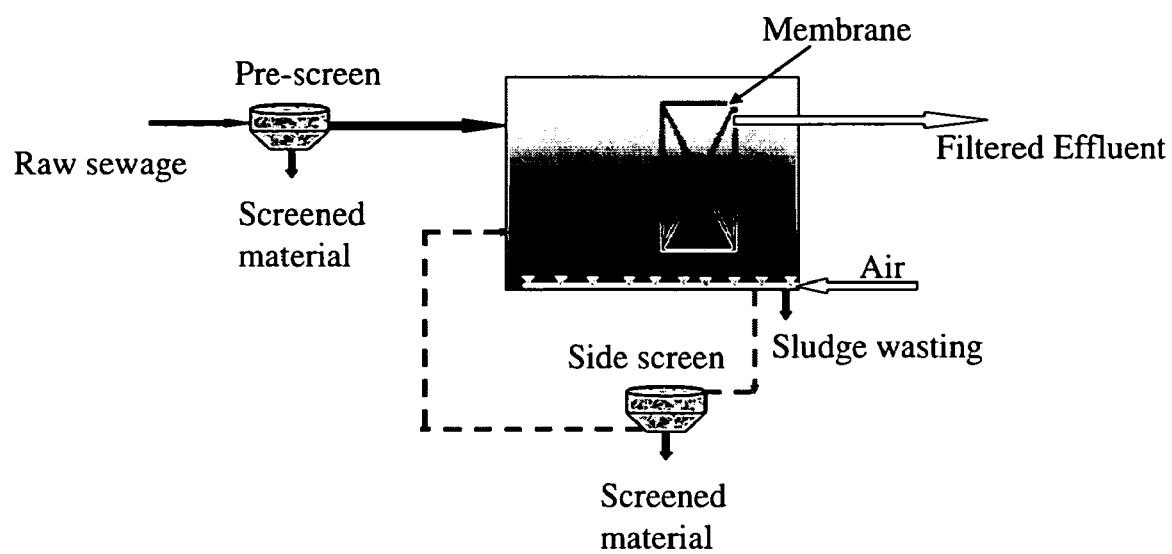
Figure 21 - Conventional MBR Configuration

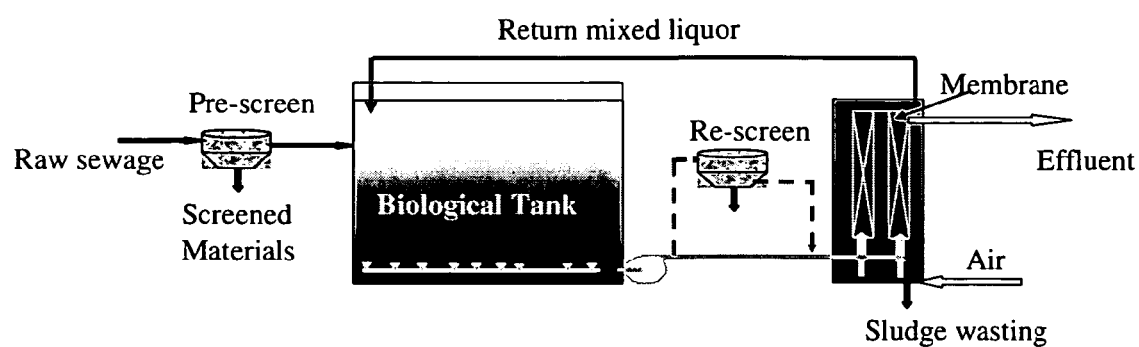
Figure 22 - MemJet MBR Configuration with Re-screening

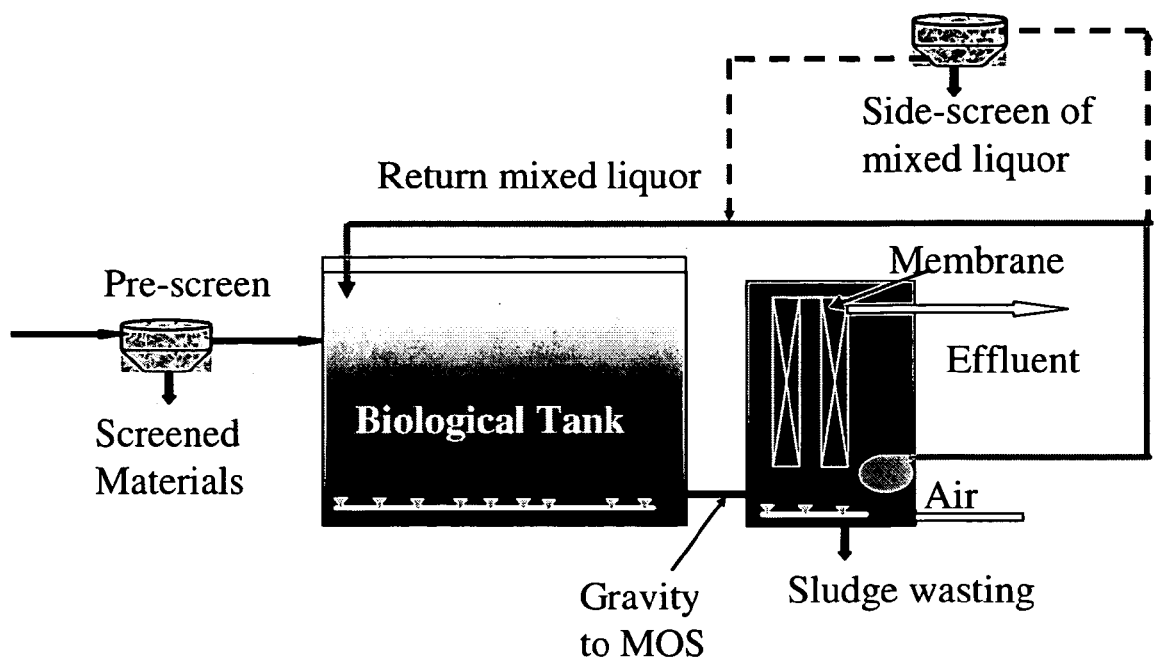
Figure 23 - MBR Configuration with Side Screen in US '868.

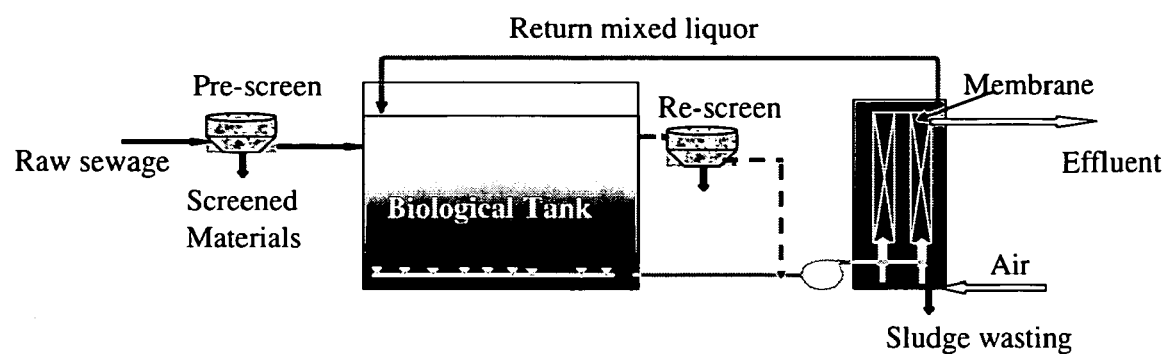
Figure 24 - MemJet MBR Configuration with Gravity Re-screening

Membrane Bioreactor

Membrane Bioreactor with Parallel Screening Arrangement

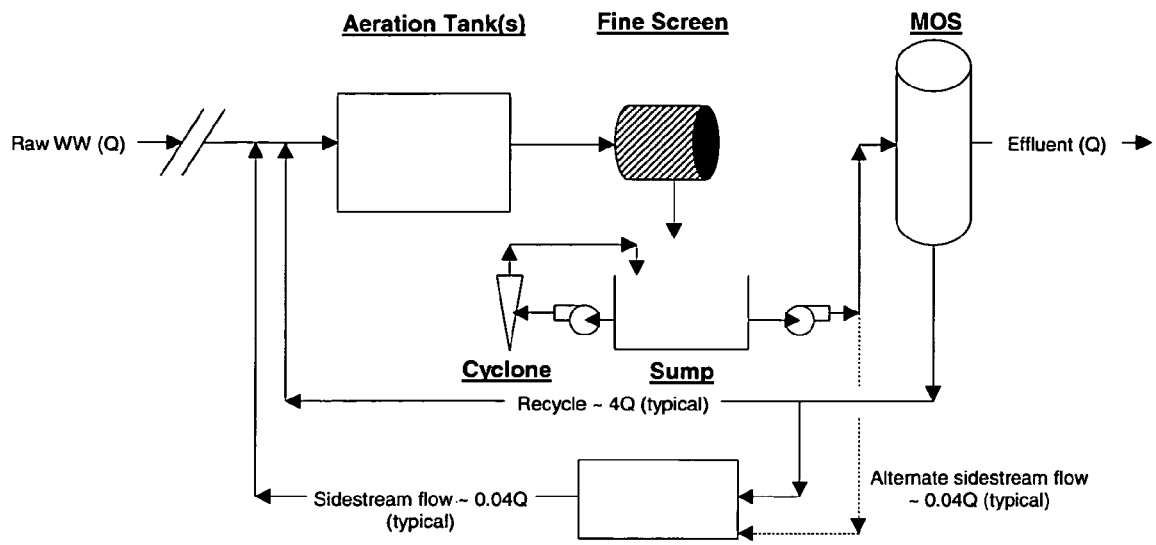
Figure 26 - Sidestream Anoxic Reactor

FILTRATION APPARATUS COMPRISING A MEMBRANE BIOREACTOR AND A TREATMENT VESSEL FOR DIGESTING ORGANIC MATERIALS

RELATED APPLICATIONS

This application claims the benefit of priority from U.S. Provisional Patent Application No. 60/564,827 filed on Apr. 22, 2004, U.S. Provisional Patent Application No. 60/638,588 filed on Dec. 22, 2004 and U.S. Provisional Patent Application No. 60/653,662 filed on Feb. 16, 2005. The subject matter of these applications is incorporated herein in its entirety by cross-reference.

FIELD OF THE INVENTION

The invention relates to a membrane bioreactor process combined with an advanced biological sludge digestion process that provides significant improvements in sludge digestion by reducing the costs and resources required for disposing of digested sludge. The digestion in an offline treatment vessel is employed to solubilize the organic material by operating in a very low oxygen environment. Digested process fluid is transferred back to the membrane bioreactor. The processes and apparatus substantially reduce the production of waste sludge.

BACKGROUND OF THE INVENTION

Biological processes to treat contaminated water take many forms. Generally these involve exposure of the waste stream to one or more forms of microorganism that stabilize or digest the contaminants. The microorganisms are chosen to complement the waste stream both in terms of sewage contents and chemical environment, since any species of microorganism favors a particular environment with limited tolerance for variation. For example, the activated sludge process utilizes aerobic bacteria that remove the soluble biological oxygen demand (BOD) from wastewater. This generally involves conducting wastewater into an aeration basin containing a suspension of digestive microorganisms, thereby forming a "mixed liquor" that is aerated to furnish oxygen for respiration of biomass; the biomass sorbs, assimilates and metabolizes the BOD of the wastewater. After a suitable period of aeration, the mixed liquor is introduced into a clarifier in which the biomass settles, allowing the treated wastewater to overflow into an outlet effluent stream.

An aspect of traditional wastewater treatment is adequate agitation of the mixed liquor in order to speed contact between the digestive microorganisms and waste materials, which can be suspended or dissolved in the wastewater. An optimal amount of turbulence is generally dictated more by economics than by process requirements; high agitation rates are theoretically the most desirable, but are also expensive to attain.

An exception to this practice involves the use of fixed-growth media, where the biological organisms are maintained on fixed supports rather than dispersed in suspension. In this case mixing is avoided to prevent shear that might remove the biological attached growth. The application of fixed-growth systems is ordinarily restricted to soluble, non-particulate contaminants; in addition, these processes are limited in loading capacity by the surface area of the biological support and the diffusion characteristics of the waste stream.

Fluidized-bed systems represent a combination of suspension and fixed-growth processes, but require added media for surface area, mixing sufficient to maintain homogeneity of the media and its attached biological growth, and periodic or continuous removal of the media for regeneration.

All of these systems ordinarily are limited to one category of microorganism, since differing biological processes vary significantly in terms of multiplication rates, optimum conditions, and preferred inputs and waste products. Most generally, microorganisms for wastewater treatment include aerobic, anaerobic and anoxic species, all of which are sustained by very different (and mutually inconsistent) environments. Process conditions can also restrict the applicability of a particular biological approach. For example, the optimal biological process for a particular wastewater composition might require a longer solids retention time than that afforded by economically feasible complete-mix processes, and exhibit greater throughput needs than can be met with fixed-film and fluid-bed film reactors.

SUMMARY OF THE INVENTION

Accordingly, a process for treating wastewater that provides significant benefits in sludge digestion by reducing the costs and resources required for disposing of digested sludge is desirable. A filtration system providing these benefits is provided that includes a membrane bioreactor combined with a biological sludge offline treatment vessel. The offline treatment vessel solubilizes the organic material by operating in a very low oxygen environment, and then the processed fluid is transferred back to the membrane bioreactor (MBR).

In a first aspect, an apparatus for filtering a liquid containing solids is provided, the apparatus comprising a membrane bioreactor comprising at least one membrane module, the membrane module comprising a plurality of porous membranes, wherein the membrane module is configured such that, in operation, a substrate comprising an activated sludge is contacted with outer surfaces of the membranes, and a treated water is removed from lumens of the membranes; and a biological sludge treatment vessel, wherein the biological sludge vessel is configured to operate in an anaerobic environment wherein a process fluid is digested, wherein at least a portion of the digested process fluid is transferred to the membrane bioreactor, and wherein at least a portion of the substrate in the membrane bioreactor is transferred to the biological sludge treatment vessel.

In an embodiment of the first aspect, the apparatus further comprises a screen, wherein the screen is positioned between the membrane bioreactor and the biological sludge treatment vessel, wherein the screen is configured to remove inert materials in an outflow from the membrane bioreactor.

In an embodiment of the first aspect, the screen comprises openings having an average size in a longest dimension of about 200 µm to about 300 µm.

In an embodiment of the first aspect, the apparatus further comprises a hydrocyclone, wherein the hydrocyclone is positioned between the membrane bioreactor and the biological sludge treatment vessel, wherein the hydrocyclone is configured to remove inert materials in an outflow from the membrane bioreactor.

In an embodiment of the first aspect, the apparatus further comprises a hydrocyclone, wherein the hydrocyclone is positioned between the screen and the biological sludge treatment vessel, wherein the hydrocyclone is configured to remove inert materials in an outflow from the membrane bioreactor.

In an embodiment of the first aspect, the apparatus further comprises a surge tank, wherein the surge tank is configured to receive an outflow from the membrane bioreactor.

In an embodiment of the first aspect, the apparatus further comprises an auxiliary screen, wherein the screen comprises openings having an average size in a longest dimension of from about 6 mm to about 25 mm.

In a second aspect, a method for treating an influent stream comprising a digestible waste is provided, the method comprising filtering a mixed liquor in the membrane bioreactor, wherein the mixed liquor is contacted with outer surfaces of a plurality of porous hollow fiber membranes, and wherein a permeate is removed from lumens of the membranes; removing biological solids from the membrane bioreactor by recycling a substrate containing biological solids to an offline treatment vessel via a recycle loop, whereby a preselected concentration of biological solids is maintained within the membrane bioreactor; digesting biological solids in the offline treatment vessel; and conducting an effluent stream from the offline treatment vessel to the membrane bioreactor, wherein the effluent stream comprises at least a portion of the mixed liquor.

In an embodiment of the second aspect, the step of removing biological solids further comprises the step of passing the substrate containing biological solids through a hydrocyclone, whereby inert solids are removed, wherein the hydrocyclone is part of the recycle loop.

In an embodiment of the second aspect, the step of removing biological solids further comprises the step of passing the substrate containing biological solids through a screen, whereby inert solids are removed, wherein the screen is part of the recycle loop.

BRIEF DESCRIPTION OF THE DRAWINGS

FIG. 6a shows a schematic side elevation of a partitioned membrane module of a membrane bioreactor employed in the filtration apparatus of a preferred embodiment.

FIG. 6b shows a section through the membrane bundle of FIG. 6a.

FIG. 7a shows a schematic side elevation of a partitioned membrane module of a membrane bioreactor employed in the filtration apparatus of a preferred embodiment.

FIG. 7b shows a section through the membrane bundle of FIG. 7a.

FIG. 8a shows a schematic side elevation of a partitioned membrane module of a membrane bioreactor employed in the filtration apparatus of a preferred embodiment.

FIG. 8b shows a section through the membrane bundle of FIG. 8a.

FIG. 9b shows a section through the membrane bundle of FIG. 9a.

FIG. 21 depicts a membrane bioreactor configuration.

FIG. 22 depicts a typical flowsheet for the US Filter MemJet Product.

FIG. 23 depicts an alternate membrane bioreactor design.

FIG. 24 depicts a system employing a re-screener.

FIG. 26 depicts a process flow diagram for sidestream anoxic reactor for use with a membrane bioreactor

DETAILED DESCRIPTION OF THE PREFERRED EMBODIMENT

Figure 1:
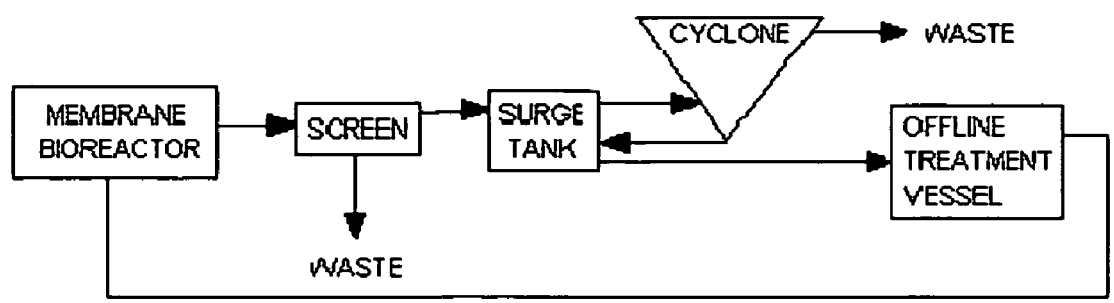
FIG. 1 shows a schematic drawing of a filtration apparatus configuration of a preferred embodiment, employing a membrane bioreactor, a screen, a surge tank, a hydrocyclone, and an offline treatment vessel.

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

The membrane bioreactor process is a high rate process which operates at elevated mixed-liquor suspended solids (MLSS) concentration to achieve destruction and digestion of organic materials. Combining the membrane bioreactor process with an advanced biological sludge digestion process can provide significant improvements in sludge digestion by reducing the costs and resources required for disposing of digested sludge. The apparatus of preferred embodiments dramatically reduces the production of waste sludge by about 80% or more. In a preferred embodiment, sludge is pumped from the membrane bioreactor aerobic tank through a 250 µm screen. The screened solids are removed, and the screened process fluid enters a storage tank where a portion of the process fluid is flowed to a hydrocyclone separator to remove inert material. The inert material is removed and the processed fluid is returned to the surge tank. From the surge tank, process fluid is either returned back to the membrane bioreactor aerobic tank or it is directed to an offline treatment vessel. The offline treatment vessel typically has a hydraulic retention time (HRT) of from about 1 day or less to about 1 month or more, preferably about 10 days hydraulic retention time (HRT). The offline treatment vessel is employed to solubilize the organic material by operating in a very low oxygen environment. Digested process fluid is transferred back to the membrane bioreactor.

The process can offer numerous advantages. For example, wastewater or biological sludge can be treated in a biologically optimal manner that facilitates simultaneous use of multiple biological processes, permitting the coexistence, in a single vessel, of multiple biological processes having inconsistent environmental requirements. Controlled, multiple biological environments can be created in a single vessel without mixing, and control and maintain the relative proportions of each separate biological environment by non-turbulent adjustment of conditions. Waste can be processed in a single vessel through simultaneous use of aerobic, anoxic and anaerobic microorganisms. Gas can be quiescently moved into a single-vessel, multiple-process environment to supply and/or remove nutrients and biological byproducts. Waste can be processed in a single vessel with multiple biological environments whose relative ratios are controlled to meet target oxidation-reduction potentials at one or more effluent points. Inert substances can be removed from internally recycled waste streams to a treatment vessel. Inert substances can be removed from recycled waste streams, wherein the substances have sizes similar to those of waste-digestive microorganisms, without depleting the stream of such microorganisms.

The Membrane Bioreactor

One of the components of the water treatment systems of preferred embodiments is a membrane bioreactor. Membrane bioreactor systems combine biological treatment, involving bacteria, with membrane separation to treat wastewater. Treated water is separated from the purifying bacteria, referred to as activated sludge, by a process of membrane filtration. Membrane bioreactors typically employ submerged hollow fiber membrane modules incorporated in a distributed flow reactor.

Membrane processes can be used as an effective tertiary treatment of sewage and provide quality effluent. Submerged membrane processes where the membrane modules are immersed in a large feed tank and filtrate is collected through suction applied to the filtrate side of the membrane, and wherein the membrane bioreactor combines biological and physical processes in one stage, are compact, efficient, economic, and versatile.

Membrane bioreactors that can be employed in the water treatment systems of preferred embodiments include those commercially available from USFilter Memcor Research Pty. Ltd. and Zenon Environmental, Inc. Particularly preferred systems include USFilter's MEMCOR® MBR Membrane Bioreactor System and Zenon's ZeeWeed® MBR Membrane Bioreactor process utilizing the ZeeWeed® 500 and ZeeWeed® 1000 systems.

The membrane modules employed in the ZeeWeed® 500 system consist of hundreds of membrane fibers oriented vertically between two headers. The membrane is a reinforced fiber with a nominal pore size of 0.04 µm. The hollow fibers are slightly longer than the distance between the top and bottom headers and this allows them to move when aerated. It is the air that bubbles up between the fibers that scours the fibers and continuously removes solids from the surface of the membrane. From 1 to 36 membrane modules are arranged in a cassette. ZeeWeed® 500 system typically consists of two or more parallel trains. Each train consists of a process pump, automatic valves, and instrumentation. The following components are generally required in a system and can either be dedicated to a specific train or shared amongst trains: a tank (into which cassettes are immersed); metering pumps (for chemical addition); membrane blowers (to provide air for scouring the membranes); reject or sludge pump; vacuum pump (for entrained air removal); "clean-in-place" pumps; backpulse or wash tank; and control system. Other components can be employed, depending on the design or application: strainers (for pre-screening the feedwater); process blowers (biological treatment systems only); feed pumps; mixers; sludge recirculation pumps; and cassette removal hoist or other mechanism.

The ZeeWeed® 1000 ultrafilter membrane has a nominal pore size of 0.02 µm and is designed to remove suspended solids, protozoa, bacteria, and viruses from water supplies. The ZeeWeed® 1000 system operates in a mode similar to conventional media filters with direct (dead-end) filtration followed by a periodic air and water backwash. A ZeeWeed® 1000 cassette is made by stacking elements both vertically and horizontally in a block. There are a variety of cassette configurations available ranging in size from 3 to 96 elements. A ZeeWeed® 1000 system consists of a series of parallel trains. Each train consists of ZeeWeed® cassettes, a process pump, piping, instrumentation, and controls. The backpulse pump, blower and clean-in-place equipment can be shared amongst the trains. Feed enters each train from a feed channel that runs along the long side of the train at the bottom of the tank. Reject is collected in troughs between cassettes and is discharged to the overflow channel that runs the length of the tank.

The membrane bioreactor systems preferably employed in the preferred embodiments utilize an effective and efficient membrane cleaning method. Commonly used physical cleaning methods include backwash (backpulse, backflush) using a liquid permeate or a gas, membrane surface scrubbing, and scouring using a gas in the form of bubbles in a liquid. Examples of the second type of method are described in U.S. Pat. No. 5,192,456 to Ishida et al., U.S. Pat. No. 5,248,424 to Cote et al., U.S. Pat. No. 5,639,373 to Henshaw et al., U.S. Pat. No. 5,783,083 to Henshaw et al., and U.S. Pat. No. 6,555,005 to Zha et al. In the examples referred to above, a gas is injected, usually by a pressurized blower, into a liquid system where a membrane module is submerged to form gas bubbles. The bubbles so formed then travel upwards to scrub the membrane surface to remove the fouling substances formed on the membrane surface. The shear force produced largely relies on the initial gas bubble velocity, bubble size, and the resultant of forces applied to the bubbles. The fluid transfer in this approach is limited to the effectiveness of the gas lifting mechanism. To enhance the scrubbing effect, more gas has to be supplied. However, this method has several disadvantages: it consumes large amounts of energy, it can form mist or froth flow reducing effective membrane filtration area, and can be destructive to membranes. Moreover, in an environment of high concentration of solids, the gas distribution system can gradually become blocked by dehydrated solids or simply be blocked when the gas flow accidentally ceases.

For most tubular membrane modules, the membranes are flexible in the middle (longitudinal directions) of the modules but tend to be tighter and less flexible towards to both potted heads. When such modules are used in an environment containing high concentrations of suspended solids, solids are easily trapped within the membrane bundle, especially in the proximity of two potted heads. The methods to reduce the accumulation of solids include the improvement of module configurations and flow distribution when gas scrubbing is used to clean the membranes.

In the design of a membrane module, the packing density of the tubular membranes in a module is one factor that is considered. The packing density of the fiber membranes in a membrane module as used herein is defined as the cross-sectional potted area taken up by the fiber membranes divided by the total potted area and is normally expressed as, a percentage. From the economical viewpoint it is desirable that the packing density be as high as possible to reduce the cost of making membrane modules. In practice, solid packing is reduced in a less densely packed membrane module. However, if the packing density is too low, the rubbing effect between membranes could also be lessened, resulting in less efficient scrubbing/scouring of the membrane surfaces. It is, thus desirable to provide a membrane configuration that assists removal of accumulated solids while maximizing packing density of the membranes. The membranes can be in contact with each other (e.g., at high packing densities), or can be closely or distantly spaced apart (e.g., at low packing densities), for example, a spacing between fiber walls of from about 0.1 mm or less to about 10 mm or more is typically employed.

A method of scrubbing a membrane surface using a liquid medium with gas bubbles entrained therein, including the steps of entraining the gas bubbles-into the liquid medium by flow of the liquid medium past a source of the gas, and flowing the gas bubbles and liquid medium along the membrane surface to dislodge fouling materials therefrom, can be employed in membrane bioreactors.

Preferably, the gas bubbles are entrained into the liquid stream by means of a venturi device or other type of junction. For further preference, the gas bubbles are entrained or injected into the liquid stream by means of devices which forcibly mix gas into a liquid flow to produce a mixture of liquid and bubbles, such devices including a jet, nozzle, ejector, eductor, injector or the like. Optionally, an additional source of bubbles can be provided in the liquid medium by means of a blower or like device. The gas used can include air, oxygen, gaseous chlorine, or ozone. Air is the most economical for the purposes of scrubbing and/or aeration. Gaseous chlorine can be used for scrubbing, disinfection, and enhancing the cleaning efficiency by chemical reaction at the membrane surface. The use of ozone, besides the similar effects mentioned for gaseous chlorine, has additional features, such as oxidizing DBP precursors and converting non-biodegradable NOM's to biodegradable dissolved organic carbon.

The membrane modules employed in the membrane bioreactor preferably comprise a plurality of porous membranes arranged in close proximity to one another, optionally mounted to prevent excessive movement therebetween, and include a source of gas bubbles for providing, from within the module gas bubbles entrained in a liquid flow such that, in use, the liquid and bubbles entrained therein move past the surfaces of the membranes to dislodge fouling materials therefrom, the gas bubbles being entrained in the liquid by flowing the liquid past a source of gas to draw the gas into the liquid flow. Preferably, the liquid and bubbles are mixed and then flowed past membranes to dislodge the fouling materials.

The fibers of the membrane bioreactor can be cleaned by providing, from within the array of fibers, by means other than gas passing through the pores of the membranes, uniformly distributed gas-bubbles entrained in a liquid flow, the gas bubbles being entrained in the liquid flow by flowing the liquid past a source of gas so as to cause the gas to be drawn and/or mixed into the liquid, the distribution being such that the bubbles pass substantially uniformly between each membrane in the array to, in combination with the liquid flow, scour the surface of the membranes and remove accumulated solids from within the membrane module. Preferably, the bubbles are injected and mixed into the liquid flow.

Preferably, the membranes of the membrane bioreactor comprise porous hollow fibers, the fibers being fixed at each end in a header, the lower header having one or more holes formed therein through which gas liquid flow is introduced. The holes can be circular, elliptical or in the form of a slot. The fibers are normally sealed at the lower end and open at their upper end to allow removal of filtrate, however, in some arrangements, the fibers can be open at both ends to allow removal of filtrate from one or both ends. The fibers are preferably arranged in cylindrical arrays or bundles, however other configurations can also be employed, e.g., square, hexagonal, triangular, irregular, and the like. It will be appreciated that the cleaning process described is equally applicable to other forms of membrane such flat or plate membranes that can also be employed in membrane bioreactors.

The membrane modules employed in the membrane bioreactor preferably comprise a plurality of porous hollow fiber membranes, the fiber membranes being arranged in close proximity to one another and mounted to prevent excessive movement therebetween, the fiber membranes being fixed at each end in a header, one header having one or more of holes formed therein through which gas/liquid flow is introduced, and partition means extending at least part way between the headers to partition the membrane fibers into groups. Preferably, the partition or partitions are formed by a spacing between respective fiber groups, however porous (e.g., a screen, clip, or ring) or solid partitions can also be employed. The partitions can be parallel to each other or, in the case of cylindrical arrays of fiber membranes, the partitions can extend radially from the center of the array or be positioned concentrically within the cylindrical array. In an alternative form, the fiber bundle can be provided with a central longitudinal passage extending the length of the bundle between the headers.

The membrane modules employed in a membrane bioreactor preferably include a plurality of porous hollow membrane fibers extending longitudinally between and mounted at each end to a respective potting head, the membrane fibers being arranged in close proximity to one another and mounted to prevent excessive movement therebetween, the fibers being partitioned into a number of bundles at least at or adjacent to their respective potting head so as to form a space therebetween, one of the potting heads having an array of aeration openings formed therein for providing gas bubbles within the module such that, in use, the bubbles move past the surfaces of the membrane fibers to dislodge fouling materials therefrom.

The fiber bundle can be protected and fiber movement can be limited by a module support screen which has both vertical and horizontal elements appropriately spaced to provide unrestricted fluid and gas flow through the fibers and to restrict the amplitude of fiber motion reducing energy concentration at the potted ends of the fibers. Alternatively, clips or rings can also be employed to bind the fiber bundle.

Preferably, the aeration openings are positioned to coincide with the spaces formed between the partitioned bundles. Preferably, the openings comprise one or more holes or slots, which can be arranged in various configurations, e.g., a row of holes. Preferably, the fiber bundles are located in the potting head between the slots or rows of holes. In certain embodiments, it can be preferred to situate the holes or slots within the fiber bundles, or both within and adjacent to the fiber bundles.

Preferably, the gas bubbles are entrained or mixed with a liquid flow before being fed through the holes or slots, though it will be appreciated that gas only can be used in some configurations. The liquid used can be the feed to the membrane module. The fibers and/or fiber bundles can cross over one another between the potting heads though it is desirable that they do not.

Typically, the fibers within the module have a packing density (as defined above) of from about 5% or less to about 75% or more, preferably from about 6, 7, 8, 9, or 10% to about 60, 65, or 70%, and more preferably from about 11, 12, 13, 14, 15, 16, 17, 18, 19, or 20% to about 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, or 55%.

Preferably, the holes have a diameter of from about 0.5 mm or less to about 50 mm or more, more preferably from about 0.6, 0.7, 0.8, 0.9, 1.0, 1.1, 1.2, 1.3, 1.4, or 1.5 to about 25, 30, 35, 40, or 45 mm, and most preferably from about 1.75, 2.0, 2.5, 3.0, 3.5, 4.0, 4.5, or 5.0 mm to about 6, 7, 8, 9, 10, 11, 12, 13, 14, 15, 16, 17, 18, 19, 20, 21, 22, 23, or 24 mm. In the case of a slot or row of holes, the open area is chosen to be equivalent to that of the above holes.

Typically, the fiber inner is from about 0.05 mm or less to about 10 mm or more, preferably from about 0.10, 0.15, or 0.20 mm to about 3, 4, 5, 6, 7, 8, or 9 mm, and preferably from about 0.25, 0.50, 0.75, or 1.0 mm to about 1.25, 1.50, 1.75, 2.00, or 2.50 mm. The fibers wall thickness can depend on materials used and strength required versus filtration efficiency. Typically, wall thickness is from about 0.01 mm or less to about 3 mm or more, preferably from about 0.02, 0.03, 0.04, 0.05, 0.06, 0.07, 0.08, or 0.09 mm to about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, or 2.9 mm, and most preferably from about 0.1, 0.2, 0.3, 0.4, or 0.5 mm to about 0.6, 0.7, 0.8, 0.9, or 1 mm.

The membrane bioreactor can include a tank having a line, a pipe, a pump, and or other apparatus for the introduction of feed thereto, an activated sludge within the tank, a membrane module positioned within the tank so as to be immersed in the sludge, and apparatus for withdrawing filtrate from at least one end of the fiber membranes.

The membrane bioreactor is preferably operated by introducing feed to the tank, applying a vacuum to the fibers to withdraw filtrate therefrom while intermittently, cyclically, or continuously supplying gas bubbles through the aeration openings to within the module such that, in use, the bubbles move past the surfaces of the membrane fibers to dislodge fouling materials therefrom. Preferably, the gas bubbles are entrained or mixed with a liquid flow when fed through the holes or slots.

If desired, a further source of aeration can be provided within the tank to assist microorganism activity. Preferably, the membrane module is suspended vertically within the tank and the further source of aeration can be provided beneath the suspended module. Alternatively, the module can be suspended horizontally, or in any other desired position. Preferably, the further source of aeration comprises a group of air permeable tubes or other such aeration source. The membrane module can be operated with or without backwash, depending on the flux. A high mixed liquor of suspended solids (about 5,000 ppm or less to about 20,000 ppm or more) in the bioreactor has been shown to significantly reduce residence time and improve filtrate quality. The combined use of aeration for both degradation of organic substances and membrane cleaning has been shown to enable constant filtrate flow without significant increases in transmembrane pressure while establishing, high concentration of MLSS. The use of partitioned fiber bundles enables higher packing densities to be achieved without significantly compromising the gas scouring process. This provides for-higher filtration efficiencies to be gained.

Figure 4:
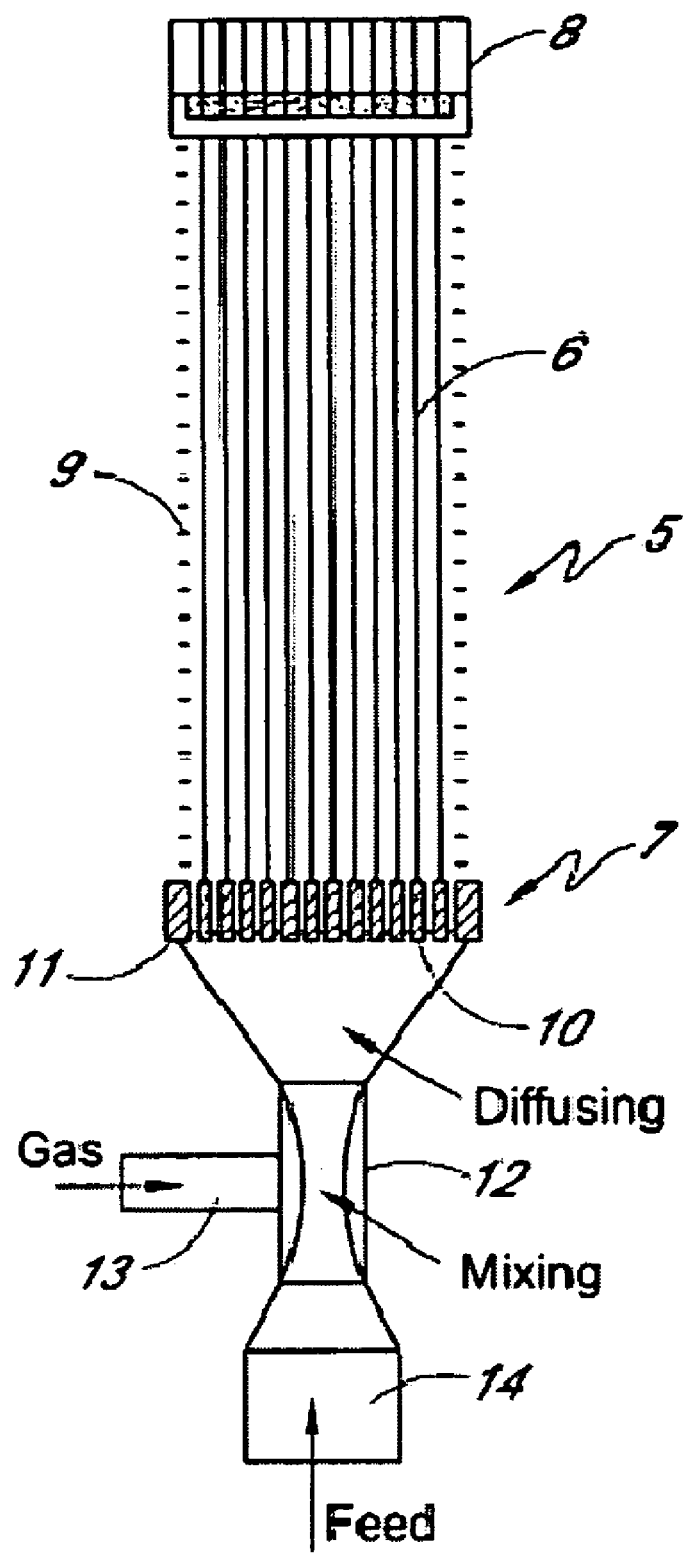
FIG. 4 shows a schematic side elevation of one embodiment of a membrane module and illustrates the method of cleaning in a membrane bioreactor employed in the filtration apparatus of a preferred embodiment.

In a particularly preferred embodiment, a module as described in U.S. Pat. No. 6,555,005 is employed in the membrane bioreactor. Referring to FIG. 4, the membrane module 5 typically comprises fiber, tubular, or flat sheet form membranes 6 potted at two ends 7 and 8 and optionally encased in a support structure, in this case a screen 9. Either one or both ends of the membranes can be used for the permeate collection. The bottom of the membrane module has a number of through apertures 10 in the pot 11 to distribute a mixture of gas and liquid feed past the membrane surfaces. A venturi device 12 or the like is connected to the base of the module. The venturi device 12 intakes gas through inlet 13, mixes or entrains the gas with liquid flowing through feed inlet 14, forms gas bubbles and diffuses the liquid/gas mix into the module apertures 10. After passing through the distribution apertures 10, the entrained gas bubbles scrub membrane surfaces while traveling upwards along with the liquid flow. Either the liquid feed or the gas can be a continuous or intermittent injection depending on the system requirements. With a venturi device it is possible to create gas bubbles and aerate the system without a blower. The venturi device 12 can be a venturi tube, jet, nozzle, ejector, eductor, injector, or the like.

Figure 5:
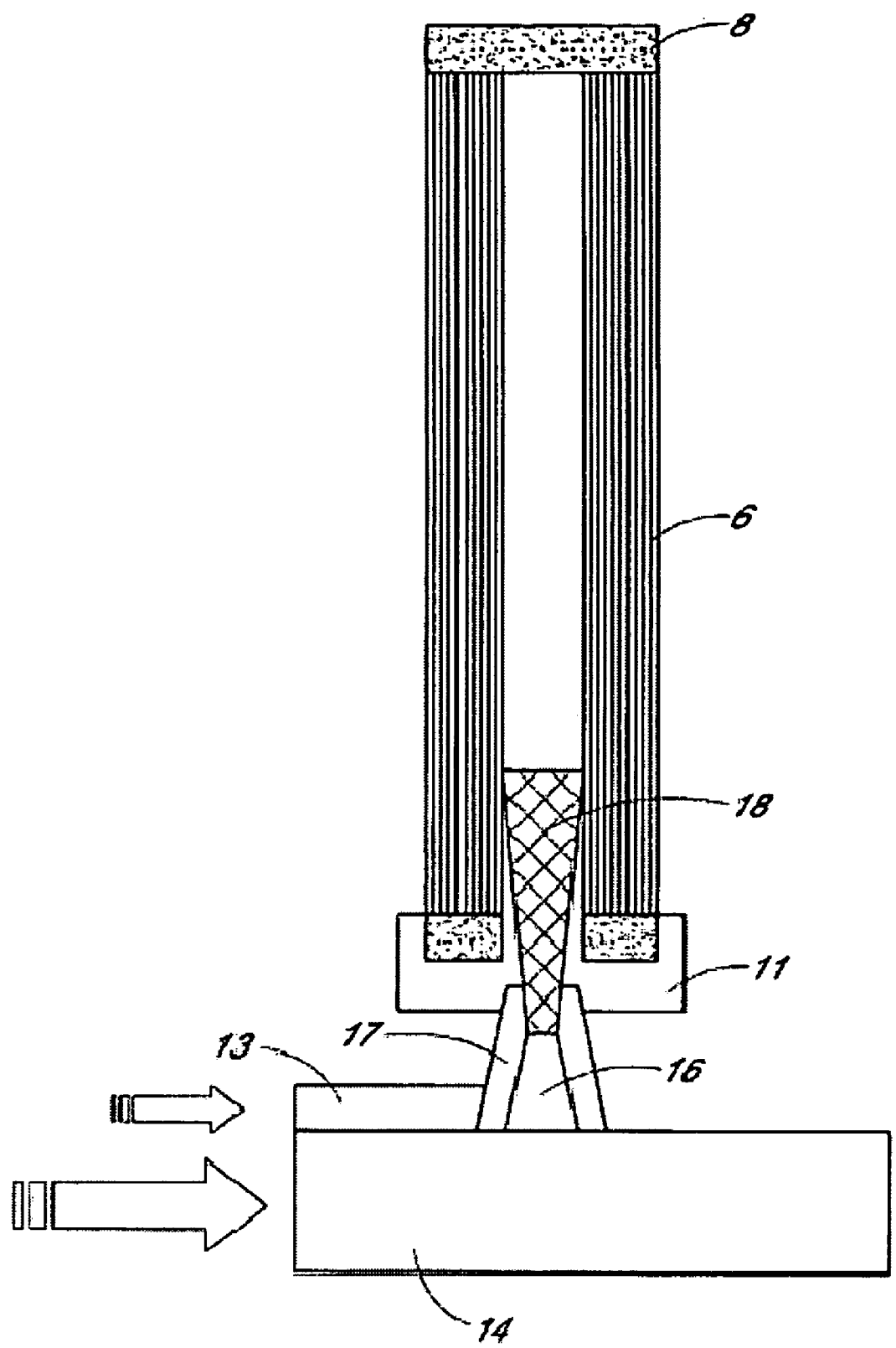
FIG. 5 shows an enlarged schematic side elevation of one form of the jet type arrangement used to form entrained gas bubbles of a membrane bioreactor employed in the filtration apparatus of a preferred embodiment.

Referring to FIG. 5, an enlarged view of jet or nozzle type device 15 is shown. In this embodiment, liquid is forced through a jet 16 having a surrounding air passage 17 to produce a gas entrained liquid flow 18. Such a device allows the independent control of gas and liquid medium—by adjusting respective supply valves.

The liquid commonly used to entrain the gas is the feed water, wastewater, or mixed liquor to be filtered. Pumping such an operating liquid through a venturi or the like creates a vacuum to suck the gas into the liquid, or reduces the gas discharge pressure when a blower is used. By providing the gas in a flow of the liquid, the possibility of blockage of the distribution apertures 10 is substantially reduced.

By using a venturi device or the like it is possible to generate gas bubbles to scrub membrane surfaces without the need for a pressurized gas supply such as a blower. When a motive fluid passes through a venturi it generates a vacuum to draw the gas into the liquid flow and generate gas bubbles therein. Even if a blower is still required, the use of the above process reduces the discharge pressure of the blower and therefore lowers the cost of operation. The liquid and gas phases are well mixed in the venturi and then diffuse into the membrane module to scrub the membranes. Where a jet type device is used to forcibly mix the gas into the liquid medium, an additional advantage is provided in that a higher velocity of bubble stream is produced. In treatment of wastewater, such thorough mixing provides excellent oxygen transfer when the gas used is air or oxygen. If the gas is directly injected into a pipe filled with a liquid, it is impossible that the gas will form a stagnant gas layer on the pipe wall and therefore gas and liquid will bypass into different parts of a module, resulting in poor cleaning efficiency. The flow of gas bubbles is enhanced by the liquid flow along the membrane resulting in a large scrubbing shear force being generated. This method of delivery of gas/liquid provides a positive fluid transfer and aeration with the ability to independently adjust flow rates of gas and liquid. The injection of a mixture of two-phase fluid (gas/liquid) into the holes of the air distribution device can eliminate the formation of dehydrated solids and therefore prevent the gradual blockage of the holes by such dehydrated solids. The injection arrangement further provides an efficient cleaning mechanism for introducing cleaning chemicals effectively into the depths of the module while providing scouring energy to enhance chemical cleaning. This arrangement, in combination with the high packing density obtainable with the module configuration described, enables the fibers to be effectively cleaned with a minimal amount of chemicals. The module configuration described allows a higher fiber packing density in a module without significantly increasing solid packing. This adds an additional flexibility that the membrane modules can be either integrated into the aerobic basin or arranged in a separate tank. In the latter arrangement, the advantage is a significant saving on chemical usage due to the small chemical holding in the tank and in labor costs because the chemical cleaning process can be automated. The reduction in chemicals used is also important because the chemicals, which can be fed back to the bio process, are still aggressive oxidizers and therefore can have a deleterious effect on bio process. Accordingly, any reduction in the chemical load present in the bio-process provides significant advantages.

The positive injection of a mixture of gas and liquid feed to each membrane module provides a uniform distribution of process fluid around membranes and therefore minimizes the feed concentration polarization during filtration. The concentration polarization is greater in a large-scale system and for the process feed containing large amounts of suspended solids. The prior art systems have poor uniformity because the process fluid often enters one end of the tank and concentrates as it moves across the modules. The result is that some modules must deal with much higher concentrations than others, resulting in inefficient operation. The filtration efficiency is enhanced due to a reduced filtration resistance. The feed side resistance is decreased due to a reduced transverse flow passage to the membrane surfaces and the turbulence generated by the gas bubbles and the two-phase flow. Such a cleaning method can be used to the treatment of drinking water, wastewater, and the related processes by membranes. The filtration process can be driven by suction or pressurization.

Referring to FIGS. 6 to 7, embodiments of various partitioning arrangements are shown. Again these embodiments are illustrated with respect to cylindrical tubular or fiber membrane bundles 20, however, it will be appreciated that other configurations can be employed. FIGS. 6a and 6b show a bundle of tubular membranes 20 partitioned vertically into several thin slices 21 by a number of parallel partition spaces 22. This partitioning of the bundle enables accumulated solids to be removed more easily without significant loss of packing density. Such partitioning can be achieved during the potting process to form complete partitions or partial partitions. Another method of forming a partitioned module is to pot several small tubular membrane bundles 23 into each module as shown in FIGS. 7a and 7b.

Another configuration of membrane module is illustrated in FIGS. 8a and 8b. The central membrane-free zone forms a passage 24 to allow for more air and liquid injection. The gas bubbles and liquid then travel along the tubular membranes 20 and pass out through arrays of fibers at the top potted head 8, scouring and removing solids from membrane walls. A single gas or a mixture of gas/liquid can be injected into the module.

Figure 9A:
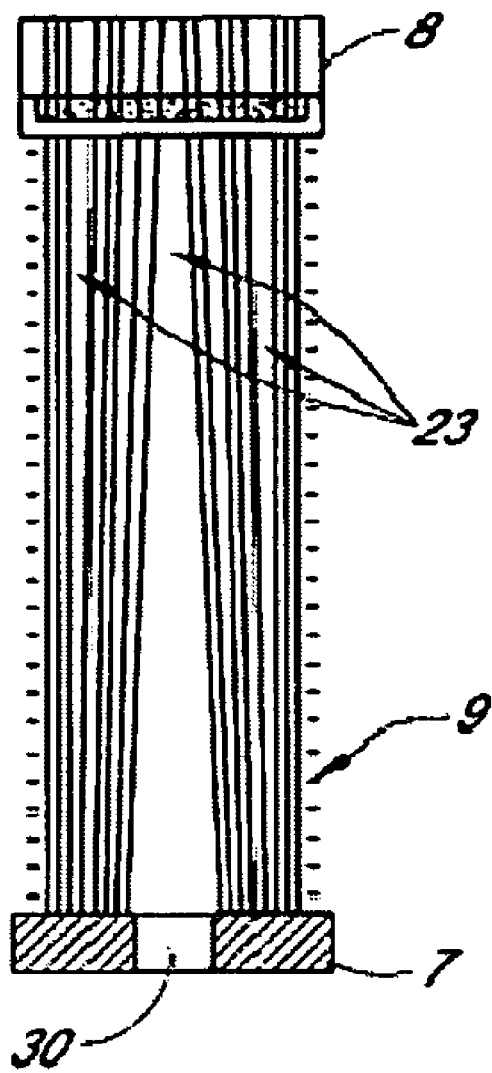
FIG. 9a shows a schematic side elevation of a partitioned membrane module of a membrane bioreactor employed in the filtration apparatus of a preferred embodiment.
Figure 9B:
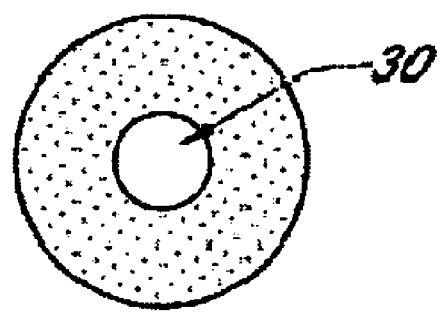

FIGS. 9a and 9b illustrate yet a further embodiment similar to FIG. 5 but with single central hole 30 in the lower pot 7 for admission of the cleaning liquid/gas mixture to the fiber membranes 20. In this embodiment, the fibers are spread adjacent the hole 30 and converge in discrete bundles 23 toward the top pot 8. The large central hole 30 has been found to provide greater liquid flow around the fibers and thus improved cleaning efficiency.

Figure 10:
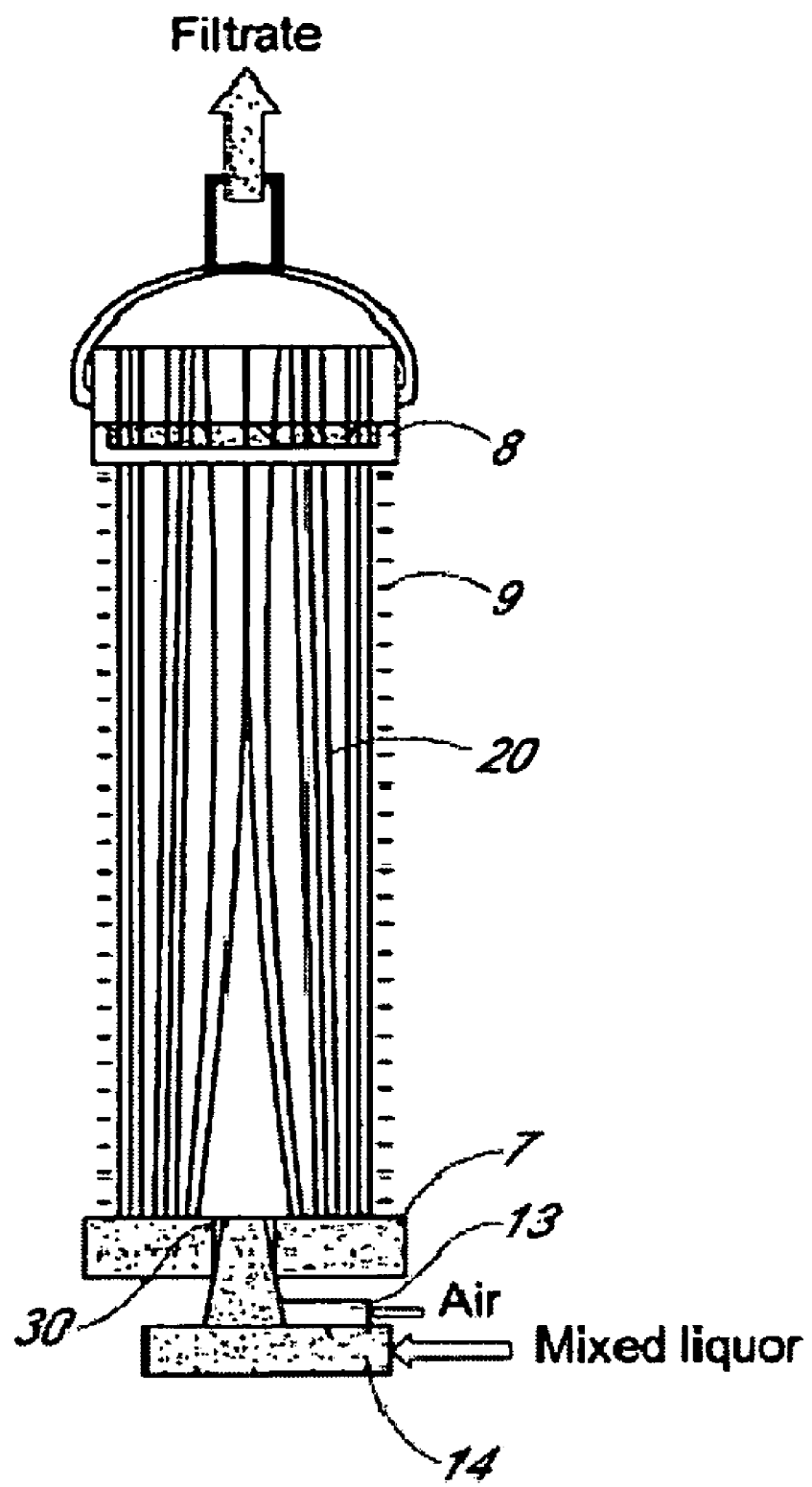
FIG. 10 shows a similar view to FIG. 9 of a membrane module.
Figure 11:
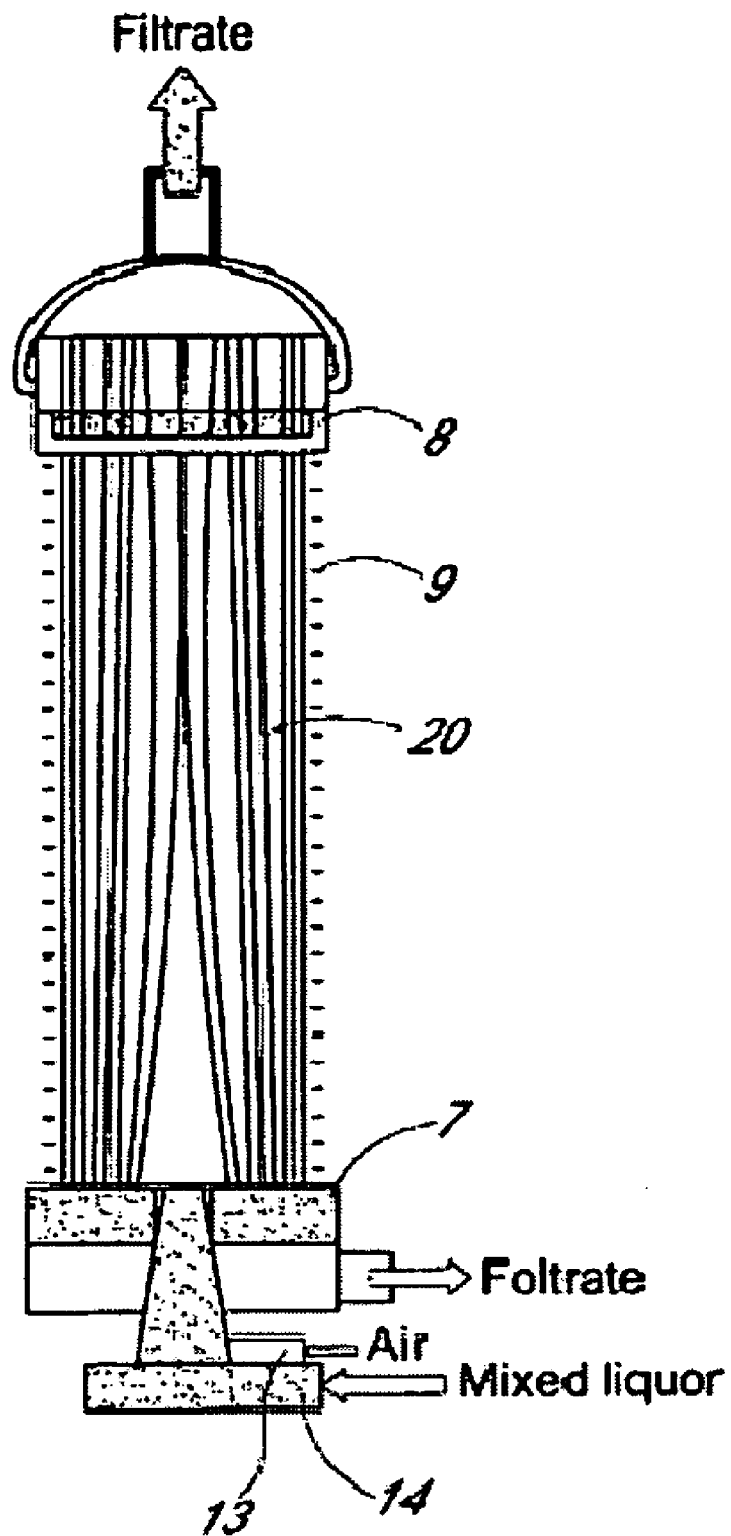
FIG. 11 shows a similar view to FIG. 9 of a membrane module.

FIGS. 10 and 11 show further embodiments of the invention having a similar membrane configuration to that of FIGS. 9a and 9b and jet mixing system similar to that of the embodiment of FIG. 5. The use of a single central hole 30 allows filtrate to drawn off from the fibers 20 at both ends as shown in FIG. 11.

Figure 12:
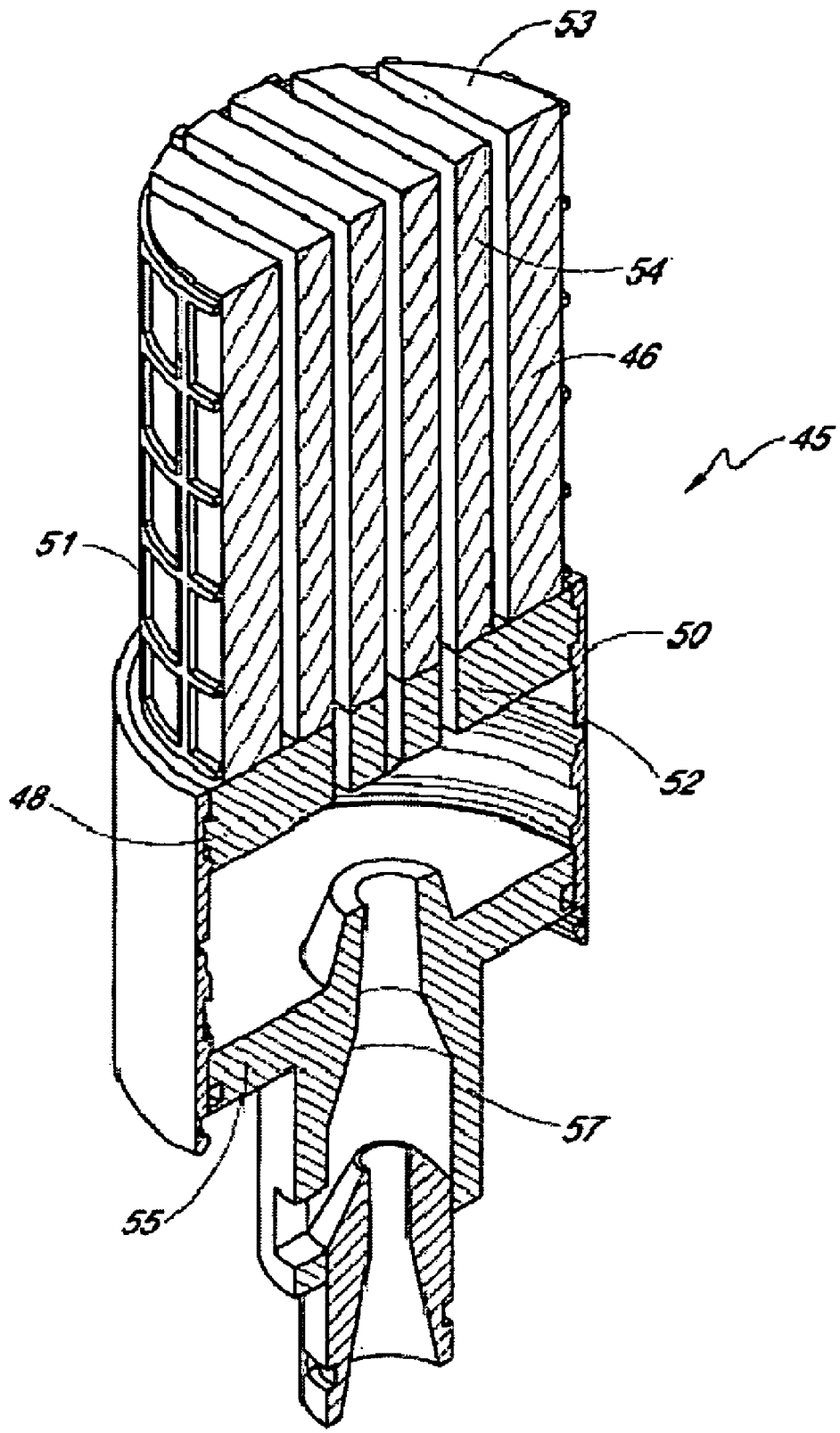
FIG. 12 shows a sectioned perspective pictorial view of the lower end of another preferred embodiment of the membrane module of a membrane bioreactor employed in the filtration apparatus of a preferred embodiment.
Figure 13:
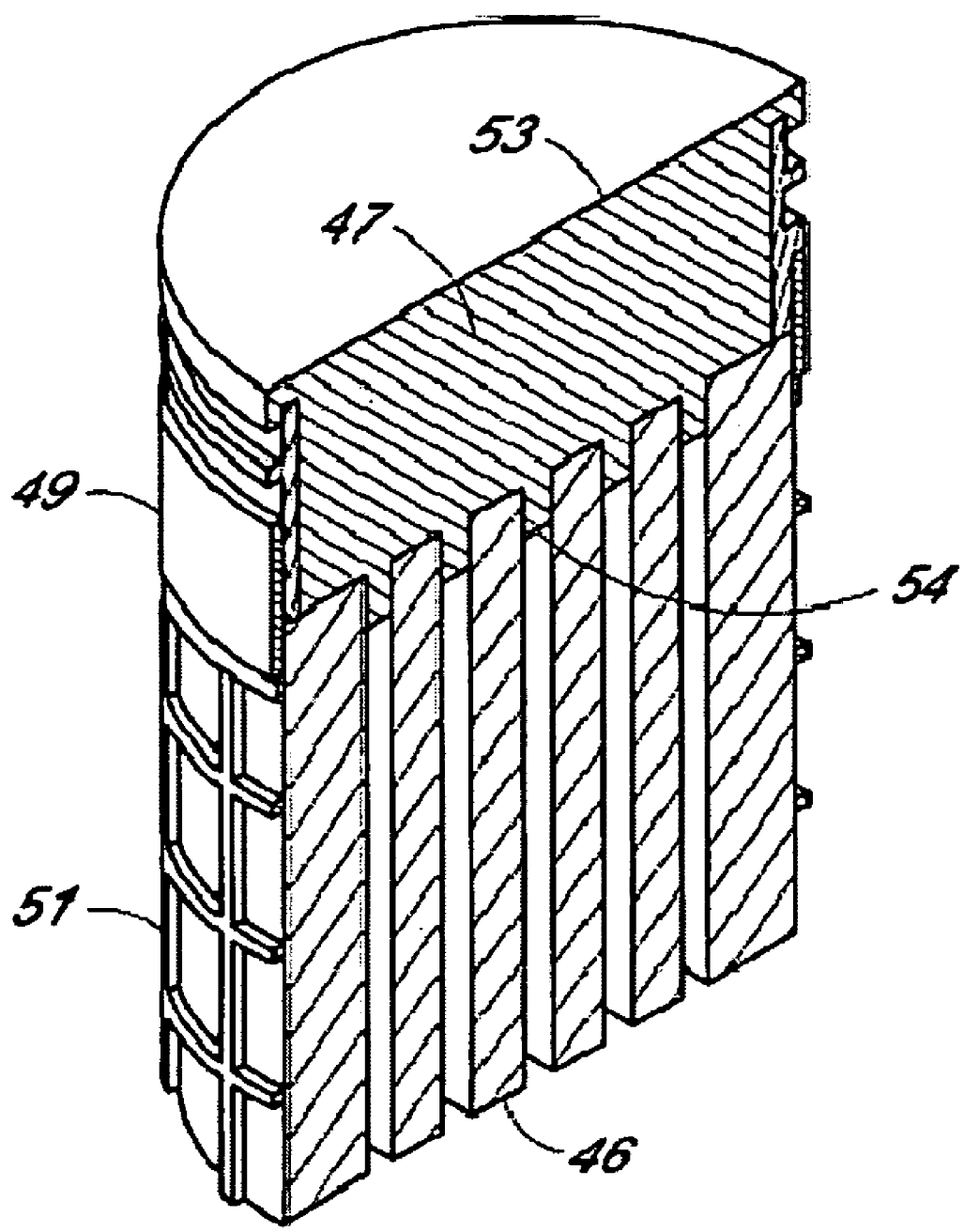
FIG. 13 shows a sectioned perspective pictorial view of the upper end of the membrane module of FIG. 12.

Referring to FIGS. 12 and 13 of the drawings, the module 45 comprises a plurality of hollow fiber membrane bundles 46 mounted in and extending between an upper 47 and lower potting head 8. The potting heads 47 and 48 are mounted in respective potting sleeves 49 and 50 for attachment to appropriate manifolding (not shown). The fiber bundles 46 are surrounded by a screen 51 to prevent excessive movement between the fibers.

As shown in FIG. 12, the lower potting head 48 is provided with a number of parallel arranged slot type aeration holes 52. The fiber membranes 53 are potted in bundles 46 to form a partitioned arrangement having spaces 54 extending transverse of the fiber bundles. The aeration holes 52 are positioned to generally coincide with the partition spaces, though there is generally a number of aeration holes associated with each space.

The lower potting sleeve 50 forms a cavity 55 below the lower pot 48. A gas or a mixture of liquid and gas is injected into this cavity 55, by a jet assembly 57 (described earlier) before passing through the holes 52 into the membrane array.

In use, the use of partitioning enables a high energy flow of scouring gas and liquid mixture, particularly near the pot ends of the fiber bundles, which assist with removal of buildup of accumulated solids around the membrane fibers.

Air is preferably introduced into the module continuously to provide oxygen for microorganism activities and to continuously scour the membranes. Alternatively, in some embodiments, pure oxygen or other gas mixtures can be used instead of air. The clean filtrate is drawn out of the membranes by a suction pump attached to the membrane lumens that pass through the upper pot, or the filtrate can be drawn out of the membranes from the lower pot by gravity or suction pump.

Preferably, the membrane module is operated under low transmembrane pressure (TMP) conditions due to the high concentration of mixed liquor suspended solids (MLSS) present in the reactor. Higher transmembrane pressure can advantageously be employed for reduced concentrations of suspended solids.

The membrane bioreactor is preferably combined with an anaerobic process that assists with further removal of nutrients from the feed sewage. It has been found that the module system of preferred embodiments is more tolerant of high MLSS than many other systems and the efficient air scrub and back wash (when used) assists efficient operation and performance of the bioreactor module.

Figure 14:
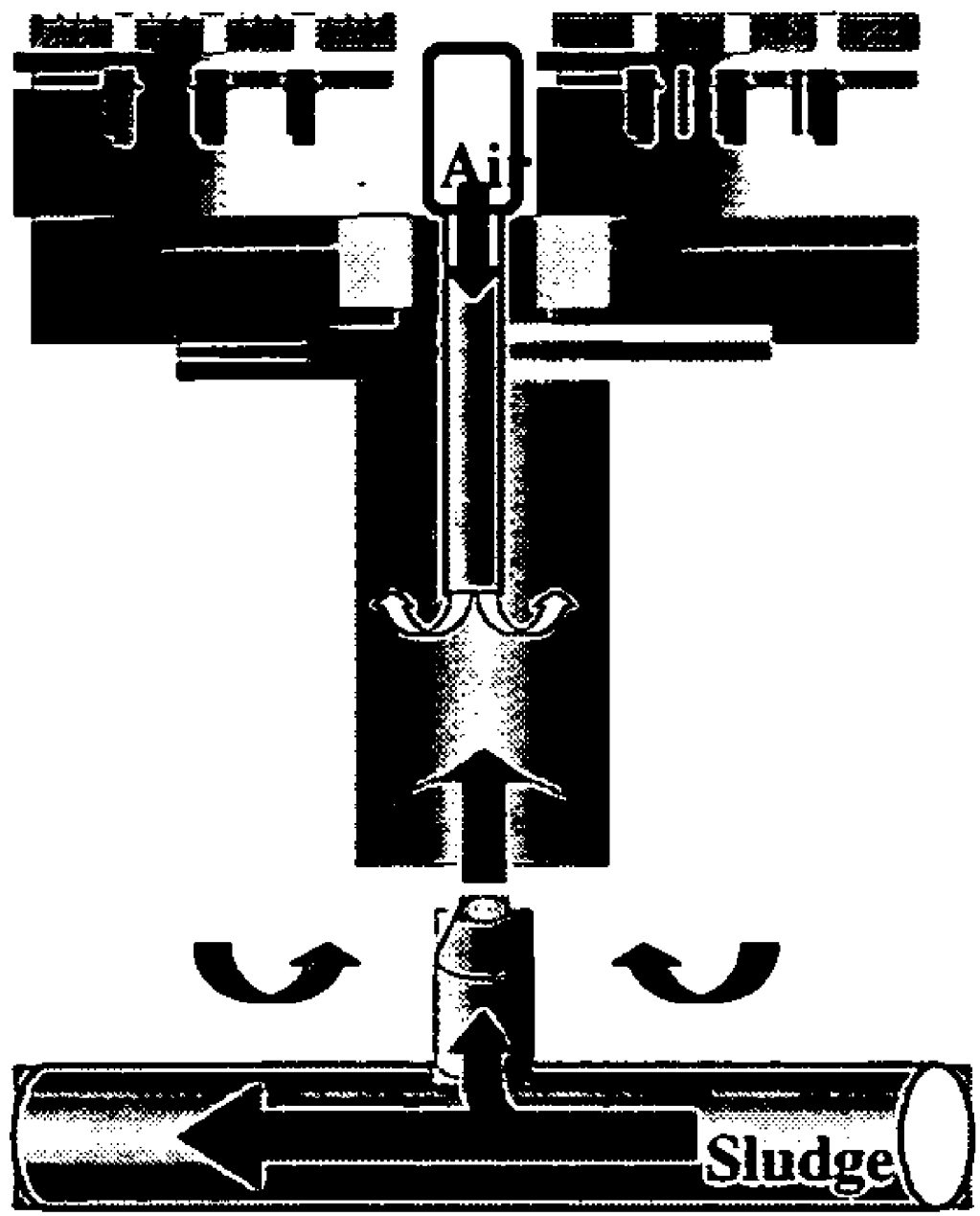
FIG. 14 depicts a hollow fiber membrane module employed in a membrane bioreactor employed in the filtration apparatus of a preferred embodiment.

Any suitable membrane bioreactor can be employed in the water treatment systems of the preferred embodiments. A particularly preferred membrane bioreactor system is designed to draw filtrate from a reservoir of liquid substrate by the use of vertically oriented microporous hollow fibers immersed within the substrate, as illustrated in FIG. 14. FIG. 14 depicts a side view of a so-called "cloverleaf" filtration unit comprising four sub-modules. A plurality of such filtration units in a linear "rack" is immersed in a substrate reservoir.

Any suitable substrate can be filtered using the methods and apparatus of the preferred embodiments. Suitable substrates include, but are not limited to, ground water, river water, drinking water, organic-containing substrates such as sewage, agricultural run-off, industrial process water, and the like. While water-containing substrates are particularly amenable to the methods and apparatus described herein, substrates containing other liquids can also be filtered (e.g., ethanol, or other chemicals).

The illustrated membrane bioreactor filtration unit includes a filtrate sub-manifold (not shown) and an air/liquid substrate sub-manifold, which receive the upper and lower ends, respectively, of the four sub-modules. Each sub-manifold includes four circular fittings or receiving areas, each of which receives an end of one of the sub-modules. Each sub-module is structurally defined by a top cylindrical pot (not shown), a bottom cylindrical pot, and a cage (not shown) connected therebetween to secure the fibers. The pots secure the ends of the hollow fibers and are formed of a resinous or polymeric material. The ends of the cage are fixed to the outer surfaces of the pots. Each pot and associated end of the cage are together received within one of the four circular fittings of each sub-manifold. The sub-manifolds and pots of the sub-modules are coupled together in a fluid-tight relationship with the aid of circular clips and O-ring seals. The cage provides structural connection between the pots of each sub-module.

Each sub-module includes fibers arranged vertically between its top and bottom pot. The fibers have a length somewhat longer than the distance between the pots, such that the fibers can move laterally. The cage closely surrounds the fibers of the sub-module so that, in operation, the outer fibers touch the cage, and lateral movement of the fibers is restricted by the cage. The lumens of the lower ends of the fibers are sealed within the bottom pot, while the upper ends of the fibers are not sealed. In other words, the lumens of the fibers are open to the inside of the filtrate sub-manifold above the upper face of the top pot. The bottom pot includes a plurality of slots extending from its lower face to its upper face, so that the mixture of air bubbles and liquid substrate in the air/liquid substrate sub-manifold can flow upward through the bottom pot to be discharged between the lower ends of the fibers.

The filtrate sub-manifold is connected to a vertically oriented filtrate withdrawal tube that in turn connects to a filtrate manifold (not shown) that receives filtrate from all of the filtration units (such as the illustrated cloverleaf unit) of a rack. The filtrate withdrawal tube is in fluid communication with the upper faces of the top pots of the sub-modules, so that filtrate can be removed through the withdrawal tube. In addition, the system includes an air line that provides air to the air/liquid substrate sub-module skirt, as depicted in FIG. 14.

In operation, the cages of the sub-modules admit the liquid substrate into the region of the hollow fibers, between the top and bottom pots. A pump (not shown) is utilized to apply suction to the filtrate manifold and, thus, the filtrate withdrawal tubes and fiber lumens of the sub-modules. This creates a pressure differential across the walls of the fibers, causing filtrate to pass from the substrate into the lumens of the fibers. The filtrate flows upward through the fiber lumens into the filtrate sub-manifold, through the filtrate withdrawal tube, and upward into the filtrate manifold to be collected outside of the reservoir.

During filtration, particulate matter accumulates on the outer surfaces of the fibers. As increasing amounts of particulate matter stick to the fibers, it is necessary to increase the pressure differential across the fiber walls to generate sufficient filtrate flow. To maintain cleanliness of the outer surfaces of the fibers, air and liquid substrate are mixed in the skirt of the air/liquid substrate sub-module and the mixture is then distributed into the fiber bundles through the slots of the bottom pots and is discharged as a bubble-containing mixture from the upper faces of the bottom pots. Continuous, intermittent, or cyclic aeration can be conducted. It is particularly preferred to conduct cyclic aeration, wherein the air on and air off times are of equal length, and the total cycle time (time of one air on and one air off period), is from about 1 second or less to about 15 minutes or more, preferably from about 2, 3, 4, 5, 6, 7, 8, 9, 10, 11, 12, 13, or 14 second to about 6, 7, 8, 9, 10, 11, 12, 13, or 14 minutes, and more preferably from about 15, 20, 25, 30, 35, 40, 45, 50, 55, 60, 65, 70, 75, 80, 85, 90, 95, 100, 105, 110, 115, or 120 seconds to about 130, 140, 150, 160, 170, 180, 190, 200, 210, 220, 230, 240, 250, 260, 270, 280, 290, or 300 seconds. The rising bubbles scour (i.e., clean particulate matter from) the fiber surfaces. Aeration wherein the air is provided in uniform bubble sizes can be provided, or a combination of different bubble sizes can be employed, for example, coarse bubbles or fine bubbles, simultaneously or alternately. Regular or irregular cycles (in which the air on and air off times vary) can be employed, as can sinusoidal, triangular, or other types of cycles, wherein the rate of air is not varied in a discontinuous fashion, but rather in a gradual fashion, at a preferred rate or varying rate. Different cycle parameters can be combined and varied, as suitable.

In a particularly preferred embodiment, fine bubbles are continuously provided to the membrane bioreactor for aeration, while coarse bubbles are provided cyclically for scouring. Bubbles are typically from about 0.1 or less to about 50 mm or more in diameter. Bubbles from about 0.1 to about 3.0 mm in diameter, preferably from about 0.2, 0.3, 0.4, 0.5, 0.6, 0.7, 0.9, 0.9, or 1.0 mm to about 1.25, 1.50, 1.75, 2.00, 2.25, 2.50 or 2.75 mm in diameter are particularly effective in providing oxygen to the bioreactor. Bubbles of from about 20 to about 50 mm in diameter, preferably from about 25, 30, or 35 to about 40 or 45 mm in diameter, are particularly effective in scouring the membranes. Bubbles of from about 3 to about 20 mm in diameter, preferably from about 4, 5, 6, 7, 8, 9, or 10 mm to about 11, 12, 13, 14, 15, 16, 17, 18, or 19 mm in diameter, are generally preferred as providing both acceptable oxygenation and scouring.

Offline Treatment Vessel

Another of the components of the water treatment systems of preferred embodiments is an offline treatment vessel. In preferred embodiments, the water treatment system includes an offline treatment vessel used in conjunction with an membrane bioreactor in an internal recycle configuration; permeate from the top of the membrane bioreactor is conducted away from the system as treated effluent, while a portion of the biomass (sludge) settling at the bottom of the membrane bioreactor is returned to the offline treatment vessel, thereby substantially increasing the efficiency of the digestion processes. Optionally, the sludge from the membrane bioreactor is passed through one or more screens and/or one or more hydrocyclones to remove inert content prior to its return to the offline treatment vessel.

The offline treatment vessel comprises a single treatment vessel into which microscopic gaseous bubbles are introduced to create as many as three different biological environments in discrete, stratified zones. In preferred embodiments, bubbles of air are introduced at the bottom of the vessel, creating an aerobic zone in this vicinity. Depletion of oxygen by microorganisms resident in the aerobic zone creates an anoxic region that drifts upward, establishing itself above the aerobic layer. The two layers remain segregated due to the intolerance of aerobic microorganisms for the overlying anoxic environment, with the sharpness of the interface depending on the degree of intolerance. If the anoxic zone is populated by denitrifying microorganisms, which are ideally suited to such a zone, their production of gaseous or dissolved nitrogen creates an overlying anaerobic zone substantially or fully depleted of oxygen, nitrates and nitrites; in addition, under quiescent (i.e., limited mixing) conditions, the dissolved nitrogen gas forms an insulation layer between anaerobic and anoxic zones, thereby contributing to segregation of these zones. Molecular diffusion among zones is sufficient to keep all zones supplied with nutrient and prevent accumulation of dissolved byproducts despite the absence of mechanical mixing.

Equipment for generating bubbles suitable for use in connection with the offline treatment vessel is described in U.S. Pat. No. 5,316,682, the entire disclosure of which is hereby incorporated by reference. Such equipment avoids undesirable turbulent conditions. Quiescent conditions can promote formation of a beneficial covering layer of biological solids. Controlled introduction of suitable bubbles into waste liquids comprising a combination of microorganisms that require mutually antagonistic environments can result in their simultaneous accommodation; ideally, these waste-digestive microorganisms include aerobic, anoxic, and anaerobic varieties. (As used herein, the term "waste-digestive microorganism" refers to any self-sustaining microscopic organism, such as bacteria or protozoa, capable of digesting organic waste components into mineral or gaseous products.)

Thus, the offline treatment vessel employs multiple discrete zones of environmentally incompatible waste-digestive microorganisms in a single vessel. Apparatus (e.g., a computer or circuitry) for automatically controlling certain critical parameters in the offline treatment vessel are provided so as to maintain a target level of at least one biological indicator. This indicator is selected in accordance with the type of waste being treated. Generally, the indicator is at least one of ammonia level; soluble nitrate level; soluble nitrite level; and oxidation-reduction potential (ORP). The latter indicator measures, on an arbitrary scale, the electromotive position of the bulk waste liquid. Key controlled parameters include the gas (generally air) content of the bulk liquid and the degree of turbulence.

The offline treatment vessel is preferably employed with a membrane bioreactor in an internal recycle configuration. In certain embodiments, additional processing apparatus can be employed in the recycle configuration, including, but not limited to, clarifiers, aeration basins, screens and separators, chemical treatment apparatus, and the like.

The offline treatment vessel is preferably employed in combination with a removal subsystem including a hydrocyclone in an internal recycle configuration. Permeate from the top of the membrane bioreactor is conducted away from the system as treated effluent, carrying soluble mineral residues, while most or all of the biomass (sludge) settling at the bottom of the membrane bioreactor is returned to the offline treatment vessel through a hydrocyclone and screen arrangement to remove inert content. Removal of inert content using the screen/cyclone combination substantially increases the efficiency of biological waste-digestion processes (including, but by no means limited to, those utilizing the multiple-zone system of the present invention).

Figure 2:
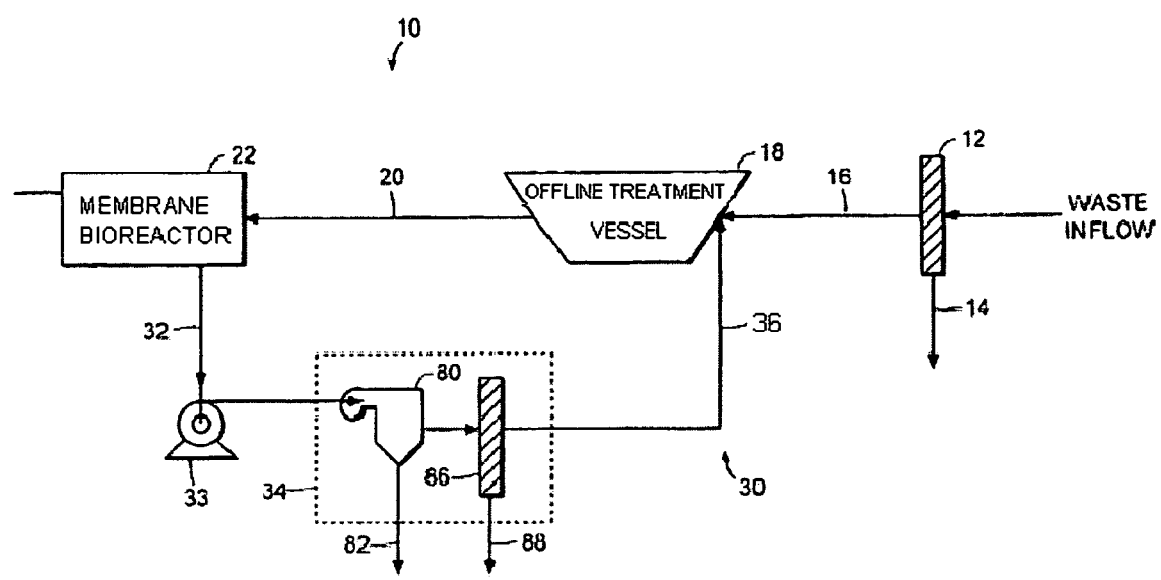
FIG. 2 shows a drawing of a filtration apparatus configuration of a preferred embodiment, employing a membrane bioreactor, two screens, a hydrocyclone, and an offline treatment vessel.

Referring to FIG. 2, which illustrates a system of a preferred embodiment, waste inflow first encounters an optional screen 12 having an opening size of from about 6 mm or less to about 25 mm or more the large items of trash accumulating on the receiving face of screen 12 are periodically removed, as indicated by the arrow 14. The screened liquid is conducted along a conduit 16 to the offline treatment vessel 18, where waste-digestive organisms are allowed to digest its biodegradable components. Preferably, the waste liquid contains at least two different forms of waste-digestive microorganism each requiring a different chemical environment for survival or at least optimum performance. The different forms of microorganism can also be complementary in the sense that each degrades a different type of waste. If the waste liquid lacks a desirable form of digestive organism, this can be introduced directly into offline treatment vessel 18.

After a start-up period that depends on the concentration of digestible waste in the influent stream, the mixed liquor is continuously conducted from the offline treatment vessel 18 over a conduit 20 to a membrane bioreactor 22, where filtration takes place, as new influent reaches offline treatment vessel 18 via conduit 16. Biological solids (so-called "activated sludge") are continuously withdrawn from an outlet point near the bottom of the membrane bioreactor 22 and recycled to the offline treatment vessel 18 via an internal recycle loop 30, while permeate is continuously or periodically withdrawn, and mixed liquor is periodically withdrawn or allowed to overflow from an outlet point near the top of the membrane bioreactor 22, thereby maintaining a suitable concentration of biosolids within the system.

Recycle loop 30 comprises a first conduit 32 leading from membrane bioreactor 22 to a pump 33, which conveys activated sludge to a removal subsystem 34 and a second conduit 36 leading back to is the head of offline treatment vessel 18. The removal subsystem 34, comprising a screen, optional surge tank (not depicted), and hydrocyclone, is designed to remove inert and nondegradable materials from the biosolids return stream, thereby improving the efficiency of waste treatment.

This general system configuration is suitable for use with an offline treatment vessel 18 configured for multi-zone waste treatment, as described immediately below; however, because of the general utility of removal subsystem 34, it can also be employed with entirely conventional (i.e., single-zone) treatment processes. Similarly, the utility of multi-zone treatment is not limited to recycle configurations that include a removal system in accordance herewith.

In certain embodiments, the offline treatment vessel can be a sidestream reactor. In such embodiments, the main wastewater flow is not directed to the sidestream reactor tank. Instead, it flows to the membrane bioreactor activated sludge tank following any headworks pretreatment steps, such as screening, grit removal, and the like.

Figure 3:
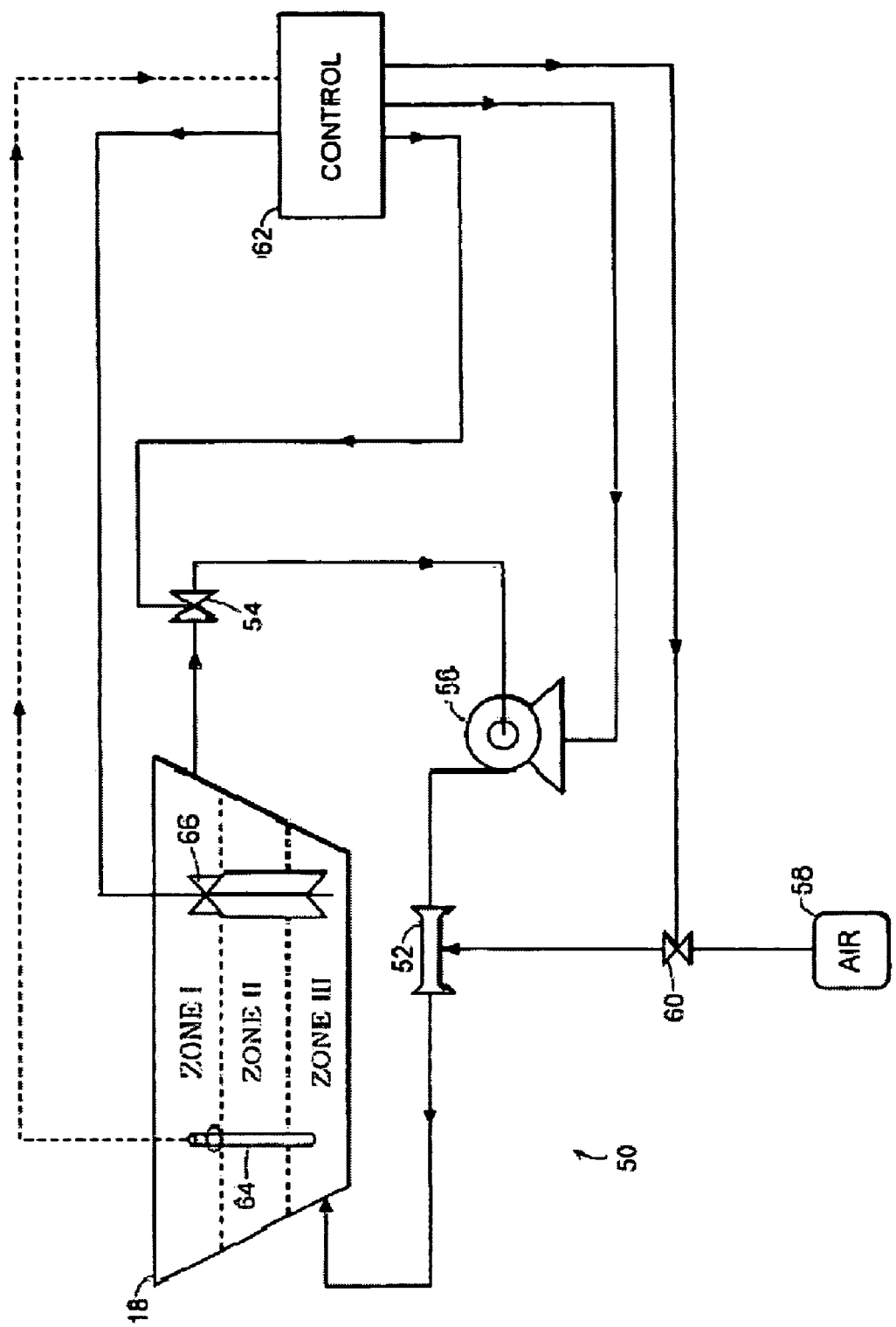
FIG. 3 shows a schematic drawing of the digestion tank employed in preferred embodiments.

Referring to FIG. 3, an apparatus is depicted that creates and facilitates maintenance of up to three zones in the offline treatment vessel 18. Generally, the apparatus includes a gas micronizer loop and a feedback control system that governs its operation.

The micronizer loop, indicated generally at reference numeral 50, generates microscopic bubbles and introduces them into offline treatment vessel 18 in a manner that does not cause excessive turbulence. Micronizer loop 50 includes a micronizer element 52 that introduces microscopic bubbles into a stream of liquid flowing therethrough. Element 52 preferably includes a cylindrical porous membrane coupled at each end to a tapered conduit. Surrounding the membrane is a coaxial housing, sealed with respect to the membrane and capable of containing gas under elevated pressure. Gas is provided to the housing of element 52 through a sealed, one-way inlet. Accordingly, fluid introduced into either tapered conduit passes axially through the bore of element 52, where it acquires bubbles of gas radially penetrating the pores of the cylindrical membrane.

Waste fluid is continuously withdrawn from offline treatment vessel 18 through a valve 32 by a motor-driven pump 56 and provided to the inlet of micronizer 52. A source of gas (preferably air) 58 feeds micronizer 52 through a valve 60 to form bubbles in the liquid passing therethrough. Upon exiting from micronizer 52, the aerated liquid is reintroduced into the bottom of offline treatment vessel 18. Introduction of the aerated liquid, which contains submicron bubbles and transports them throughout the bottom region of offline treatment vessel 18, occurs without substantial turbulence. This is ensured by employing bubbles having mean diameters less than one micron, stored potential energies of at least 10 lbm/ft$^2$-sec$^2$ (where lbm is pounds mass), or a work/area factor of at least 0.5 lbf/ft (where lbf is pounds force). Preferably, stored potential energy exceeds 100 lbm/ft$^2$-sec$^2$ and the work/area factor exceeds 3 lbf/ft.

So long as aerobic and non-aerobic (i.e., anoxic and/or anaerobic) microorganisms exist in the mixed liquor, two or more distinct, stratified chemical environments will develop in offline treatment vessel 18. Representative aerobic genera, present in a wide variety of sludge compositions, include the bacteria *Acinetobacter, Pseudomonas, Zoogloea, Achromobacter, Flavobacterium, Norcardia, Bdellovibrio, Mycobacterium, Sphaerotilus, Baggiatoa, Thiothrix, Lecicothrix* and *Geotrichum*, the nitrifying bacteria *Nitrosomonas* and *Nitrobacter*, and the protozoa *Ciliata, Vorticella, Opercularia* and *Epistylis*; anoxic genera also typically present include the denitrifying bacteria *Achromobacter, Aerobacter, Alcaligenes, Bacillus, Brevibacterium, Flavobacterium, Lactobacillus, Micrococcus, Proteus, Pseudomonas* and *Spirillum*; and anaerobic organisms typically present include *Clostridium* spp., *Peptococcus anaerobus, Bifidobacterium* spp., *Desulfovibrio* spp., *Corynebacterium* spp., *Lactobacillus, Actinomyces, Staphylococcus* and *Escherichia coli*.

Aerobic nitrifiers oxidize ammonia or amine compounds (such as amino acids) to nitrite and finally to nitrate, while anoxic denitrifiers reduce nitrate to nitrite and finally to nitrogen gas. The simultaneous presence of nitrifiers and denitrifiers has been found highly useful in reducing large quantities of soluble carbonaceous BOD, as well as nitrogen-containing organics, into gaseous products. It is believed that soluble nitrite crosses the interface between aerobic and anoxic zones in large quantities before its conversion, by the nitrifiers, into nitrate; in the anoxic zone, denitrifiers convert the nitrite into nitrogen gas, resulting in an overall net conversion of chemically bound nitrogen into nitrogen gas (which helps maintain separation between anoxic and anaerobic zones in a quiescent environment).

Assuming the presence of all three types of microorganism, three environments, shown as Zones I, II and III in FIG. 3, develop under sufficiently quiescent conditions. As noted previously, the absence of one or more forms of microorganism can be rectified, if desired, by their direct introduction into offline treatment vessel 18. Pouring several gallons of activated sludge into the vessel will ordinarily furnish a sufficient seed population of all three classes of organism to generate the zones after a suitable growth period.

Although the offline treatment vessel of preferred embodiments is generally adequate to effect multi-zone waste treatment, it can be desirable to add some degree of control to attain target levels of indicators important to the treatment of particular waste compositions. The preferred indicators, as noted previously, include ammonia level; soluble nitrate level; soluble nitrite level; and ORP. These indicators can generally be brought within limits appropriate to the particular type of waste composition by adjusting process parameters such as the air content of the bulk liquid and the degree of turbulence imparted thereto. Desirably, the turbulence imparted to the contents of offline treatment vessel 18 by the delivered air does not exceed a mean velocity gradient of 100 sec$^{-1}$; 40 sec$^{-1}$ is preferred, and 10 sec$^{-1}$ is most preferred. However, below this level, changes in mixing energy can be employed to control process conditions.

For purposes of the preferred embodiments, the mean velocity gradient G is given by:

$$G=(P/\mu V)^{1/2}$$

where P is the power requirement or mixing horsepower from aeration in ft-lb/sec, $\mu$ is the dynamic viscosity in lb-sec/ft$^2$ and V is the tank volume in ft$^3$. P is given by:

$$P=p_a V_a \ln(p_c/p_a)$$

where $p_a$ is atmospheric pressure in lb/ft$^2$, $V_a$ is the volume of introduced air at atmospheric pressure in ft$^3$/sec, and $P_c$ is the pressure, in lb/ft$^2$, at the point of air discharge into the fluid, or by:

$$P=35.28 Q_a \ln((h+33.9)/33.9)$$

where $Q_a$ is the air flow, in ft$^3$/min, into the fluid at atmospheric pressure, and h is the air pressure at the point of discharge in feet of water.

For example, excess free ammonia, which is ecologically harmful if present in discharged effluent, in the absence of nitrates reflects insufficient aeration. Conversely, excess free nitrate, which can lead to groundwater contamination by solubilizing heavy metals, in the absence of ammonia reflects excessive aeration. Excess ammonia and nitrate reflect incomplete waste mineralization and promote unwanted biological activity at the effluent site; these indicate an insufficient denitrifier population or excessive turbulence (the latter condition being confirmed by a narrow diversity of ORP, which itself indicates excessive turbulence). ORP affects the health of various organism populations, and is therefore kept within acceptable values. This can be achieved by control of the gross average vessel oxygen content across all zones.

The presence of any of the foregoing adverse conditions can be detected manually, using appropriate chemical and/or electrolytic sensing equipment, and manual steps taken to adjust the appropriate parameter. In particular, the size of the bubbles can be controlled, within limits, by the amount of air from source 58 introduced into micronizer 52 and/or by the velocity of the liquid pumped through micronizer 52. Decreasing the mean diameter of the bubbles results in their production in greater quantity, increasing the degree of aeration. Elevating the mean diameter decreases aeration but, because the bubbles are larger, increases agitation. For most processes, control of bubble size allows the operator to exert sufficient independent control over both aeration and agitation parameters. It is of course possible to impart additional agitation by mechanical means.

Control over process conditions can also be accomplished by automated means, as illustrated in FIG. 3. A controller 62 accepts input data from at least one sensor 64, which produces an output signal representing the magnitude of at least one of the indicators discussed above. The output signal can be digital or analog, depending on the characteristics of controller 62. Suitable sensors are well-characterized in the art; for example, electrode arrangements for measurement of ORP and ammonia are widely available, as are in-line measurement devices for nitrates. Various arrangements and combinations of sensors 64 are possible; for example, offline treatment vessel 18 can be equipped with a cluster of sensors capable of sensing all relevant indicators, or with multiple clusters spaced apart vertically in regions likely to correspond to discrete zones.

Controller 62 interprets signals from sensors 64 and, based thereon, controls valves 54 and 60 (which are, in this embodiment, electronically actuable) and the speed of pump 56. In addition, to facilitate even greater control over imparted turbulence, the illustrated embodiment includes a paddle stirrer assembly 66, the operation of which is also governed by controller 62; it can be recognized, however, that stirrer 66 is ordinarily not necessary.

Controller 62 can be an analog (e.g., voltage-controlled) device, but is preferably a digital computer programmed with appropriate software to carry out the analysis and control functions. In this embodiment, signals from sensors 64 are converted to digital form by analog-to-digital converters, while the digital control signals generated by controller 62 are transformed by digital-to-analog converters into signals capable of opening and closing valves 54 and 60 to a stepped or continuously selectable degree. The programming necessary to effectuate the analysis and control functions described hereinabove is well within the purview of those skilled in the art, and can readily be accomplished without undue experimentation.

Screen

Removal of inert, solid substances from sludge from the membrane bioreactor prior to its introduction into offline treatment vessel has been found to substantially increase the efficiency of waste digestion. While not wishing to be bound by any particular theory, it is believed that the increased efficiency is due to both to biological concentration effects (since removal of inert solids results in reintroduction of sludge having higher microorganism levels) and to reduction of biological toxicity (that results, e.g., from heavy metals susceptible to removal in accordance herewith). Removal of inerts is beneficial in virtually any biological process employing a recycle sidestream, and this aspect of the invention is therefore useful in a wide variety of waste-treatment applications (e.g., conventional single-zone tanks used independently or in series, or the multi-zone arrangement discussed above).

A variety of solids are present in a typical wastewater. Small (from about 1 to about 250 μm in diameter) organic materials include the waste-digestive organisms critical to waste treatment. Larger (>250 μm) organic materials generally represent various forms of trash. Small and large inorganic particles include inert materials such as sand. Of these categories of solids, only small organics are desirably introduced into offline treatment vessel 18, as depicted in FIGS. 2 and 3.

Process sludge from the membrane bioreactor aerobic tank is flowed through a screen to remove solids. The solids can include hair, trash, and fibrous materials. In a preferred embodiment, a portion of mixed liquor containing process sludge from the membrane bioreactor is flowed through a screen in a side stream. The flow rate of the mixed liquor through the screen is preferably less than or equal to the average design flow rate of the treatment system. The screenings can be either treated or disposed of directly. The openings of the screen are from about 0.10 mm or less to about 1.5 mm or more, preferably from about 0.15, or 0.20 mm to about 0.30, 0.35, 0.40, 0.45, 0.55, 0.60, 0.65, 0.70, 0.75, 0.80, 0.85, 0.90, 0.95, 1.0, 1.1, 1.2, 1.3, or 1.4 mm, and most preferably about 0.25 mm (250 μm) in size, as can be provided by, for example, a rotary drum screen.

A particularly preferred screen is marketed as the ROTAMAT® Membrane Screen RoMem by Huber Technology of Berching, Germany. The screen is suitable for the removal of fibrous materials and hairs; it provides increased operational stability when employed in conjunction with membrane bioreactors, and results in significant COD/BOD reduction in river and sea outfalls. The ROTAMAT® screen employs a screen basket covered with a square mesh, through which the flow passes from inside to outside. The retained solids are washed off during rotation of the basket in the upper area, washed into the trough, and removed from the channel area by screw conveyor, the screenings are at the same time dewatered in the closed unit and discharged. Recovery of the organic carbon for denitrification is made possible by washing the screenings in an integrated screenings washing system. Preferably the ROTAMAT® screen employs a 0.75 mm mesh when employed with hollow fiber membrane module systems, and a 1 mm mesh when a plate module system is employed.

Minimizing solids build-up on membrane filters in waste water treatment systems is desirable for efficient operation of the system. Solids can accumulate on the membrane fiber bundles and are difficult to remove and can damage the membranes. Conventional processes to reduce solids build-up in the membrane bioreactor can include screening the stream to the membrane bioreactor before the raw water enters the waste water treatment system. Another approach screens a stream comprised of raw sewage plus sludge recycles from the membrane bioreactor before it enters the waste water treatment system. Screening the raw water, however, requires that the screening system be designed to accommodate the raw water under peak conditions which can typically be three or more times the average design flow rate of the system. This requires that the screens be sufficiently large to accommodate the peak flow. Additionally, such systems can be designed with duty screens and standby screens, each of 100% of the design screen capacity. By screening the raw water before it enters the waste water treatment system, the screenings generated can be high in undigested organic materials that require special equipment to return the undigested organic materials from the screenings to the waste water treatment system. Moreover, screening raw sewage before it enters the waste water treatment system does not remove hair, trash, or fibrous materials that can form within the system itself, such as, for example, re-roped or re-balled fibrous materials. Screening the entire sludge stream before it enters the membrane filter of the waste water treatment system also accommodates high flow rates (typically four or more times the average design flow rate of the system) again requiring the use of large duty screens and full capacity standby screens. Accordingly, it can be preferred to employ such screening systems in conjunction with the filtration systems of preferred embodiments, it is generally more preferred to employ a screening system as described below, wherein process sludge from the membrane bioreactor aerobic tank is flowed through a 250 μm screen to remove solids, and the screened process fluid enters the surge tank.

Waste water treatment systems of the preferred embodiments generally employ a hollow fiber membrane filter in conjunction with a bioreactor, such as in the membrane bioreactor described above, to produce a treated effluent from the filter and waste sludge from material rejected by the filter or otherwise remaining in the bioreactor. The bioreactor can be located upstream of the filter in the waste water treatment system or alternatively the filter can be in the bioreactor or a part of the bioreactor. In the latter instances the membrane of the filter is submerged directly in the bioreactor, as in the membrane bioreactor. The membrane bioreactor is preferably employed in a recycle loop with the offline treatment vessel.

The mixed liquor to be screened can be removed from the recycle mixed liquor stream in the membrane bioreactor system. Typically, recycled mixed liquor is recycled to the head of the membrane bioreactor system, and the mixed liquor to be passed through the screen can be removed from the recycle mixed liquor stream. The mixed liquor to be screened can be removed from the membrane bioreactor system at various other locations. The screened mixed liquor is flowed to the surge tank and the screenings can be either treated or disposed of.

The openings of the screen are generally about 1.0 mm or less, preferably 0.95, 0.9, 0.85, or 0.8 mm or less, more preferably 0.75, 0.7, 0.65, 0.6, or 0.55 mm or less, and most preferably 0.5, 0.45, 0.4, 0.35, 0.3, 0.25, 0.2, 0.15, 0.1, or 0.05 mm or less. One screen suitable for use in this invention is, for example, a rotary drum screen. The screen can be used to provide both screening and sludge thickening.

A preferred screen configuration is depicted in FIG. 1, wherein the membrane bioreactor is located upstream of the screen. The membrane bioreactor can comprise, without limitation, alone or in various combinations, one or more anaerobic zones, one or more anoxic zones, and one or more aerobic zones. An influent of water to be treated enters the membrane bioreactor. Influent can optionally be screened, clarified, digested, or subjected to other processes prior to entering membrane bioreactor. A treated effluent stream exits from a permeate side of the filter of the membrane bioreactor for later use as desired. A waste sludge stream, consisting of material rejected by the filter or otherwise produced in the membrane bioreactor also exits from the filter.

A portion or all of a mixed liquor stream containing waste sludge passes through a screen. The screen removes hair, trash, or fibrous materials in the mixed liquor passing through it including, but not limited to, hair, trash, or fibrous materials, that can form within the bioreactor itself, such as, for example, re-roped or re-balled fibrous materials. Such re-roped or re-balled fibrous materials are made from fine fibrous materials that may not be large enough to be removed by a typical screen themselves but that can aggregate into larger materials in the mixed liquor. A screened mixed liquor stream exits from the screen to enter the surge tank.

The screen openings are typically from about 0.25 mm or less to about 1.0 mm or more. Screen openings of 0.5 mm can preferably be used when the screenings will be sent to an offline treatment vessel. When screening mixed liquor, the screen typically blinds partly which reduces the effective screen size to increase the amount of screenings removed by the screen. The screen can be an internally fed rotary drum screen equipped with a woven wire mesh or punch hole screening media. The screen can also be equipped with external outside-in spray bars to keep the screen media clean, and diverter flights to continuously move solids to a discharge end of the screen. Any suitable screen can be employed, such as a fine screen with a screen size opening typically from about 0.1 mm or less to about 1.5 mm or more, preferably from about 0.25 mm to about 1.0 mm, for example, a wedge wire screen.

A screenings stream exits from the screen. The screening stream is "stabilized" since it has been exposed to biodegradation. Where the screen is a rotary drum screen, adjusting the drum speed can produce a liquid screenings stream having biodegradable solids suitable for mixing with a waste sludge stream to produce a single sludge stream. The screenings stream can be further treated or disposed of directly without being returned to the waste sludge stream. For example, the screening stream can be compacted and dewatered and disposed without further treatment, for example, to a landfill. If the screenings stream is to be disposed of without further treatment, the screen can be fitted with a dual sprayer system to wash the screening and reduce the amount of biomass that can be trapped or otherwise collected in the screenings before the screenings are discharged from the screen. The amount of biomass discharged in the screenings is typically less than about 15% of the dried weight of the screenings and less than about 2% of the total waste activated sludge. However, higher amounts can be possible in certain embodiments. If the screenings are disposed of directly, the screenings stream can be equipped with compacting and dewatering apparatus, such as a screw compactor, to provide screenings with over 40% dried solids (for example, screenings that pass a "paint filter test"). A bagging system can be used to reduce or eliminate human contact and odors.

The process comprises flowing water to be treated to the membrane bioreactor system. The water to be treated can include effluent from an offline treatment vessel. A portion of mixed liquor from the membrane bioreactor system is removed and passed through a screen to remove solids, such as hair, trash, or fibrous materials, from the mixed liquor. The screened mixed liquor is then flowed to the surge tank. The mixed liquor can be passed through the screen at a substantially constant flow rate without increasing substantially during peak flow conditions of the waste water treatment system. The flow rate of the mixed liquor through the screen is preferably greater than the average design flow rate of the waste water treatment system. In particular, the flow rate of the mixed liquor through the screen is preferably 105, 110, 115, 120, 125, 130, 135, 140, 145, 150, 155, 160, 165, 170, 175, 180, 185, 190, 195, or 200% or more higher than that of the average design flow rate of the waste water treatment system. Most preferably, the flow rate of the mixed liquor through the screen is preferably about 110 to about 150% of the average design flow rate of the waste water treatment system. Moreover, the mixed liquor can pass through the screen at a substantially constant flow rate and can pass through the screen substantially continuously.

The flow rate through the screen can be substantially continuous, since screen removes hair, trash, or fibrous materials, in the mixed liquor based on an average removal of these materials over a solids retention time of the entire bioreactor, an interruption in flow can be tolerated without significantly impacting performance. For example, flow can be interrupted to allow for screen to be replaced or repaired or to allow for other elements in the system to be checked and maintained. In certain embodiments, one duty screen operating at full flow capacity, or two duty screens, each designed for 50% of the full flow capacity, can be used without standby screens. While one or two duty screens are generally preferred, any suitable number of screens can be employed.

The retentate recycle stream for membrane bioreactor is typically from about 4 to about 5 times the flow of influent (Q). The flow of influent, Q, is generally equal to the average design flow of the waste water treatment system. Without using a screen, the hair, trash, or fibrous materials, concentration in membrane bioreactor ($X_b$) will build up to a level equal to the hair, trash, or fibrous materials, concentration of the influent ($X_f$) times the ratio of the solids retention time (SRT) to the hydraulic retention time (HRT). At steady state, the mass of hair, trash, or fibrous materials, ($Q \times X_f$) in the influent is equal to the mass of hair, trash, or fibrous materials, in the waste sludge stream ($Q_W \times X_b$), thus:

$$Q \times X_f = Q_W \times X_b \tag{1}$$

Q is equal to the volume (V) of the entire membrane bioreactor divided by HRT of the entire bioreactor. $Q_W$ is equal to the volume (V) of the entire bioreactor divided by SRT of the entire bioreactor. Therefore:

$$(V/HRT) \times X_f = (V/SRT) \times X_b \tag{2}$$

The concentration of hair, trash, or fibrous materials, in the bioreactor ($X_b$) is:

$$X_b = (SRT/HRT) \times X_f \tag{3}$$

For a typical process with a 6 hour HRT and a 15 day SRT, the hair, trash, or fibrous materials, concentration in the bioreactor ($X_b$) is sixty times the hair, trash, or fibrous materials, concentration in the influent ($X_f$). With the screen operating at a flow rate of yQ and assuming that all the hair, trash, or fibrous materials, is removed from the stream since the screen size opening is very small (for example, from about 0.5 mm to about 1.0 mm), the steady state relationship between feed and bioreactor hair, trash, or fibrous materials, concentrations is:

$$Q \times X_f = Q_W \times X_b + yQ \times X_b \tag{4}$$

Therefore:

$$X_b = (SRT/(ySRT+HRT)) \times X_f \tag{5}$$

For the same process conditions (6 hour HRT and 15 day SRT) and with the screen operating at a flow rate of 0.25Q (y=0.25), the hair, trash, or fibrous materials, concentration in the membrane bioreactor is 3.75 times the hair, trash, or fibrous materials, concentration in the influent. Using a screen under these conditions can reduce the hair, trash, or fibrous materials, content in the mixed liquor by approximately 94% compared to not using a screen.

By using a screen, a substantial amount of hair, trash, or fibrous materials, is removed from the mixed liquor without having to screen the entire recycled sludge stream or the entire peak flow coming into the plant. A typical plant operating at a 6 hour HRT, operating the screen at a flow rate of 0.25Q will process the equivalent of the total sludge volume once per day. In typical plants, the entire sludge volume will be screened from about 10 to about 20 times over a typical solids retention time which allows many opportunities for the screen to capture re-roped or re-balled fibrous materials in the mixed liquor.

As discussed above, most of the fibrous material is digested very slowly, or not at all, so it tends to accumulate to a relatively high concentration over time if only a very small proportion of the mixed liquor is bled off from the reactor. Moreover, it can be undesirable to screen the entire feed stream, due to the high flow rate and the correspondingly large screen area required. Accordingly, in preferred embodiments, mixed liquor is bled off from the reactor for screening, e.g., through a 500 µm screen, at a flow rate sufficient to screen a volume equal to the reactor volume during a time period of from about every 12 hours or less to 60 hours or more, preferably from about 18, 24, or 30 hours to about 36, 42, 48, or 54 hours. Operation in this manner maintains the fiber concentration in the reactor at an acceptable level, without excessive removal of biodegradable solids. Assuming a typical reactor residence time of about 3 hours, the screen would only need to be about 5% or less to about 15% or more, preferably 6, 7, 8, 9, or 10% to about 11, 12, 13, or 14%, of a corresponding feed stream screen, and smaller than a recycle stream screen. While in certain embodiments it can be desirable to continuously bleed off mixed liquor for screening, in certain embodiments it can be desirable to only bleed off mixed liquor intermittently. If intermittent operation is desirable, the screen can be sized to handle the increased flow. For example, if mixed liquor is bled off only 50% of the time, a flow rate twice as high will achieve filtration of a volume equal to the reactor volume in the same time period as for continuous bleed off. The screen can be enlarged to an area twice as large to handle the increased flow. In other embodiments, it can be desirable to employ multiple screens for screening multiple mixed liquor streams. Likewise, a mixed liquor stream can pass through a first screen 50% of the time, and then the stream can be diverted through a second screen the remaining 50% of the time. By alternating between screens in this manner, the off-line screen is available for maintenance or cleaning while maintaining continual bleed off of mixed liquor.

Hydrocyclone

The filtered mix liquor is stored in a surge tank where a portion of the stored process fluid is sent to a hydrocyclone to remove inert material. In certain embodiments, it can be desirable to pass the filtered mixed liquor directly to the hydrocyclone without first storing it in a surge tank; however it is generally preferred to employ one or more surge tanks. The tanks can be of any suitable configuration and fabricated from any suitable material, as will be appreciated by one skilled in the art.

In a particularly preferred embodiment, a two-stage assembly is employed that removes, in a first stage via hydrocyclone, materials of sizes similar to those of biological solids (including waste-digestive microorganisms) but having different specific gravities; and in a second stage via auxiliary screening, solids ranging in size from large objects (such as those removed by conventional screens) to much smaller particles on the order of from about 250 to about 350 µm. However, in certain embodiments it can be desired to omit the second stage auxiliary screening apparatus. It is noted that, owing to the continuous nature of the recycling loop, the order in which withdrawn sludge encounters the hydrocyclone and/or any screens is not critical, and these elements or other elements can be arranged in any suitable sequence, for example:

MBR→screen(s)→offline treatment vessel,
MBR→hydrocyclone(s)→offline treatment vessel,
MBR→screen(s)→hydrocyclone(s)→offline treatment vessel,
MBR→hydrocyclone(s)→screen(s)→offline treatment vessel,
MBR→screen(s)→hydrocyclone(s)→auxiliary screen(s)→offline treatment vessel,
MBR→screen(s)<auxiliary screen(s)→hydrocyclone(s)→offline treatment vessel,
MBR→hydrocyclone(s)→screen(s)→auxiliary screen(s)→offline treatment vessel, or
MBR→hydrocyclone(s)→auxiliary screen(s)→screen(s)→offline treatment vessel.

Other configurations can be employed, as will be appreciated by one skilled in the art. Surge tanks, pumps, chemical treatment units, and other apparatus as typically employed in wastewater treatment facilities can be employed, if desired, at any suitable point or points in the recycle loop.

Preferably, the first stage comprises one or more hydrocyclone units connected in parallel, indicated collectively at reference numeral 80 (and referred to in the singular for convenience of presentation), as depicted in FIG. 2. Hydrocyclone 80 is configured to remove small inorganic solids similar in size to biological solids but having different (and usually much higher) specific gravities. In particular, hydrocyclone 80 can primarily remove particles of from about 1 to about 250 µm in size having specific gravities typically greater than 1.5.

Hydrocyclones typically operate over a range of particles size/specific gravity combinations, but exhibiting a peak efficiency dictated by the unit's size and construction. In the preferred embodiments, maximum efficiency ideally occurs at particle sizes of from about 50 to about 60 µm and a specific gravity of about 2.6. In this way, the device will capture at least some very high density particles but avoid entrapment of desirable biological solids, which typically have specific gravities of about 1.02 to 1.05. Particles collected by hydrocyclone 80 are conveyed for disposal by an outlet line 82. The second stage comprises a static screen. In a preferred embodiment, the screen has an opening size of 1 mm or less, preferably from about 25 µm to about 600, 650, 700, 750, 800, 850, 900, or 950 µm, more preferably from about 50, 100, 150, or 200 µm to about 300, 350, 400, 450, or 500 µm, and most preferably about 250 µm. Because virtually all waste-degradative biological material is usually no larger than 200 µm, these pass through screen 86 and are reintroduced into offline treatment vessel 18. Screenings are conveyed for disposal along an outlet path 88. Clogging of screens having such small opening sizes is generally not observed. It is likely that most of the sludge-borne solids are much larger than the screen mesh, and simply rest against the screen without clogging the pores; in addition, accumulation of large particles can also act to restrain smaller particles that might otherwise cause clogging.

The screen/hydrocyclone removal arrangement 34 depicted in FIG. 2 not only removes otherwise troublesome inert solids, but also facilitates independent control of the ratio of inert content to biological content. The ability to influence this ratio (by varying the opening size of screen 86 and the retention characteristics of hydrocyclone 80) affords greater control over the settling characteristics of the mixed liquor.

Water Treatment Facilities Employing Membrane Bioreactor and Offline Treatment Vessel In a preferred embodiment, the system described above is installed in a wastewater treatment plant, using activated-sludge treatment and aerobic digestion with a specified influent loading, a specified 5-day biological oxygen demand, and a specified total suspended solids (TSS). The return activated sludge (RAS) flow along internal recycle loop is maintained at a specified proportion of the influent rate in gallons/minute (gpm).

In a preferred embodiment as depicted in FIG. 2, a removal subsystem 34 is employed consisting of two 6-inch diameter, 10° cyclones operating in parallel at a pressure drop of 15 psig, and a static screen having an opening size of 254 µm to which the overflow of the cyclones is conducted. The screen outflow is returned to the head of the offline treatment vessel 18 via conduit 36, and screenings accumulated over path 88 are allowed to fall into a screw conveyor inclined at 5° above horizontal. The screw conveyor is sprayed with approximately 0.5 gpm of recycled plant effluent to remove residual biosolids and its contents conveyed, while draining, to a dumpster for disposal. The underflow of the cyclones is discharged through conduit 82 to a secondary cyclone washer for concentration and discharge to the same dumpster. The secondary cyclone washer consists of a 10-gallon reservoir recirculating through a 2-inch diameter, 10° cyclone at a pressure drop of 20 psig and a flow rate of 25-30 gpm. Excess liquid is returned to the head of the offline treatment vessel 18 over conduit 36 and a concentrated solids stream of 60-80% dry solids is discharged for disposal.

Excess biological solids are transferred from the outfall of the screen out of the normal process flow at a specified daily rate. As depicted in FIG. 2, flow at a specified concentration is sent to an offline treatment vessel having a specified minimum working volume in gallons. The overall flow into the offline treatment vessel 18 is chosen to maintain it at liquid capacity during operation.

Implementation of the system produces substantial process benefits as compared with conventional operation, including substantial reductions in $BOD_5$, TSS, and mixed liquor suspended solids, a reduction in the coarse bubble blower power requirements for mixing and aeration, reduced aeration requirements, reduced inerts residence time, increased biosolids inventory, similar mean cell residence times, reduced inerts inventory, reduced membrane bioreactor loading, reduced removal of solids from system to maintain steady state, and reduced power per MGD. The system can concentrate solids to levels of 60% or more, resulting in a substantial reduction in net transportation burden over conventional systems, wherein solids concentration of from about 1 to 2% are typically observed.

Operation of a Membrane Bioreactor

Figure 15:
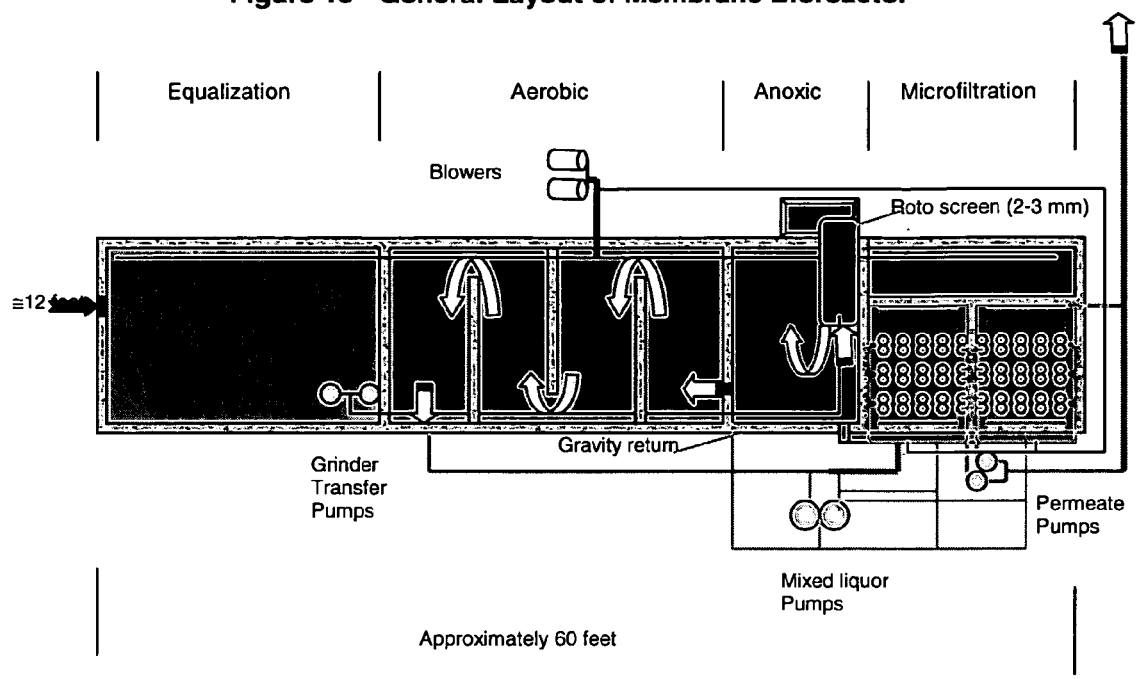
FIG. 15 depicts a general layout for a nitrification/denitrification membrane bioreactor of a preferred embodiment.

The apparatus and methods of the preferred embodiments are desirably employed in conjunction with a membrane bioreactor, especially a nitrification/denitrification membrane bioreactor. FIG. 15 depicts this particular reactor configuration for a 50,000 gpd system. The configuration permits a rapid method of maintenance cleaning which isolates the cleaning mechanism from the process, eliminates membrane handling, reduces the number of pumps that are required, and that can be completely automated. The reactor includes a microfiltration section including permeate pumps and mixed liquor pumps. The reactor further includes an equalization zone with grinder transfer pumps, an aerobic zone with blowers, and an anoxic zone with a 2-3 mm rota screen. In the aerobic section, ammonia is converted to nitrate in a two-stage reaction called nitrification. In the anoxic or anaerobic (low or no oxygen) zone, the conversion of nitrate to nitrogen gas takes place, a process referred to as denitrification.

Figure 16:
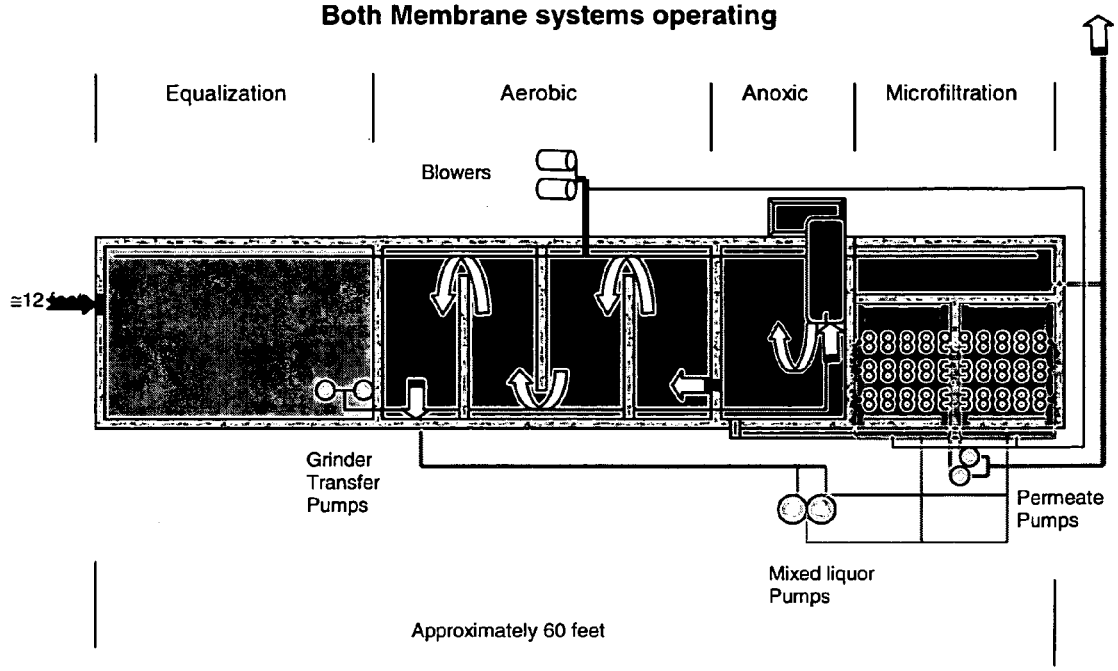
FIG. 16 depicts the operating phase of the membrane bioreactor of FIG. 15.
Figure 17:
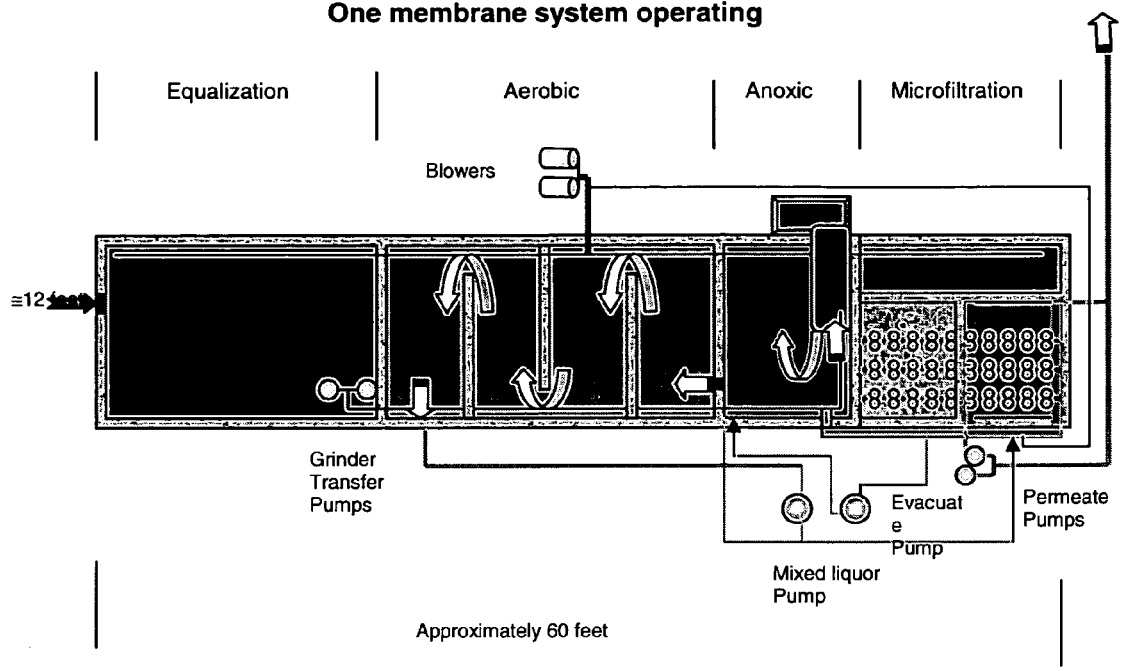
FIG. 17 depicts the soak phase of the membrane bioreactor of FIG. 15.
Figure 18:
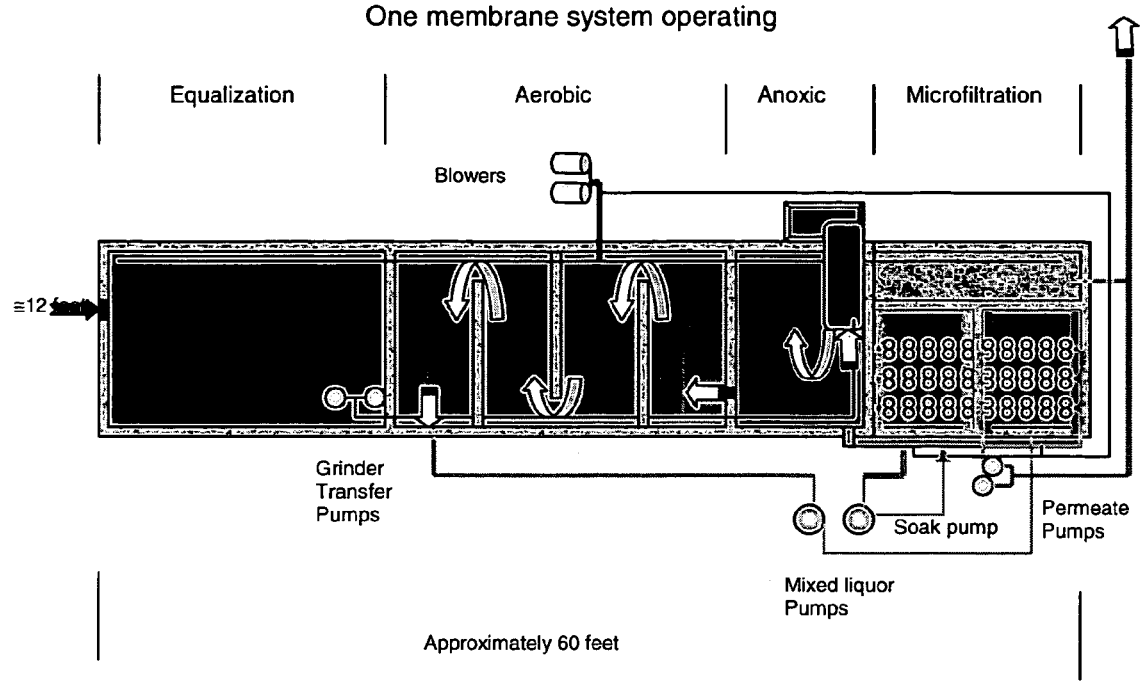
FIG. 18 depicts the evacuate phase of the membrane bioreactor of FIG. 15.
Figure 19:
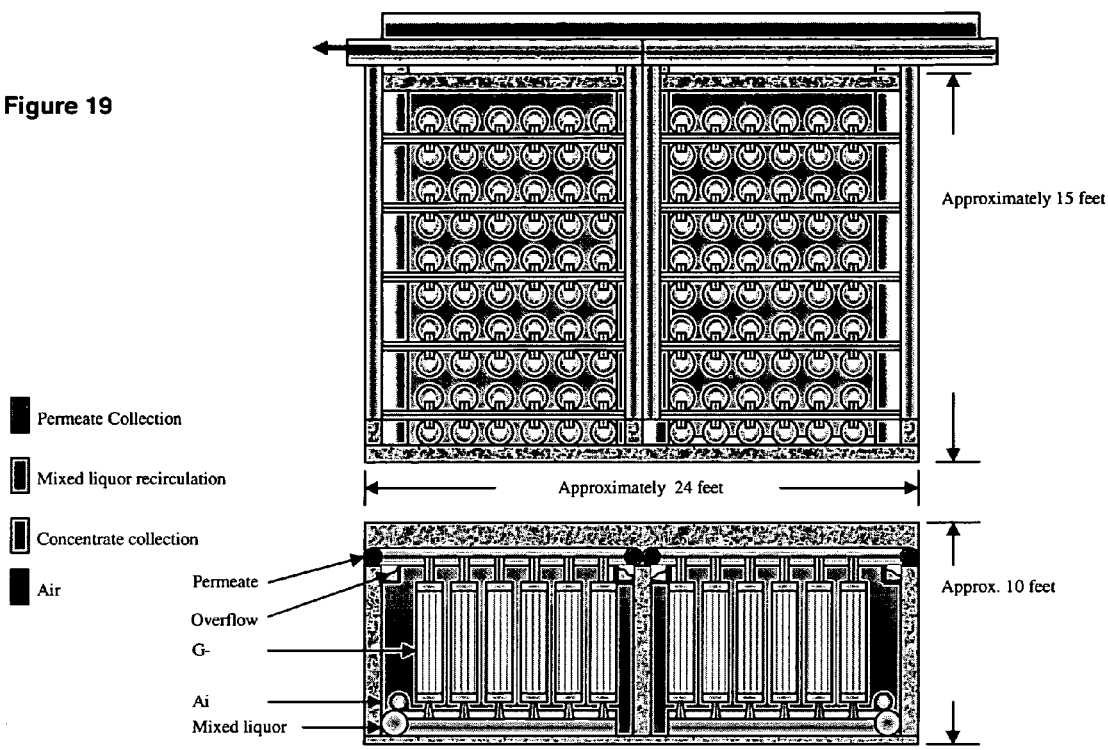
FIG. 19 provides additional detail for the membrane bioreactor of FIG. 15.

FIG. 16 shows the piping for normal operating mode with membrane systems operating in parallel. FIG. 17 depicts the evacuation phase, wherein the membrane basin is evacuated of mixed liquor using mixed liquor pump. Suction lines are switched using automatic valves. Suction can reverse mixed liquor flow on membrane module or check valves located on jet header that open under suction can be use to prevent reverse flow on the membrane. FIG. 18 depicts the soak phase, wherein chemically treated water from a holding basin is injected into membrane jet system using mixed liquor pump. The membranes are scoured, treated, and soaked with treated water. FIG. 19 provides additional detail regarding the configuration of the membrane basin. As depicted in this figure, air is injected into the mixed liquor pumped from the aerobic reactor at the base of the membrane module. A vacuum is applied to the membrane module and the membranes filter water from the mixed liquor. Concentrated mixed liquor overflows the basin, and returns to the aerobic digestion chamber. The cleaning water in then evacuated and returned to the holding basin and the same procedure is repeated for the other membrane system. One membrane system is always operational while the other is cleaned.

Figure 20:
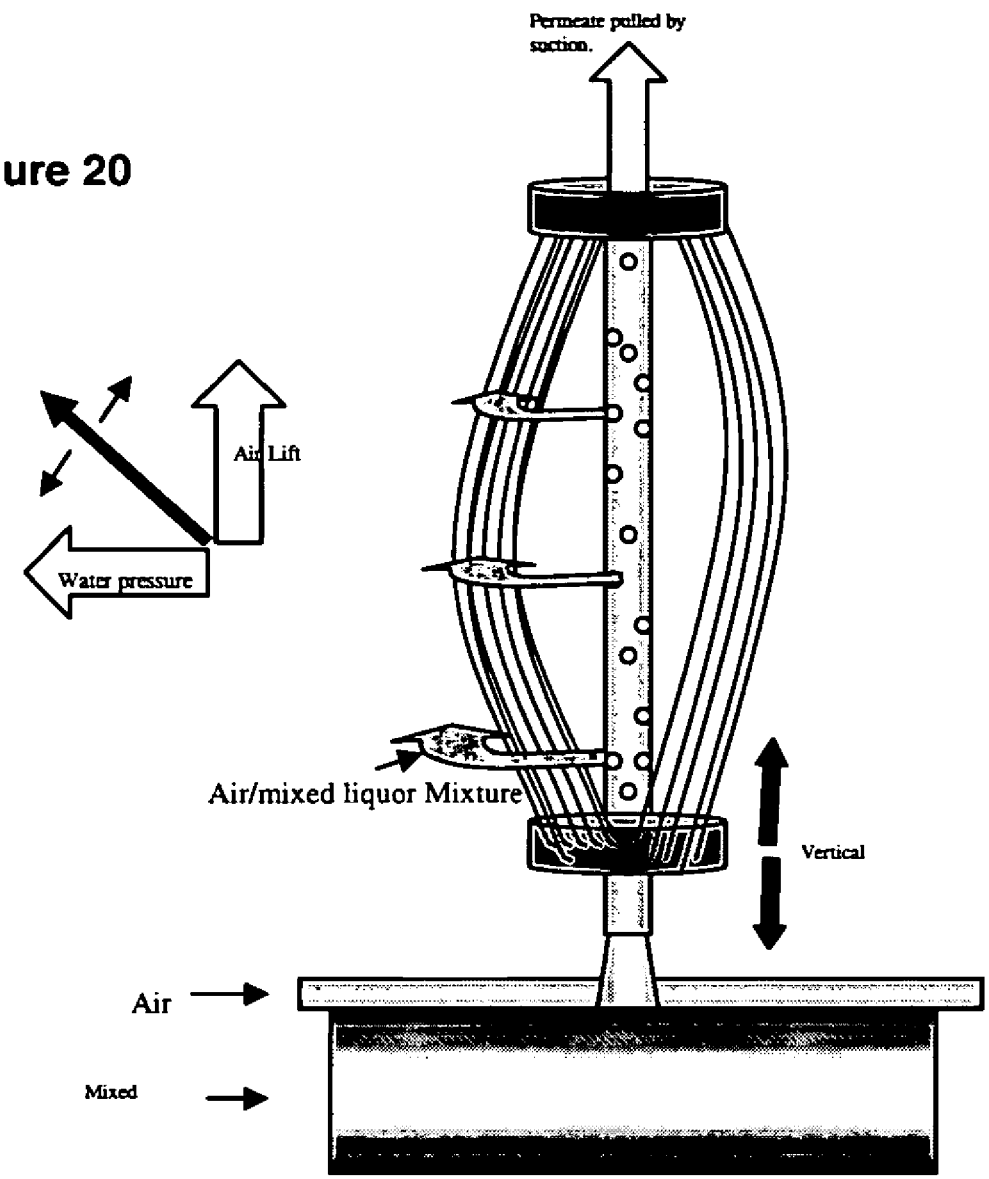
FIG. 20 depicts operation of a membrane module with the ability to adjust the mixed liquor flow vector in the vicinity of the membrane module.
Figure 25A:
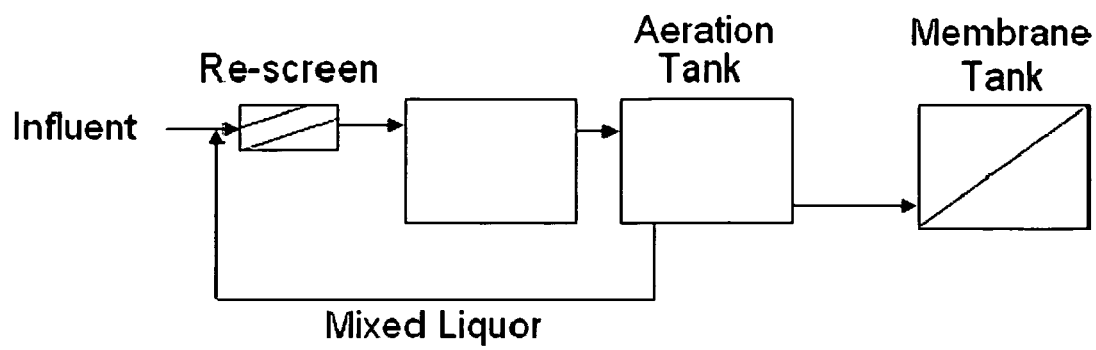
FIG. 25A depicts a membrane bioreactor employing a single re-screen.
Figure 25B:
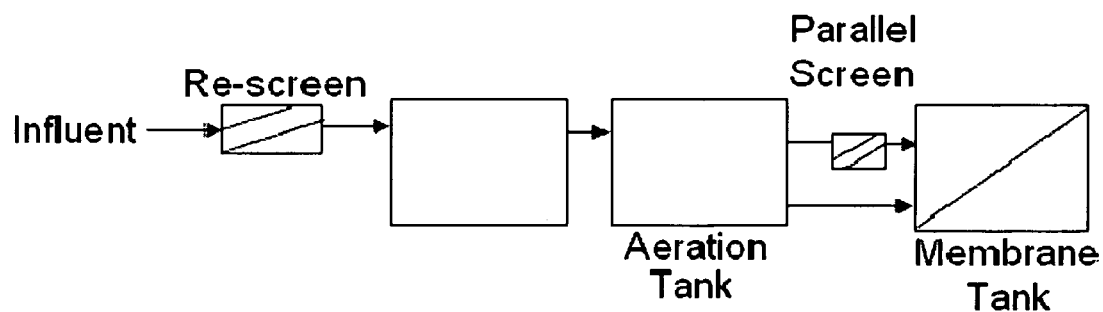
FIG. 25B depicts a membrane bioreactor with a parallel screening arrangement. Rather than recycling mixed liquor to the re-screen along with influent as in the system depicted in FIG. 25A, a parallel screen is placed between the aeration tank and the membrane tank. Mixed liquor passes through the second screen and into the membrane tank.

FIG. 20 depicts a membrane module wherein the flow vectors in the region adjacent to the membrane module are adjustable by adjusting the air and water pressure into the module. In operation, air and mixed liquor are mixed and injected into the module at its base. Their and mixed liquor flow rates are independently adjustable. The fibers are fixed at the top permeate suction manifold, and are potted and dead headed at bottom header plate. The bottom header has freedom to move vertically on the air/water delivery tube. The weight of the bottom applies tension to the fibers. This tension causes the membranes to move and vibrate in smaller amplitudes of vibration. The membrane can thus adsorb less energy which improves air scouring and increase membrane life. The top manifold is connected to the vertical air/water delivery tube for structural support. As air and water are pumped into the delivery tube, the fibers bend outwardly away form the air/water delivery tube. The air causes an upward flow and the water pressure causes and outward flow, and this flow direction also keeps the fibers in tension. As the fibers move outward they spread, allowing improved fluid transfer around the fibers and freeing trapped solids and fiber clumping. This approach allows potential cleaning options such as bursts of air during fiber relaxation or backflow to scour and expand membranes.

Such a system suitable for use in municipal or commercial wastewater filtration can have from 10 m$^3$ or less to about 20 m$^2$ or more, preferably 11, 12, 13, or 14 m$^2$ to about 15, 16, 17, 18, or 19 m$^2$, filtration membrane fiber surface area. The membrane modules are typically assembled into headers, the headers manifold together to form a subheader, and the subheaders manifold together to form a system. The assembly is typically housed in a pre-engineered concrete basin. A less densely packed module containing less than 10 m$^3$, preferably 9, 8, 7, 6, 5, m$^2$ or less of fiber surface area is employed for high solids and/or high viscosity environments to improve fluid transfer around the fibers. The membrane system is typically isolated from the main bioreactor tanks. Mixed liquor is pumped from the bioreactor to the membrane system, which is contained a separate basin. This approach has distinct advantages over a design that integrates the membrane into the main bioreactor: he bioreactor basin geometry is optimized for mixing and fluid transfer; membranes are isolated from process, which improves access for cleaning and maintenance options; factory labor rather than field assembly can be utilized; smaller systems are fabricated in shop, lowering costs, and improving quality control; the separate bioreactor can be designed to accommodate equalization if necessary; seamless upgrades are possible on existing plants; a standard design approach can be used cutting costs, and isolating design and performance issues; jet aeration can provide uniform distribution of mixed liquor into the reactor, allowing modules to operate in parallel with each other and preventing uneven concentration and potential serious fouling conditions; in situations where location of the membranes in the bioreactor is advantageous, the same design can be utilized, by simply leaving the bottom off the basin; the air and mixed liquor delivery system also provides flexibility of the location of the membrane box in relation to the bioreactor which is important for existing plant upgrades.

Method of Operating a Membrane Bioreactor with Removal of Fibrous Material

In preferred embodiments, a process for reducing hair, trash, or fibrous material concentration in a waste water treatment system is provided, the process comprising: flowing water to be treated to the waste water treatment system, the waste water treatment system having a membrane filter; treating the water in the waste water treatment system and producing a mixed liquor, and a treated effluent by the membrane; removing a portion of mixed liquor from the waste water treatment system and passing the mixed liquor through a screen to remove hair, trash, or fibrous materials from the mixed liquor so that the average flow rate of the mixed liquor passing through the screen is not more than about 1.0 of the average design flow rate of the waste water treatment system; and recycling the screened mixed liquor to the waste water treatment system.

A process for reducing hair, trash, or fibrous material concentration in a waste water treatment system is also provided, the process comprising: flowing water to be treated to the waste water treatment system, the waste water treatment system having a membrane filter; treating the water in the waste water treatment system and producing a mixed liquor, and treated effluent by the membrane; removing a portion of the mixed liquor from the waste water treatment system downstream of the membrane filter and passing the mixed liquor through a screen to remove hair, trash, or fibrous materials from the mixed liquor so that the average flow rate of the mixed liquor passing through the screen is greater than about 1.0 of the average design flow rate of the waste water treatment system; and recycling the screened mixed liquor to the waste water treatment system upstream of the membrane filter.

In these processes, the membrane filter is preferably a hollow fiber membrane filter. A second portion of the mixed liquor can be recycled to an upstream part of the waste water treatment system. The screened mixed liquor can be mixed with the recycle mixed liquor stream. Te mixed liquor portion to be passed through the screen can removed from the recycle mixed liquor stream. The waste water treatment system can produce a waste sludge that is removed from the membrane through a waste sludge system. The screenings produced from screening the mixed liquor can be flowed to the waste sludge stream. The screenings produced from screening the mixed liquor can be disposed of without further biological treatment. A polymer can be added to the mixed liquor before passing the mixed liquor through the screen to produce screenings that are a thickened sludge. In certain embodiments, it may be acceptable for the average flow rate of the mixed liquor through the screen to be about 0.10 to about 1.0 of the average design flow rate of the waste water treatment system. However, preferably the flow rate of mixed liquor through the screen can be greater than about 1.0 of the average design flow rate, preferably 1.1, 1.2, 1.3, 1.4, 1.5, or more of the flow rate. The screen size opening can, in some embodiments, be about 1.0 mm or less, preferably from about 0.25 mm to about 0.75 mm, and most preferably about 0.50 mm or less. The screen can be a rotary drum screen. The screen can have a dual sprayer system. The mixed liquor can be passed through the screen at a substantially constant flow rate. The mixed liquor can be substantially continuously passed through the screen. The mixed liquor can be substantially continuously passed through the screen and is passed through the screen at a substantially constant flow rate.

Method of Operating a Membrane Bioreactor with MemJet Technology

The membrane bioreactor (MBR) is becoming more and more popular in the wastewater treatment market. Traditionally MBR is considered to be simple and compact by immersing membranes in biological tanks as illustrated in FIG. 21. Market players, such as Kubota, Mitsubishi Rayon, and Zenon, have marketed their products in that configuration.

With the advance of MBR technology, plant size tends to be bigger and bigger, and more membranes are required in a single project. Due to the intrinsic difficulties associated with the MBR configuration in FIG. 21, US Filter pioneered in proposing a separate membrane tank configuration for MBR. FIG. 22 shows a typical flowsheet for the US Filter MemJet product. MemJet uses a pump to transfer mixed liquor from biological tank to the membrane tank, positively supplying and distributing into membrane bundles. This design enhances the membrane performance and solves significant operation problems encountered in the conventional configuration.

Nowadays the separate membrane tank configuration has been commonly accepted by market and the competitors also follow the principle to design their MBR process with separate membrane tanks. A general illustration of their process is shown in FIG. 23. A key difference between the configurations in FIGS. 22 and 23 lies in the mixed liquor transfer mechanism. MemJet employs a positive transfer mode by delivering mixed liquor into membrane bundles. The extra mixed liquor flow is returned to the biological tank by gravity (FIG. 22). On contrary, the mixed liquor transfer is a passive process in the configuration used by competitors (FIG. 23), where the mixed liquor is overflowed to membrane tank by gravity and delivered to the membrane through a passive concentration diffusion process. A pump is used in the membrane tank to send extra mixed liquor flow back to biological tanks.

In U.S. Pat. No. 6,614,868, Zenon describes a side screening process by taking a portion of mixed liquor flow in the recycle line to a side-screener (dotted line in FIG. 3). This process is also illustrated in FIGS. 1-3 of U.S. '868. For a single tank system, it is described in U.S. '866 to take a portion of mixed liquor from MBR to re-screen and then send the re-screened mixed liquor back to the inlet (If MBR, this is illustrated In FIG. 4 of U.S. '868.)

It is clear from the specification and diagrams (FIGS. 1-4) of U.S. '868 that the side screening process described in that patent provides a method to reduce trash content accumulation in MBR, but fails to protect the membrane from direct contact with trash. For example, if human hair or tree leaves enter the biological tanks, they will pass through the membrane system first before being possibly retained by a side screen. Therefore they could cause detrimental effect to the membrane (such as blocking distribution to membranes) before they are caught up by the side screen.

The best method to protect membranes in the MBR process from interference by trash or tree leaves is to re-screen the whole mixed liquor before it enters the membrane system. However, the mixed liquor flowrate entering the membrane sysrem is the sum of flows of effluent, return mixed liquor from membrane tank to biological tank, and sludge wastage, and is normally several times that of a plant's treatmert capacity (more typically 4-5 times of effluent flowrate). Therefore the re-screen's capacity is preferably significantly larger than actually required to treat the plant flow, though this increased capacity can be partly off-set by an increased screening flow for mixed liquor (due to a lower oil and grease level in mixed liquor compared to raw sewage) and that a conventional coarse re-screen instead of fine screen can be used for raw sewage screening, The dotted line in FIG. 22 illustrates this option when all mixed liquor flow gets to re-screen before entering MOS tank.

To reduce the mixed liquor flow to the re-screener and also protect the membrane from interference by human hair, fibers, and tree leaves that escaped the first pre-screen, a portion of mixed liquor can be diverted to re-screen before entering the MOS tank. The percentage to go through re-screen is normally 5-50% of the total mixed liquor flowrate. FIG. 22 shows the re-screener is located at the outlet of the pump and FIG. 24 demonstrates that a re-screener uses the gravity feed from the biological tank and the re-screened mixed liquor goes to the inlet of the pump. Although not equivalent to the full rescreen of mixed liquor described above, the partial re-screen of mixed liquor before the MOS tank provides better protection to membrane than the process described in U.S. '868.

Fouling of the Membrane Bioreactor

The combination of the side stream sludge reduction process helps the biological process through screening and cyclone separation. However, the membranes in the MBR eventually foul from the accumulation of solids in the form of inert materials and organic solids on the surface and in the pores of the fiber. One of the more significant contributors to this fouling is EPS (extra-cellular polymeric substances). These are produced by certain strains of bacteria and microorganisms and will coat the membrane surface, decreasing its permeability. One means of reducing EPS is with long sludge age (SRT). It has been found that longer sludge age reduces membrane fouling significantly and a result lowers maintenance costs and could improve the life of membranes.

A benefit of combining these technologies is that they result in a longer SRT for the microorganism in the process and as a result reduced membrane fouling, improving overall system performance.

Sidestream Anoxic Reactor

A flow schematic showing a process flow diagram for a solids reduction process/MBR arrangement is provided as FIG. 26. The screenings/cyclone solids residuals are not depicted in this flow scheme, just the main liquid flows. The flow to the sidestream reactor is a small portion of the plant flow. The flow is similar to the WAS from a conventional activated sludge process. This stream can come from the membrane operating system (MOS) recycle flow, or from the aeration tank effluent prior to the MOS. MOS recycle is generally preferred, as the solids content will be slightly higher than the aeration tank MLSS due to the dewatering effect of the MOS. However, in some cases it can be preferred to feed "pre-MOS" activated sludge effluent as this stream will have a lower dissolved oxygen content, and may be more compatible with the desired anoxic conditions in the sidestream reactor.

Integrated Membrane Bioreactor with Solids Reduction System

Figure 27:
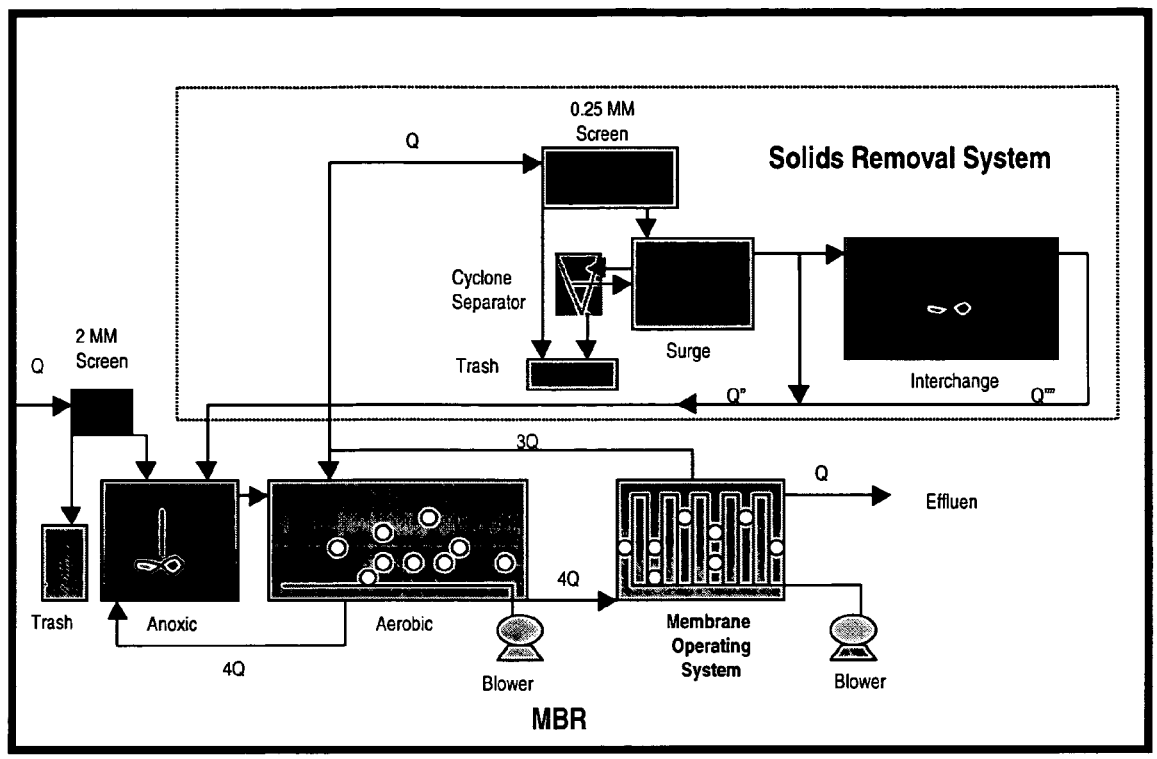
FIG. 27 depicts a process flow diagram for a solids reduction process/membrane bioreactor arrangement.
Figure 28:
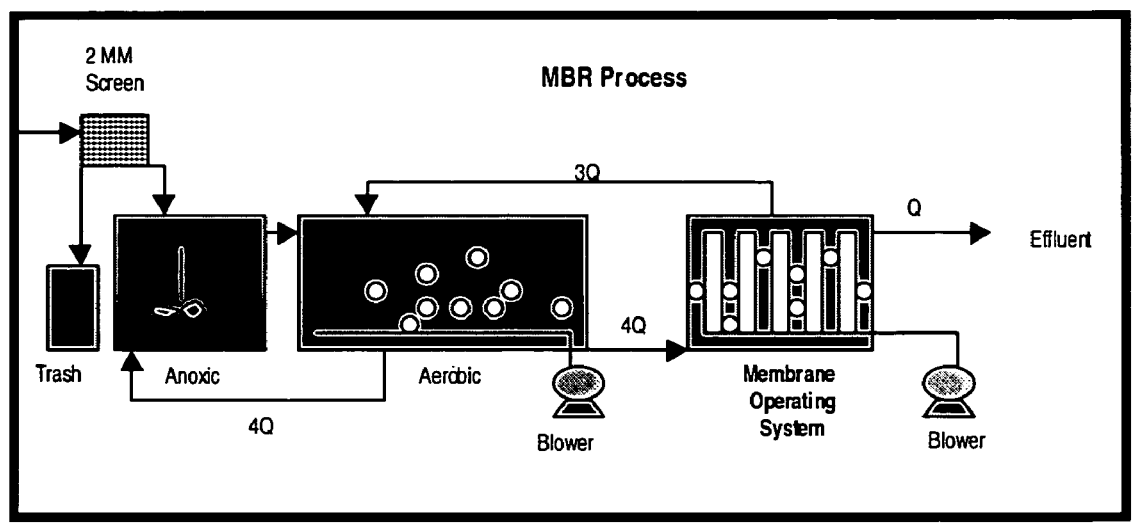
FIG. 28 depicts a process flow diagram for a membrane bioreactor arrangement incorporating a prescreen.

In preferred embodiments, a membrane bioreactor is integrated with a solids reduction system to provide an advanced treatment process offering a variety of benefits, including exceptional treated water quality and total solids destruction of over 80%. Such a system is depicted in FIG. 27. A process as depicted in FIG. 28 offers a high rate system with a very small footprint and minimizes sludge production and handling. The integrated process provides the best possible operating environment for the membrane bioreactor's immersed membrane system for reduced maintenance, promotion of operator safety, and optimized overall performance.

Proper prescreening is an important element in most immersed membrane bioreactor applications. The purpose of the screening is not to protect the integrity of the membrane fibers but to reduce the occurrence of fibrous materials from becoming entangled in the fiber bundles. The accumulation of fibrous materials in the membrane modules can ultimately reduce module performance and make cleaning and maintenance more time consuming. A 2 mm perforated screen is very effective in removing fibers and offers adequate pretreatment of the influent before entering the membrane bioreactor process. Screenings are preferably collected in a hopper and removed. The screen is preferably designed and constructed as a 2 mm perforated plate system.

Influent equalization, if desired, and anoxic aeration basins can be incorporated into the system, and can operate on a mixed liquor volume of as high as 12,000 mg/l or more.

The MOS, the heart of the membrane bioreactor system, is preferably an assembly with one or more integral membrane-operating tanks. The MOS is an integral part of the Aerobic Process but it is typically designed as a separate basin to optimize the operating environment of the membranes. The micro-filtration membranes are preferably located in one or more identical process tanks. Applying a low vacuum to the membrane modules pulls water through the membranes and pumps the filtered water to the next process step. Mixed liquor is continuously or intermittently injected, preferably uniformly with air, into each membrane module fiber bundle. The resulting cross flow across the membrane fibers continuously scours and cleans the membrane surface. The solids, organics, microorganisms, bacteria and viruses cannot pass through the membrane and remain in the mixed liquor, and are ultimately destroyed by the process and age.

The membrane systems can be easily isolated from the main process tanks to allow the membrane basins to be used as cleaning basins when a Clean in Place (CIP) is conducted to restore membrane permeability. As a result, membrane cleaning and service do not impair biological performance. The MOS can be designed with independent operating systems, which enable membrane cleaning to be automatically scheduled during periods of low flow to optimize overall performance of the system. A separate tank can be provided for storage of treated water for membrane maintenance cleaning and for membrane chemical cleaning.

Biologically active mixed liquor is pumped from the biological reactor to the MOS where liquid/solids separation is accomplished by a jet system employed as an integral part of the MOS design. The jet system can have several functions. For example, the combination of air and mixed liquor introduced at the base of the module can provide a scrubbing action on the membranes as mixed liquor moves upward across the membrane surfaces. This uniform fluid flow across the membrane surfaces prevents the polarization or thickening of suspended solids within the membrane modules. There is also a small back pressure where mixed liquor and air are combined at the base of the module. This helps provide uniform distribution of mixed liquor and air across the entire membrane basin. Creating a two phase system (air and mixed liquor) improves module performance by keeping aerated surfaces wetted at the base of the module and prevents dehydration of solids onto these surfaces. This ultimately keeps aeration uniform through all modules and across the entire array of modules in the MOS.

Membrane scouring is accomplished by creating an airlift at the base of each module. As air bubbles rise they create liquid cross-flow upward along the membrane surface. The airlift displaces liquid at the base of the membrane tank during normal operation. The benefit of the jet system is that it replenishes displaced liquid at the bottom of the MOS, minimizing down flow liquid patterns. Systems which simply allow recycle mixed liquor to enter the top of the MOS may not achieve uniform distribution and effective fluid cross flow, resulting in the random polarization of solids in membrane modules.

Figure 29A:
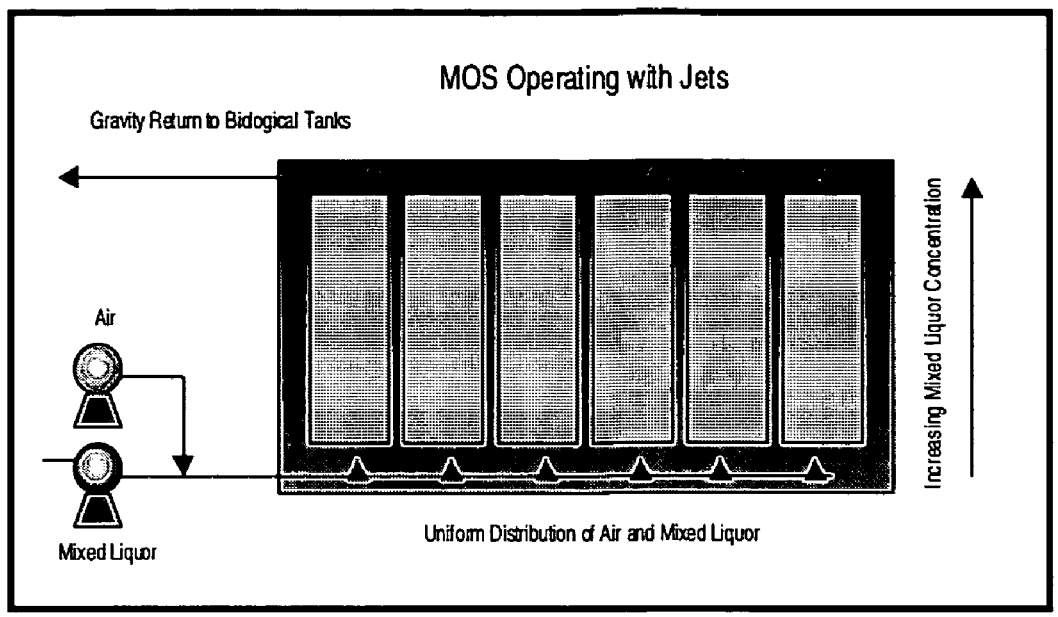
FIG. 29A schematically depicts mixed liquor uniform flow in a membrane bioreactor employing a jet system.
Figure 29B:
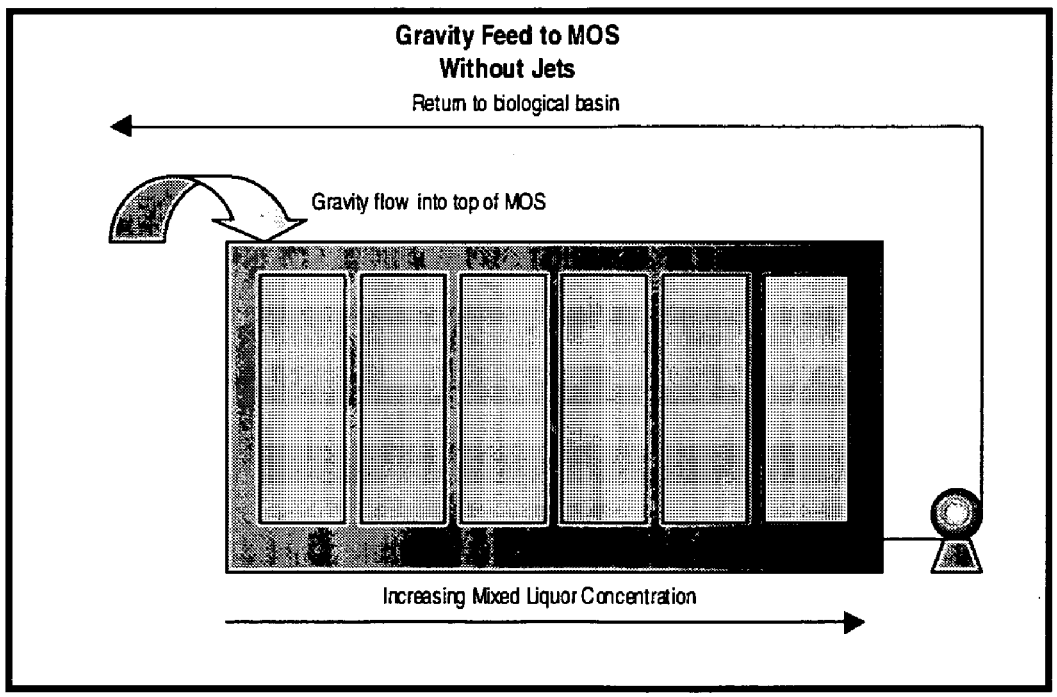
FIG. 29B schematically depicts mixed liquor non-uniform flow in a membrane bioreactor not employing a jet system.

The jet system provides uniform liquid distribution from the bottom to the top of the tank. All membranes are exposed to the same mixed liquor environment and performance is consistent, as depicted in FIG. 29A. In a non-uniform environment membranes are subject to a concentration gradient resulting in varying performance, as depicted in FIG. 29B. This can have a negative effect on both normal operation and cleaning efficiency.

This system design permits cleaning membranes in place. Membranes do not need to be removed from the operating tank and placed in a separate tank for extended soaking and cleaning. The jet system and the module design with narrow fiber bundles provide a system that is very effective for cleaning the membrane system in place. This process is safe, operator friendly, and significantly reduces the time required cleaning membranes. Conventional cleaning methods typically employ separate soaking tanks, in which soaking is conducted for approximately 24 hours per membrane rack. In contrast, the system of preferred embodiments allows cleaning chemicals to be circulated into the fiber bundles to remove organic and inorganic fouling of the fibers. With an in-place cleaning process, all modules in an entire MOS can be cleaned in less 4 to 6 hours through an automated process.

Another benefit of cleaning all membranes at the same time is they will operate at the same flux at the same operating pressure. This results in uniform and predictable fouling, providing the operator more control over the membrane bioreactor operation.

In preferred embodiments, a rack design is employed that allows permeate isolation above the MOS liquid level. Isolation valves can be provided on both the permeate lines and the air lines to individual racks. In addition, a blank rack insert can be provided so that an entire rack can be removed while the system remains operational for extended periods of time.

Organic materials, bacteria, and viruses are rejected by the membrane system and retained in the biological process. Membrane filtration can eliminate the need for clarifiers, weirs, sludge returns, and maintenance normally associated with a passive clarification process. However, in certain embodiments it can be desirable to incorporate components typically employed in passive clarification processes into the system. The biological system can also be operated at a much higher level of mixed liquor suspended solids. This ensures a more efficient biological process operating at low food to microorganism ratios with substantially less sludge production.

Since most of the maintenance and process adjustments associated with clarifiers are eliminated with a membrane filtration process, operation of the treatment process is easily automated and can be controlled with a microprocessor. A solids reduction process can significantly reduce the amount of sludge produced by the membrane bioreactor treatment process. The facility employing the system can obtain up to 80% or more reductions in sludge volume and reap the benefits of drastically reduced capital and operating costs.

Figure 30:
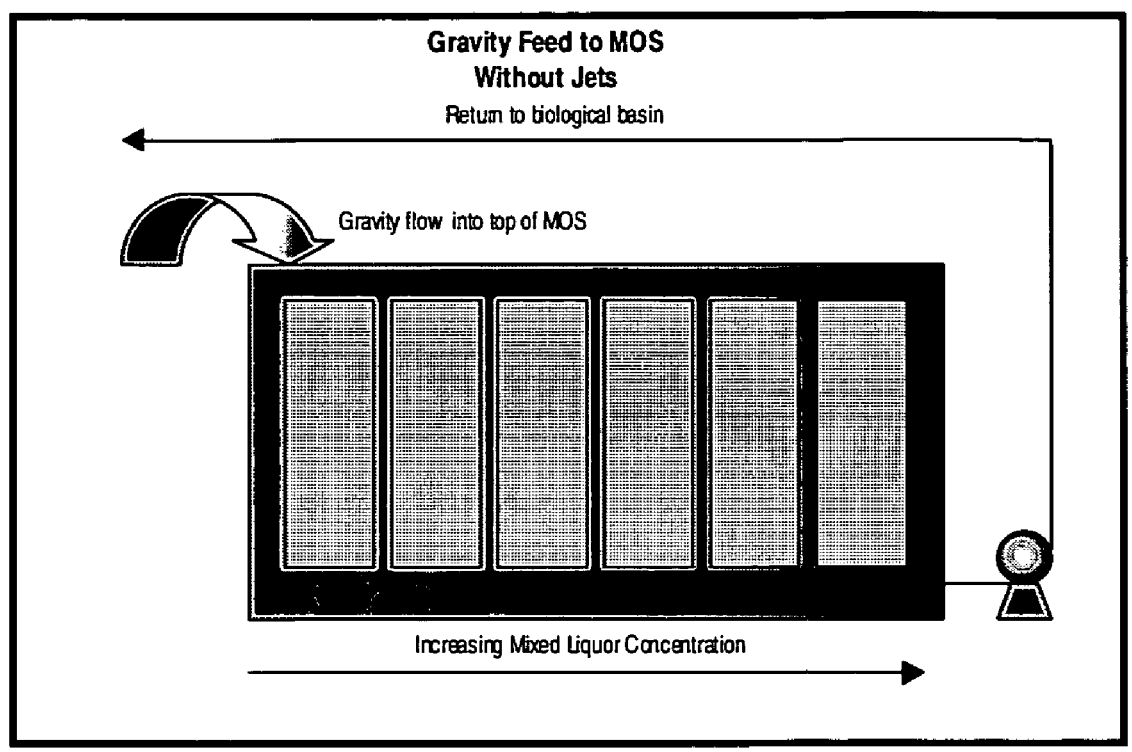
FIG. 30 schematically depicts a solids reduction process apparatus.

A preferred solids reduction process is depicted in FIG. 30. Using a solids interchange method, the process eliminates the biological waste sludge typically hauled or removed from an activated sludge treatment plant. This is accomplished through an interchange recycle between the aerobic activated sludge process and a specially controlled sidestream bioreactor. The interchange flow rate is selected based on various factors specific to a certain application, and proper selection of the flow rate ensures the system's successful operation. In the interchange bioreactor, the mixed liquor is converted from an aerobic dominant population to a non-aerobic dominant population. With limited oxygen in the interchange bioreactor, aerobic bacteria are selectively destroyed while enabling the lower yield facultative bacteria to break down the aerobic bacteria remains and byproducts. With the interchange recycle back to the aeration process, the facultative bacteria, with their lower growth rates, are destroyed in the aerobic process. Use of screens and cyclones on the return sludge lines in a preferred configuration make up a solids separation module that prevents the build-up of trash, grit, and inert material.

Grit and other inert materials are removed from the process through the use of a solids separation module on the return mixed liquor line from the MOS. This module consists of a 0.25 mm drum screen which continuously screens mixed liquor in a side stream at rate of one (1) times the forward flow (Q') of the plant. Part of the return mixed liquor flow (3Q) is pumped to this module (1Q) through the fine screen to the surge tank and directed back to the main treatment process. The surge tank has a sidestream cyclone separator though which mixed liquor is continuously pumped to remove very fine inert materials. Periodically, a portion of the flow (Q") from the surge tank is diverted to the sidestream bioreactor for the selection and destruction process.

Mixed liquor from the bioreactor is preferably not "wasted" from the plant, as typically occurs in a typical digester. The mixed liquor is preferably recycled back to the main treatment process from the interchange tank where the facultative bacteria, in turn, are out-competed by the aerobic bacteria and subsequently broken down in the alternating environments of the aerobic treatment process and the sidestream bioreactor. A steady-state balance between selection and destruction is developed between the sidestream biological process in the interchange tank and the main treatment process resulting in no net biological solids produced.

An occasional purge may be employed to remove the build-up of fines and inerts that are not removed through solids separation module. A purge of 50% or less to 100% or more of the biological solids is preferably accomplished over a one year time period. This amount of wasting is equivalent to a biological yield of 0.05 to 0.10 lbs. TSS/lbs. BOD. For existing plants, which currently operate a solids handling system, the preferred amount of annually purged solids can be removed incrementally each month, so as to exercise the existing thickening or dewatering equipment. For new facilities using the process and without a solids handling system, the amount of annually purged solids is preferably wasted in one to two or more episodes per year.

A control system can be employed to keep the system at optimum performance regardless of the load conditions. As load and inventory varies, it can control aeration and mixing in the interchange bioreactors to achieve the best possible performance with ORP and pH probes monitoring the reactor environment in the tanks. Automated monitoring and control of the interchange rates and the interchange environment can achieve optimum conditions for biosolids reduction.

The wastewater treatment systems of preferred embodiments can reliably provide exceptional water quality with minimal sludge production. The integration of jet immersed membrane technology with the solids reduction process also creates synergistic benefits between the two processes. Continuous fine screening of the mixed liquor, which is part of the solids reduction process, creates an optimum environment for the immersed membrane system. Removing trash and fine inert materials improves mixed liquor filterability, improving membrane permeability. This optimized operating environment also reduces membrane maintenance, lowering overall energy and chemical use and enhancing membrane life. A typical system as described herein employing jet immersed membrane technology with the solids reduction process can achieve one or more of the following benefits: high quality effluent; BOD<5 mg/l; TSS<5 mg/l; turbidity<0.2 NTU; low solids production; 80% reduction in solids produced; provide a physical barrier to microorganisms by microfiltration; provide a high rate and robust biological process capable of continuous operation at 12,000 mg/l; very small overall plant footprint; smaller aeration volumes; elimination of the need for a clarifier; capabilities for upgrading existing secondary treatment process to advanced Biological Nutrient Removal (BNR) processes and higher (e.g., 2Q or above) process flow; achieve stringent total nitrogen limits through significant denitrification, cut capital costs by up to 40% by eliminating sludge thickening and dewatering equipment, storage and holding tanks, aerobic and anaerobic digesters, and any costs associated with polymer feed equipment; cut operating costs by eliminating or reducing the power needs for sludge holding, digestion, or dewatering and by reducing sludge hauling and disposal costs (only grit trash and inerts are removed); and provide a stable nitrification performance (even at cold climates) through the maintenance of sensitive nitrifying bacteria.

All references cited herein are incorporated herein by reference in their entirety, and are hereby made a part of this specification. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A method for treating an influent stream comprising a digestible waste, the method comprising:
   filtering a mixed liquor in a membrane bioreactor, wherein the mixed liquor is contacted with outer surfaces of a plurality of porous hollow fiber membranes, and wherein a permeate is removed from lumens of the membranes;
   removing biological solids from the membrane bioreactor by recycling a substrate containing biological solids to an offline treatment vessel via a recycle loop, whereby a preselected concentration of biological solids is maintained within the membrane bioreactor;
   maintaining multiple discrete biological environments within the offline treatment vessel;
   digesting biological solids in the offline treatment vessel; and
   conducting an effluent stream from the offline treatment vessel to the membrane bioreactor, wherein the effluent stream comprises at least a portion of the mixed liquor.

2. The method of claim 1, wherein the step of removing biological solids further comprises the step of passing the substrate containing biological solids through a hydrocyclone, whereby inert solids are removed, wherein the hydrocyclone is part of the recycle loop.

3. The method of claim 1, wherein the step of removing biological solids further comprises the step of passing the substrate containing biological solids through a screen, whereby inert solids are removed, wherein the screen is part of the recycle loop.

4. An apparatus for filtering a liquid containing solids, the apparatus comprising:
   a membrane bioreactor comprising at least one membrane module and an aerator, the membrane module comprising a plurality of porous membranes, wherein the membrane module is configured such that, in operation, a substrate comprising an activated sludge is contacted with outer surfaces of the membranes, and a treated water is removed from lumens of the membranes;
   a biological sludge treatment vessel configured to operate in an anaerobic environment wherein a process fluid is digested, wherein at least a portion of the digested process fluid is transferred to the membrane bioreactor, and wherein at least a portion of the substrate in the membrane bioreactor is transferred to the biological sludge treatment vessel; and
   a screen, wherein the screen is positioned between the membrane bioreactor and the biological sludge treatment vessel, wherein the screen is configured to remove inert materials in an outflow from the membrane bioreactor.

5. The apparatus of claim 4, wherein the screen comprises openings having an average size in a longest dimension of about 200 μm to about 300 μm.

6. The apparatus of claim 4, further comprising:
   a hydrocyclone, wherein the hydrocyclone is positioned between the screen and the biological sludge treatment vessel, wherein the hydrocyclone is configured to remove inert materials in an outflow from the membrane bioreactor.

7. The apparatus of claim 4, further comprising:
   a surge tank, wherein the surge tank is configured to receive an outflow from the membrane bioreactor.

8. An apparatus for filtering a liquid containing solids, the apparatus comprising:
   a membrane bioreactor comprising at least one membrane module and an aerator, the membrane module comprising a plurality of porous membranes, wherein the membrane module is configured such that, in operation, a substrate comprising an activated sludge is contacted with outer surfaces of the membranes, and a treated water is removed from lumens of the membranes;
   a biological sludge treatment vessel configured to operate in an anaerobic environment wherein a process fluid is digested, wherein at least a portion of the digested process fluid is transferred to the membrane bioreactor, and wherein at least a portion of the substrate in the membrane bioreactor is transferred to the biological sludge treatment vessel; and
   a hydrocyclone, wherein the hydrocyclone is positioned between the membrane bioreactor and the biological sludge treatment vessel, wherein the hydrocyclone is configured to remove inert materials in an outflow from the membrane bioreactor.

* * * * *